US006989773B2

(12) United States Patent
Wee et al.

(10) Patent No.: US 6,989,773 B2
(45) Date of Patent: Jan. 24, 2006

(54) MEDIA DATA ENCODING DEVICE

(75) Inventors: Susie J. Wee, Palo Alto, CA (US); John G. Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 10/779,223

(22) Filed: Feb. 13, 2004

(65) Prior Publication Data
US 2005/0179568 A1 Aug. 18, 2005

(51) Int. Cl.
*H03M 7/34* (2006.01)

(52) U.S. Cl. .......................................... 341/51; 341/60
(58) Field of Classification Search .................. 341/50, 341/51, 60

See application file for complete search history.

(56) References Cited

U.S. PATENT DOCUMENTS

| | | | | |
|---|---|---|---|---|
| 6,166,664 | A * | 12/2000 | Acharya | 341/63 |
| 6,573,846 | B1 * | 6/2003 | Trivedi et al. | 341/67 |
| 6,640,145 | B2 * | 10/2003 | Hoffberg et al. | 700/83 |
| 6,765,510 | B2 * | 7/2004 | Koyama et al. | 341/51 |
| 6,792,157 | B1 * | 9/2004 | Koshi et al. | 382/251 |
| 2005/0110662 | A1 * | 5/2005 | Mukherjee et al. | 341/50 |

OTHER PUBLICATIONS

Mukherjee, D et al—"Structured Scalable Meta-Fomats (SSM) Version 1.0 For Content Agnostic Digital Item Adaptation"—ISO/IEC WG11—N9131—Dec. 2002.
Mukherjee, D etal—"Structured Scalable Meta-Formats (SSM) For Digital Item Adaption"—Proc of the SPIE—vol. 5018 Jan. 22, 2003—pp. 148-167.
Wee, S et al—"Secure Scalable Streaming And Secure Transcoding With JPEG 2000"—Proc of ICIP 2003—Sep. 2003 vol. 2 of 3—pp. 205-208.
Wee, s et al—"Secure Scalable Streaming Enabling Transcoding Without Decryption"—Proc of ICIP 2001—Oct. 2001 vol. 1 of 3—conf 8—pp. 437-440.
Wee, S et al—"Secure Scalable Video Streaming For Wireless Networks"—Proc of ICASSP 01—vol. 4—May 2001—pp. 2049-2052.
Wee, S et al—"Secure Scalable Streaming Technology To Enable Secure Transcoding Functionality in JPEG 2000 And JPSEC (version 9.0)"—ISO/IEC JTC1/SC29/WG1 N3136—Dec. 2003.
Search Report—PCT/US2005/004555 filed Feb. 2, 2005.

* cited by examiner

*Primary Examiner*—Linh V. Nguyen

(57) ABSTRACT

The present invention relates to media data encoding devices. Embodiments of the present invention pertain to devices that receive media data, generate scalable media based on the media data, receive scalable attribute criteria, generate scalable profile data based, at least in part, on the scalable media and the scalable attribute criteria, and output the scalable profile data.

52 Claims, 37 Drawing Sheets

MEDIA DATA ENCODING DEVICE

TECHNICAL FIELD

Embodiments of the present invention relate to encoding devices. More specifically, embodiments of the present invention relate to encoding devices that enable other devices, such as transcoders and decoders to operate on encoded data without requiring knowledge of the encoding scheme.

BACKGROUND ART

Data delivery systems present many challenges for the system designer. For instance, clients can have different display, power, communication, and computational capabilities. In addition, communication links in the system can have different maximum bandwidths, quality levels, and time-varying characteristics. A successful data delivery system should be able to deliver data streams to a multitude of diverse clients over heterogeneous networks with time-varying characteristics.

Providing proper security in order to protect content from eavesdroppers is another important consideration in the design of data delivery systems. Generally, to provide security, data are transported in encrypted form.

Intermediate nodes in the system may be used to perform stream adaptation, or transcoding, to scale data streams for different downstream client capabilities and network conditions. A transcoder takes a compressed, or encoded, data stream as an input, and then processes it to produce another encoded data stream as an output. Examples of transcoding operations include bit rate reduction, rate shaping, spatial downsampling, and frame rate reduction. Transcoding can improve system scalability and efficiency, for example, by adapting the spatial resolution of an image to a particular client's display capabilities or by dynamically adjusting the bit rate of a data stream to match a network channel's time-varying characteristics.

Intermediate nodes can collect and update information about local and downstream network conditions and downstream client capabilities, and then scale the data according to that information. This can be more efficient than scaling the data at the source, because it is more difficult for the source to collect up-to-date and detailed information about conditions inside the network, especially at locations in the network relatively far removed from the source. Also, the source provides only one control point at the beginning of the delivery path, while intermediate transcoding nodes provide many additional control points at more strategic locations along the delivery path.

While network transcoding facilitates scalability in data delivery systems, it also presents a number of challenges. The process of transcoding can place a substantial computational load on transcoding nodes. While computationally efficient transcoding algorithms have been developed, they may not be well-suited for processing hundreds or thousands of streams at intermediate network nodes.

Furthermore, transcoding poses a threat to the security of the delivery system because conventional transcoding operations generally require that an encrypted stream be decrypted before transcoding. The transcoded result is re-encrypted but is decrypted at the next transcoder. Each transcoder thus presents a possible breach in the security of the system. This is not an acceptable situation when end-to-end security is required.

Compression, or encoding, techniques are used to reduce the redundant information in data, thereby facilitating the storage and distribution of the data by, in effect, reducing the quantity of data. The JPEG (Joint Photographic Experts Group) standard describes one popular, contemporary scheme for encoding image data. While JPEG is satisfactory in many respects, it has its limitations when it comes to current needs. A newer standard, the JPEG2000 standard, is being developed to meet those needs. However, even with the JPEG2000 standard, decryption of encrypted data is needed for transcoding, and transcoding processes remain computationally intensive. Furthermore, the introduction of a new standard such as JPEG2000 means that each of the large number of network nodes, as well as client devices, needs to be updated in order to be made compliant with the JPEG2000 standard.

Accordingly, a method and/or system that can allow scaling (e.g., transcoding) of data in a secure and computationally efficient manner would be advantageous. A system and/or method that can accomplish those objectives on legacy devices would be more advantageous. The present invention provides these as well as other advantages.

DISCLOSURE OF THE INVENTION

Embodiments of the present invention pertain to devices that receive media data, generate scalable media based on the media data, receive scalable attribute criteria, generate scalable profile data based, at least in part, on the scalable media and the scalable attribute criteria, and output the scalable profile data.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
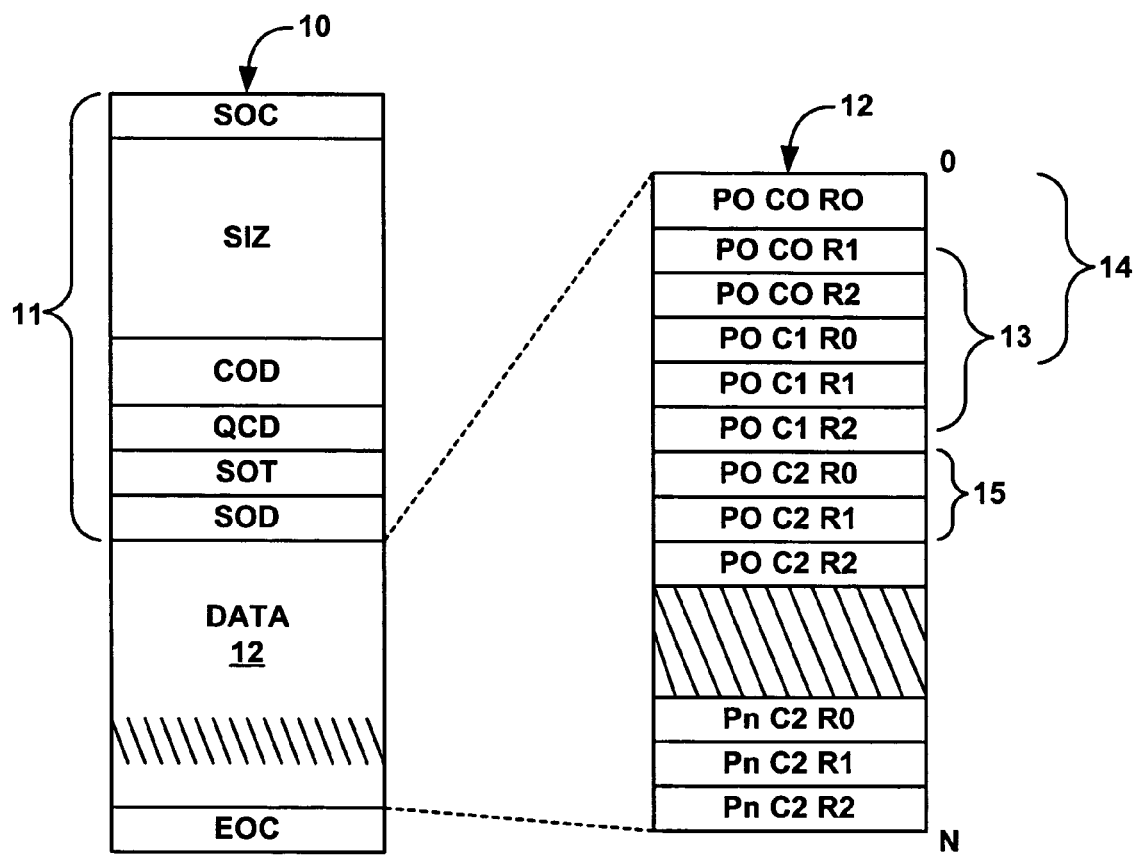
FIG. 1 is an example of a bit stream including data according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Embodiments in accordance with the present invention are discussed primarily in the context of digital image data, in particular for still images. Digital image data can result from "real world" capture using a digital camera, for example. Digital image data can also be computer-generated using, for example, a paint program, screen capture, or the conversion of a graphic into a bitmap image. However, the present invention is not limited to digital image data. Instead, embodiments of the present invention are well suited for use with speech-based data, audio-based data, video-based data, web page-based data, graphic data, text-based data (e.g., electronic documents), and the like.

Furthermore, embodiments in accordance with the present invention are described for data that are scalably encoded using an encoding scheme compliant with, or substantially compliant with, the JPEG2000 standard. However, the present invention is not so limited. In general, embodiments according to the present invention are directed toward any data that can be scalably encoded and, specifically, any data that combines scalable encoding with progressive encryption.

For purposes of the present application, scalable encoding is defined as a process which takes original data as input and creates scalably encoded data as output, where the scalably encoded data has the property that portions of it can be used to reconstruct the original data at different levels of quality, resolution and the like. Specifically, the scalably encoded data is often thought of as an embedded bit stream. A portion of the bit stream can be used to decode a baseline-quality reconstruction of the original data, without requiring any information from other portions of the bit stream. Progressively larger portions of the bit stream can be used to decode improved reconstructions of the original data. JPEG2000 is one example of a scalable encoding scheme. Other scalable encoding schemes that may be used in accordance with embodiments of the present invention include, but are not limited to, 3D subband coding and MPEG-4 FGS (Moving Picture Experts Group-4 Fine Granularity Scalability).

For purposes of the present application, progressive encryption is defined as a process which takes original data (plain text) as input and creates progressively encrypted data (cipher text) as output, where the progressively encrypted data has the property that a first portion of the encrypted data can be decrypted alone, without requiring information from the remainder of the original data. Progressively larger portions can be decrypted with this same property, in which decryption can require data from earlier but not later portions of the bit stream. Progressive encryption techniques that may be used in accordance with the present invention include, but are not limited to, popular encryption primitives such as the Data Encryption Standard (DES), Triple-Des (3DES), and the Advanced Encryption Standard (AES).

General Discussion of JPEG2000 Encoding

In general, a number of stages constitute an encoding process compliant with the JPEG2000 standard. These stages are referred to herein as 1) preprocessing; 2) discrete wavelet transformation; 3) quantization; 4) embedded block coding; 5) rate control; and 6) bit stream organization. Embodiments of the present invention are not limited to these stages, and are also not limited to the particulars of the JPEG2000 standard described below. In fact, as will be seen, embodiments of the present invention introduce features beyond the syntax of the JPEG2000 standard, resulting in scaling (e.g., transcoding) processes that are more computationally efficient, and allowing scaling to be performed by devices that perhaps are not aware of the JPEG2000 standard.

JPEG2000 allows for both lossless and lossy compression; the focus herein is on lossy compression. During preprocessing, tiling can be optionally performed to partition an original image into tiles. Also during preprocessing, the input data may be adjusted so that the data has a nominal dynamic range centered on the value zero. Finally during preprocessing, color data may be transformed into Y, $C_r$ and $C_b$ color components.

During discrete wavelet transformation, image tiles can be decomposed into high and low subbands. Tiles can also be partitioned into code-blocks (e.g., 64×64 or 32×32 samples). More specifically, each subband is divided into rectangular blocks called "precincts," and each precinct is further divided into non-overlapping rectangles called code-blocks.

The wavelet coefficients are quantized during the quantization stage. In the embedded block coding stage, each code-block is encoded separately. Rate control is a process by which the encoded bit stream is altered so that a target bit rate can be reached. Each encoded code-block may be reviewed to determine the extent to which it can be truncated in order to achieve the target bit rate.

In bit stream organization, encoded data are separated into what are referred to in the JPEG2000 standard as "packets" (the contents of a JPEG2000 packet are described by the JPEG2000 standard). The packets are then multiplexed together in an ordered manner into a bit stream. Note that the use of the term "packets" according to JPEG2000 is generally different from the more conventional use of that term. That is, JPEG2000 packets are multiplexed into a bit stream, which may then be packetized into data packets that are sent over a network, for example.

According to JPEG2000, the order of the data (e.g., the JPEG2000 packets) in the bit stream is referred to as a "progression." There are a number of different ways to order the packets, such as precinct-component-resolution-quality or resolution-quality-component-precinct. According to JPEG2000, "quality" may instead be referred to as "layer." These terms are known to those who are familiar with the JPEG2000 standard.

The order of the data in the bit stream may extend through the length of the bit stream. Alternatively, the order of the data in the bit stream may change to a different order at some point in the bit stream. The order of the data at any particular point in the bit stream is not of significance to the discussion herein; what is of significance is that the data are in a particular order that is prescribed by the encoding scheme, in this case an encoding scheme compliant or substantially compliant with the JPEG2000 standard.

FIG. 1 is an example of a JPEG2000 bit stream 10 including a header 11 and encoded data 12 according to one embodiment of the present invention. Header 11 includes a start of code stream marker SOC, an image and tile size marker SIZ, a coding style default marker COD, a quantization default marker QCD, a start of tile-part marker SOT, and a start of data marker SOD. Bit stream 10 also includes an end of code stream marker EOC. The functions performed by each of these markers is understood by those familiar with the JPEG2000 standard.

In the example of FIG. 1, the encoded data 12 is ordered according to a precinct-component-resolution progression; however, as presented above, different progressions can be used. In the example of FIG. 1, there are n precincts (P0, P1, . . . , Pn), three components (C0, C1, and C2), and three resolutions (R0, R1 and R2). (For simplicity of illustration, quality is not included in the progression.) Encoded data 12 is ordered from most significant to least significant. In the example of FIG. 1, the encoded data 12 is ordered first by precinct, then by component, then by resolution.

To decode a bit stream of encoded data, a process that is in essence the opposite of the encoder process discussed above is employed. The encoded bit stream can be decoded in many different ways, depending on, for example, the capabilities of the displaying device and other practical considerations, as well as the specific interests of the viewer (e.g., one use may be satisfied with a low resolution image, while another may desire a high resolution image). According to JPEG2000, it is possible to locate, extract and decode the data required for the desired image product, without decoding the entire bit stream. However, the bits that can be conventionally extracted are limited by the syntax of JPEG2000. Also, to extract those bits, knowledge of the scheme used to encode the data (e.g., a JPEG2000-compliant scheme) is also required. For instance, to find the bits to extract, a device needs to be aware of JPEG2000 in order to read the bit stream 10. As will be seen, embodiments of the present invention allow bits to be extracted beyond the syntax of JPEG2000 and without requiring knowledge of the encoding scheme.

Scaling Encoded Data without Requiring Knowledge of the Encoding Scheme

In the example of FIG. 1, the encoded data 12 includes a sequence of N bits, labeled 0 through N. According to embodiments of the present invention, different segments of bits are identified within the sequence of N bits. These segments are identified in FIG. 1 as data segments 13, 14 and 15. As illustrated by FIG. 1, the data segments may overlap each other in part or in entirety. Also, there can be data segments that do not overlap any other data segments. For example, segments 13 and 14 overlap, while segment 15 does not overlap either segment 13 or 14.

Importantly, the segments 13, 14 and 15 are not constrained by the syntax of JPEG2000. That is, the beginning and ending points of a data segment are independent of the format of bit stream 10 that is dictated by JPEG2000. Thus, for example, segment 13 extends from the portion of bit stream 10 that includes C0 into the portion that includes C1. Also, segment 13 begins at a point in the midst of the P0-C0-R1 portion and ends in the midst of the P0-C1-R2 portion. Furthermore, as will be seen, the locations of the data segments 13, 14 and 15 in bit stream 10 can be determined without reading bit stream 10, including the information in header 11.

In general, a data segment according to the present invention (e.g., data segments 13, 14 and 15) can begin and end anywhere in the bit stream 10, and segments can overlap each other. Any number of such data segments can be identified, and a segment can have any length within encoded data 12. Thus, a particular bit or sequence of bits can be a member of more than one data segment. The segments do not necessarily encompass the entire length of the encoded data 12. That is, there may be one or more portions of encoded data 12 that are not included in a data segment defined according to the present invention.

Furthermore, data segments defined according to the present invention have these important characteristics: they are independently decodable; they are independently encryptable and decryptable; and they are independently checkable. That is, each data segment can be decoded independent of any other segment. Similarly, each data segment can be encrypted and decrypted independent of any other segment. Also, a checksum, for example, can be applied to each data segment independent of any other segment.

Figure 2:
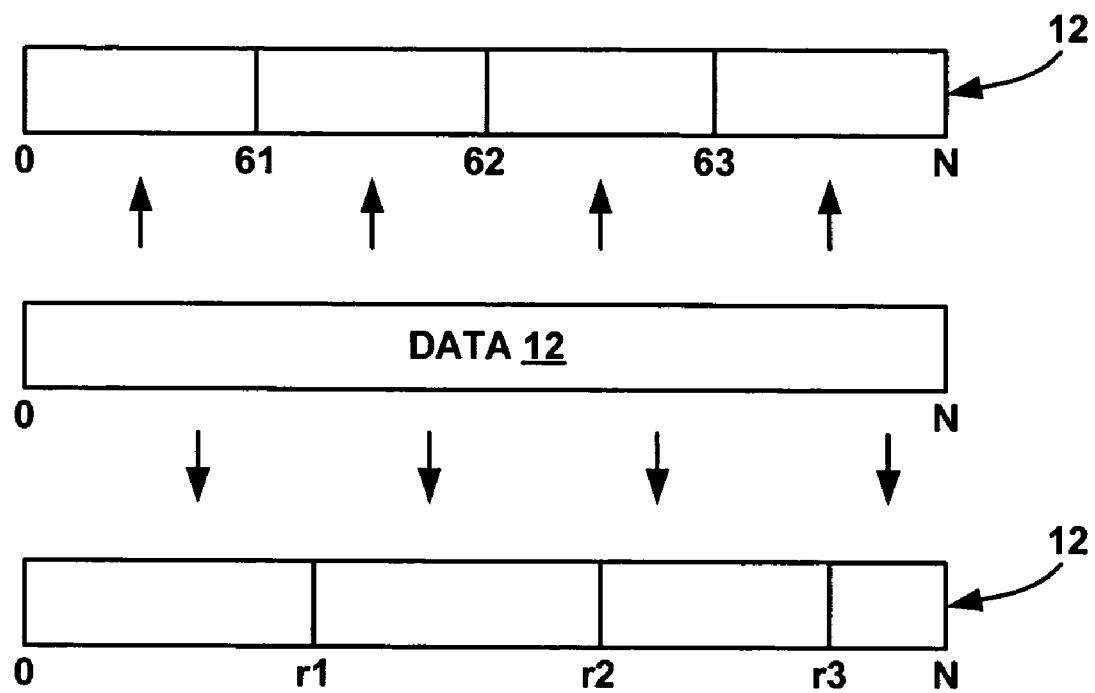
FIG. 2 illustrates examples of data segments in a bit stream according to one embodiment of the present invention.

FIG. 2 illustrates examples of data segments in a bit stream according to one embodiment of the present invention. As just described, encoded data 12 includes N bits that are ordered and formatted depending on the encoding scheme. According to embodiments of the present invention, a number of segments are identified within the encoded data 12.

In the example of FIG. 2, encoded data 12 includes bits identified as b1, b2 and b3, and other bits identified as r1, r2 and r3 (these bits all lie within encoded data 12; however, they are separately illustrated for clarity). Thus, for example, a segment can be defined as extending from bit 0 to bit b1, another segment can be defined as extending from bit b1 to bit b2, and so on. A segment can instead be identified as beginning at a certain bit number and having a certain length (measured in bits). For example, a data segment can be defined as beginning at bit b0 and having a length equal to b1 bits, another segment can be identified as beginning at bit b1 and having a length of (b2–b1) bits, and so on. Furthermore, a segment can extend from bit b1 to bit b3, or from bit b1 to N, and so on. That is, as mentioned above, a segment can have any length, beginning at any bit and ending at any other bit, and two or more segments can overlap. For example, the data segment defined by bits r2 to r3 overlaps the data segment defined by bits b2 to b3. Segments may or may not be of different lengths.

Importantly, the data segments defined according to the present invention and exemplified by FIG. 2 have starting and ending points that are independent of the format specified by an encoding scheme for encoded data 12. As will be seen, the data segments defined according to the present invention allow data, particularly encoded data, to be extracted or parsed from bit stream 10 without requiring knowledge of the encoding scheme that was used to encode the data. Moreover, the data can be extracted from the bit stream 10 (FIG. 1) without decrypting the data if the data are encrypted.

The capability to extract/parse data in this manner can be advantageously applied to data scaling (e.g., transcoding) and decoding (decompressing), as will be seen. For example, to achieve a reduction in bit rate, the two data segments ranging from bits 0 to b1 and b2 to b3 may be extracted from bit stream 10 as part of a transcoding operation. Then, those two segments can be combined in a scaled version of the encoded data and sent over the data delivery system. To achieve a reduction in frame rate, for example, one or more data segments (e.g., the data segment ranging from r1 to r2) are similarly chosen. Thus, the single set of data 12, ranging from bits 0 to N, can be organized into data segments that allow scaling to be performed for a number of different scalable attributes (e.g., bit rate, frame rate, etc.). For example, the single set of data 12 can be organized into a first set of data segments that pertain to bit rate reduction, another set of data segments that pertain to frame rate reduction, and so on. The set of data segments chosen for bit rate reduction may or may not include some portion of the set of data segments chosen for frame rate reduction, and vice versa.

Importantly, in the above examples, the segments selected for bit rate reduction, frame rate reduction, or the like are intelligently selected during encoding to achieve the desired scaling result while minimizing to a practical extent the impact on the image product. It is also important to note that a much finer granularity in data segment lengths can be achieved than that illustrated by FIG. 2. As a result, scaling operations can be performed to finer degrees.

Figure 3:
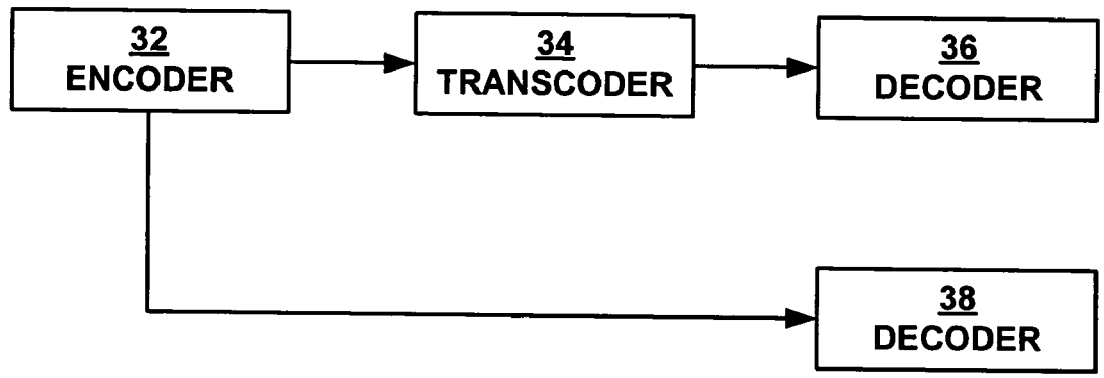
FIG. 3 is a block diagram showing functional elements in a simplified data delivery system according to one embodiment of the present invention.

FIG. 3 is a block diagram showing functional elements in a simplified data delivery system 30 according to one embodiment of the present invention. In the example of FIG. 3, system 30 includes an encoder 32, a transcoder 34, a first decoder 36 and a second decoder 38. System 30 may be part of a larger system or network that includes similar functional elements as well as other types of functional elements (e.g., storage elements, packetizers, streaming elements and the like). In the present embodiment, encoder 32 encodes (compresses) data, transcoder 34 transcodes (e.g., scales) encoded data, and decoders 36 and 38 decode (decompress) data. These functionalities may be performed in a single device or distributed among one or more devices that may be connected in some type of network.

Also, the elements 32, 34, 36 and 38 may perform functions other than those just described. For example, encoder 32 may also encrypt data and calculate checksums or cryptographic checksums for checking the data, encoder 32 may also scale encoded data before sending the encoded data to another block, and decoder 38 may scale encoded data before decoding it. In one embodiment, encoder 32 uses an encoding scheme based on the JPEG2000 standard.

In addition, transcoder 34 may instead send a scaled version of encoded data to another transcoder, which in turn scales the scaled data and sends it to another transcoder, and so on. Also, even though decoder 36 receives scaled data from transcoder 34, decoder 36 may further scale the scaled data. Furthermore, the decoder 36 and 38 may not be the end-user device. For example, decoder 36 and 38 may decode encoded data, and send the decoded data to, for example, a mobile phone that renders and displays the image product.

Moreover, the data scaling function may be performed by a storage device or driver. For example, a storage device (e.g., a disk drive or DVD player) may scale the encoded data, passing only the appropriate data segments to the actual decoder. In this manner, resources or time are not wasted sending unnecessary information. This can also simplify the decoder, because the decoder does not need to perform this processing.

Figure 4A:
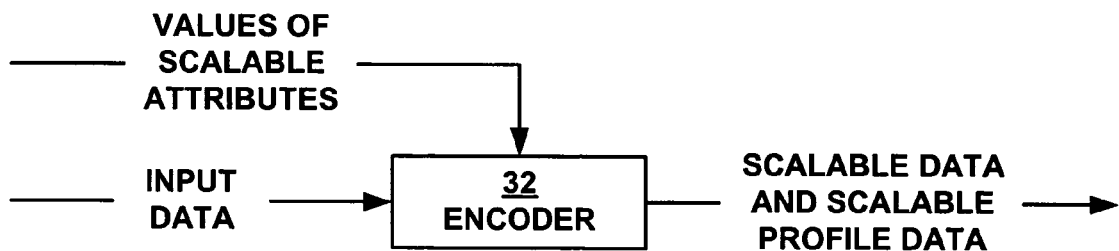
FIG. 4A shows information flowing into and out of an encoder according to one embodiment of the present invention.

FIG. 4A shows information flowing into and out of an encoder 32 according to one embodiment of the present invention. In the present embodiment, encoder 32 receives input data (e.g., data such as image data that are to be encoded). Encoder 32 also receives values of scalable attributes.

For purposes of the present application, a scalable attribute is defined as an attribute having a range of values that specifies how the encoded data are to be subsequently scaled. For image data, a scalable attribute can be, for example, bit rate, frame rate, resolution, color or black and white, region of interest, tile, quality, image objects, or foreground versus background.

Scalable attribute values are values specified for the scalable attributes. For example, scalable attribute values for bit rate can include full bit rate (B), one-half bit rate (B/2), one-fourth bit rate (B/4), and so on.

Scalable attributes and values can be similarly defined for other types of data (e.g., audio data, graphics data, and the like). For example, a scalable attribute value for audio data can indicate whether an audio track is stereo or mono.

Electronic documents and text-based data may also be organized via scalable attributes that describe the content of the document or text-based data (e.g., chapters, sections, images, graphs, index, appendices, associated software, extra audiovisual material, etc.). It is beneficial to be able to adapt the selection of content, as well as the size of the content, to meet end-user preferences or device constraints such as available storage space. In addition, certain portions of these documents may be encrypted, either for confidentiality reasons or for commercial reasons (e.g., pay to read), while other portions of these documents may be in plain text.

In the present embodiment, encoder 32 encodes the input data using an encoding scheme such as an encoding scheme based on JPEG2000. As mentioned above, encoder 32 can provide other functionality. As a result of the encoding process, a bit stream such as that exemplified by bit stream 10 of FIG. 1, or a file containing such a bit stream, is generated. The file or bit stream is organized according to the encoding scheme; that is, the bits are in a certain order that is established by the encoding scheme. The output of encoder 32 includes what is referred to herein as scalable data, because the encoded data can be subsequently scaled by a transcoder or decoder.

Another output of encoder 32 includes what is referred to herein as scalable profile data. In essence, scalable profile data includes a cross-reference of scalable attribute values and corresponding data segments within the scalable, encoded data. For example, the scalable profile data may be in the form of an index or lookup table that cross-references data segments and scalable attribute values, exemplified by Table 1 below (with reference also to FIG. 2).

TABLE 1

Exemplary Scalable Profile Data

| Scalable Attribute | List of Data Segments (Bit Numbers) |
| --- | --- |
| Full Bit Rate (B) | 0–N |
| B/2 (R2, Q2) | 0–b1 and b2–b3 |
| B/2 (R1, Q3) | 0–b2 |
| B/4 | 0–b1 |

It is appreciated that the format of Table 1 is exemplary only, and that the scalable profile data can be stored in just about any computer-readable format. In Table 1, bits are identified by their bit numbers, but other addressing mechanisms may be used. Also, instead of identifying data segments by their bit range, other mechanisms can be used to identify data segments. In general, the scalable profile data includes enough information to correlate a value of scalable attribute with one or more data segments in the bit stream 10 of FIG. 1.

Furthermore, Table 1 only addresses bit rate (B), resolution (R) and quality (Q), but in actuality such a table can include any scalable attributes and scalable attribute values selected by the user as input to encoder 32 (FIG. 3). In addition, the scalable profile data can include multiple choices of data segments for each scalable attribute value. This can provide greater flexibility downstream at the transcoder or decoder. For example, in one application, a bit rate reduction of one-half can be achieved at a resolution level 2 (R2) and quality level 2 (Q2), or at resolution level 1 (R1) and quality level 3 (Q3). R1 may be better than R2 and Q2 may be better than Q3, so that the same bit rate can be achieved but with tradeoffs in resolution and quality.

Thus, by including multiple choices of data segments for each scalable attribute value in the scalable profile data, a user at a downstream node (e.g., at a transcoder or decoder) can select the type and degree of scaling that suits his or her needs, for example.

In one embodiment, the scalable profile data also includes information about the distortion that will be produced depending on which segments are extracted and hence which are discarded. The distortion can be measured in terms of conventional mean-squared error (MSE) or in terms of a perceptual distortion. The scaler (e.g., transcoder) can use the information about distortion to determine which segments are most important and should be retained (e.g., extracted), and which segments have lesser importance and can be discarded. There may be a separate distortion parameter per data segment, or per group of segments, or per scalable attribute value (e.g., image resolution, quality level, bit rate, etc.). Accordingly, the decision as to which segments to extract or discard can be performed by accounting for the associated distortions in combination with the type and degree of scaling that suits the end-user's needs, as well as the type and degree of scaling selected according to network performance characteristics, downstream device capabilities, and other factors.

The distortion associated with each data segment, group of segments or scalable attribute can be a measured distortion or an estimated distortion. For example, the measured distortion associated with discarding a particular data segment can be computed by, in essence, dropping that data segment from the bit stream and computing the resulting distortion that would be produced when decoding the remaining data packets. This measurement can be performed as the media are encoded or for pre-encoded data. For pre-encoded data, a data segment can be dropped from the encoded (compressed) bit stream, the remainder of the data can be decoded, and the resulting distortion can be computed. As an alternative to measured distortion, estimated distortion can be accomplished, for example, by extracting information from the encoded bit stream that provides an indication of the distortion that may result should a particular data segment be discarded. Measured distortion is more accurate than estimated distortion; however, measured distortion is more complex to compute.

Note that the predicted distortion can be a single number corresponding to the expected distortion, or it may be a distribution of expected distortions, or something in between (e.g., expected distortions with a tolerance band corresponding to, for example, one standard deviation). Alternatively, some form of cumulative distribution function for the distortion can be determined.

In the embodiment of FIG. 4A, the scalable data and the scalable profile data are stored together. For example, the scalable profile data can be appended to the bit stream or file that contains the scalable data. For instances in which there is a large quantity of scalable data, portions of the scalable profile data may be spaced at intervals within the bit stream or file.

Figure 4B:
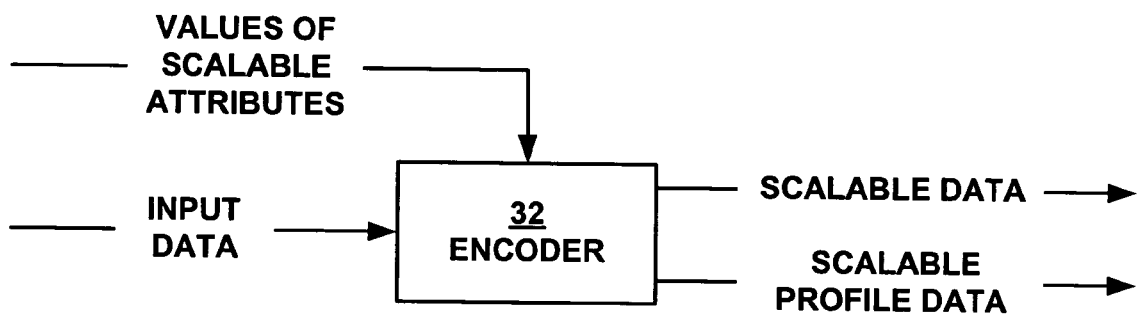
FIG. 4B shows information flowing into and out of an encoder according to a second embodiment of the present invention.

Alternatively, the scalable profile data can be stored and handled separately from the scalable data, as illustrated by FIG. 4B. In the embodiment of FIG. 4B, it is not even necessary that the scalable profile data travel with the scalable data. For example, with reference to FIG. 2, the scalable profile data can travel to transcoder 34, decoder 36 or decoder 38 by a path that is different from the path traveled by the scalable data. Alternatively, the scalable profile data and the scalable data can be stored in separate locations, and then accessed and correlated by transcoder 34, decoder 36 or decoder 38 whenever necessary.

In operation, the encoder 32 of FIGS. 4A and 4B functions as follows. In one embodiment, values of scalable attributes are input by a user. Alternatively, values of scalable attributes may be automatically selected based on information known by encoder 32 about network performance, downstream device capabilities, and the like. Network performance characteristics such as available bandwidth may be monitored, and that information fed to encoder 32. Also, downstream devices (including the end-user device) may communicate directly with encoder 32.

Encoder 32 then encodes the input data in a conventional manner, using the encoding scheme it is employing (e.g., a JPEG2000 encoding scheme). In addition, the encoder 32 generates scalable profile data for the encoded bit stream (the scalable data). That is, in one embodiment, for each of the input values of scalable attributes, encoder 32 identifies corresponding data segments within the encoded data.

Importantly, according to the embodiments of the present invention, the scalable (encoded) data that is output by encoder 32 can be scaled without requiring knowledge of the encoding scheme employed by encoder 32. Whether the data are encoded using a JPEG2000 scheme or some other encoding scheme, a transcoder or decoder need only specify the type of scaling to be performed (e.g., reduce bit rate by one-fourth) to extract/parse from bit stream 10 (FIG. 1) the data segment(s) associated with that type of scaling.

In one embodiment, encoder 32 can identify several choices or combinations of data segments that correspond to a particular value of a scalable attribute. For example, to achieve a bit rate reduction of one-half (B/2), encoder 32 may identify several different combinations of data segments that are satisfactory. For image data, one combination may result in the reduced bit rate being applied to all portions of the image product. Another combination may result in full bit rate (B) being applied to a region of interest in the image product, and a bit rate reduced by a greater amount (e.g., B/4) being applied to other regions of the image product, such that the average bit rate is B/2.

At the encoding stage, encoder 32 can apply intelligence (either programmed intelligence or intelligence based on user input) to decide which combination or combinations of data segments to include in the scalable profile data. Alternatively, all combinations can be included; the transcoder or decoder can then decide which combination of data segments to use based on user input or other considerations such as network performance characteristics or end-user device capabilities.

Note that the data ultimately included by encoder 32 in the encoded bit stream or file can depend on the input values of the scalable attributes. For example, suppose that there is not a need for the scalable data to include data corresponding to the full bit rate case. Instead, only the cases of B/2 and B/4 are to be considered. Encoder 32 identifies data segments corresponding to B/2 and B/4, but these data segments do not encompass all of the encoded data. That is, there is some portion of the encoded data that is not indexed to B/2 or B/4 in the scalable profile data. If that portion of data is not associated with another scalable attribute, encoder 32 can decide to not include that data in the encoded bit stream or file.

In another embodiment, data segments associated with various values of scalable attributes may be defined ahead of time. In essence, the scalable profile data exemplified by Table 1 is established in advance of the data encoding. In this embodiment, the data are encoded and then placed in the bit stream in an order that corresponds to the order defined by the scalable profile data. For example, referring to FIG. 2, the scalable profile data may define in advance that bits 0-b2 are reserved for bit rate reduction by one-half (B/2). Accordingly, encoder 32 will compress the data by the amount necessary to fit data associated with B/2 into bits 0-b2, and will place that data into those locations within the bit stream 10.

In yet another embodiment, an encoded file, organized according to an encoding scheme, is reorganized based on desired goals and on knowledge of the scalable attributes, and then, for example, stored or streamed. For instance, using scalable profile data (e.g., a cross-reference of data segment and scalable attribute) to locate relevant data segments in the encoded file, it may be useful to take an encoded file that is organized first by color component and second by resolution and reorganize the file so that it is instead ordered first by resolution and second by color component. By taking advantage of the scalable profile data, the reorganization can be achieved without requiring knowledge of the details of the encoding format.

Figure 5A:
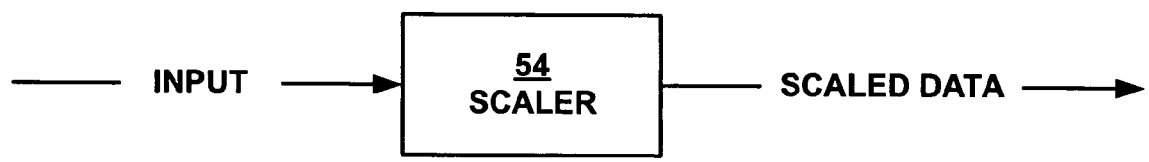
FIG. 5A shows information flowing into and out of a data scaler according to one embodiment of the present invention.

FIG. 5A shows information flowing into and out of a data scaler 54 according to one embodiment of the present invention. Data scaler 54 may be a transcoder such as transcoder 34 of FIG. 3, or it may be a decoder that performs a scaling or parsing function (e.g., decoder 38 of FIG. 3).

As input, data scaler 54 of FIG. 5A receives scalable data and scalable profile data. As mentioned above in conjunction with FIGS. 4A and 4B, the scalable data and scalable profile data may be traveling together (e.g., in the same bit stream or file) or apart. The input may be streamed to data scaler 54 (from encoder 32, for example), or it may retrieved by data scaler 54 from some type of storage element.

Using the scalable profile data, scaler 54 can parse the scalable data and create a scaled version of the encoded data. For example, if scaler 54 wants to reduce bit rate by one-fourth, it can determine from the scalable profile data which bits in the encoded data can be selected to achieve the desired bit rate reduction (see Table 1, for example). Scaler 54 can then create a scaled version of the encoded data using the identified data segments, by either discarding the bits not required, or by extracting the identified data segments and combining them into a new bit stream or file.

As mentioned above, the scalable profile data presented to scaler 54 can include multiple choices of data segments for each scalable attribute value (refer to the discussion in conjunction with Table 1). The decision as to which segment(s) to extract or discard can be performed by accounting for the type and degree of scaling that suits the end-user's needs, the type and degree of scaling selected according to network performance characteristics and/or downstream device capabilities, the distortion information included in the scalable profile data, or other factors, and combinations thereof. For example, if scaler 54 is to reduce bit rate by one-half, but is presented with different ways of achieving that bit rate reduction, scaler 54 can make a selection considering the characteristics of the end-user device and/or the amount of distortion associated with each possible selection. Perhaps the end-user device is a mobile phone with a relatively small display screen that permits color displays, in which case scaler 54 may extract data segments that achieve the bit rate reduction at a lower resolution while preserving color components, or that achieve the desired bit rate reduction while minimizing the amount of distortion.

Importantly, scaler 54 can perform its functions without requiring knowledge of the encoding scheme that was used to encode the data. Also, scaler 54 can perform these functions without decrypting the encoded data, if the data are encrypted. To parse the scalable data, scaler 54 simply identifies which bits (data segments) to extract, locates those bits (data segments) in the bit stream or file, and extracts those bits (data segments). Scaler 54 does not need to read the bits in the data segments, nor does scaler 54 need to read the information in header 11 (FIG. 1) to locate the bits (data segments). As such, the scaling operation can be efficiently accomplished, without unduly taxing computational resources. Furthermore, because scaler 54 does not need to read the bits in the data segments, scaler 54 does not require knowledge of the encoding scheme. Accordingly, scaling can be accomplished on legacy devices even when the encoding scheme is relatively new and perhaps unknown to scaler 54. Specifically, scaler 54 does not need to be aware of JPEG2000 in order to scale the encoded data.

Moreover, the data scaling function may be performed by a storage device or driver without requiring knowledge of the encoding syntax. For example, a storage device (e.g., a disk drive or DVD player) may scale the encoded data, passing only the appropriate data segments to the actual decoder. In this manner, resources or time are not wasted sending unnecessary information. This can also simplify the decoder, because the decoder does not need to perform this processing.

To locate and extract the data segments dictated by the scalable profile data, scaler 54 can be provided with the capability to read the scalable profile data by various means. For example, a driver can be preloaded onto scaler 54, or such a driver can be provided with the scalable profile data. Alternatively, the scalable profile data can be based on, for example, the Extensible Markup Language (XML), which can be read and acted on by the scaler 54.

As a result of the scaling operation, the scalable profile data that was received by scaler 54 may need to be modified. For example, after the encoded data are scaled, some data segments referenced in the scalable profile data may not be present in the encoded data, or some scaling operations may no longer be possible. Furthermore, some scaling operations may need to be redefined in terms of their associated data segments, because after scaling the data segments may be identified by different bit numbers. There may be other reasons for modifying the scalable profile data.

Figure 5B:
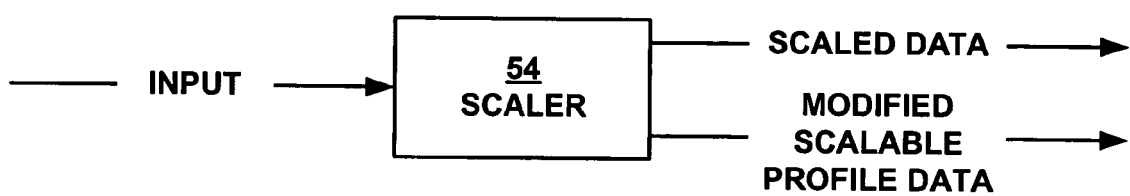
FIG. 5B shows information flowing into and out of a data scaler according to a second embodiment of the present invention.

FIG. 5B shows information flowing into and out of a data scaler 54 according to a second embodiment of the present invention, in which scaler 54 creates modified scalable profile data. Scaler 54 can modify the scalable profile data in much the same way that encoder 32 created the scalable profile data. In the present embodiment, the modified scalable profile data is then output from scaler 54, either together with or separate from the scaled version of the encoded data, as described above.

Figure 6:
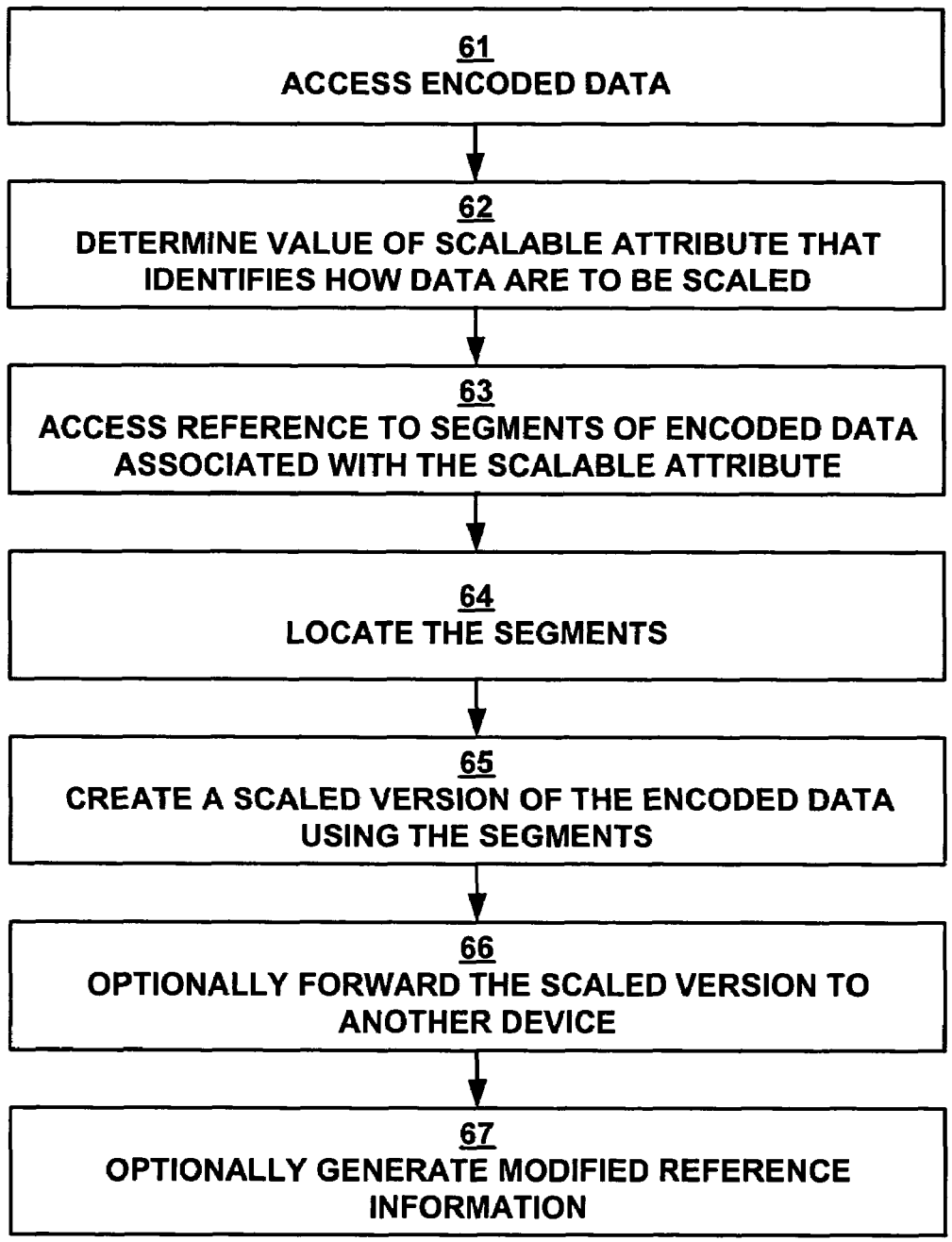
FIG. 6 is a flowchart of a process for scaling (e.g., transcoding) data according to one embodiment of the present invention.
Figure 7:
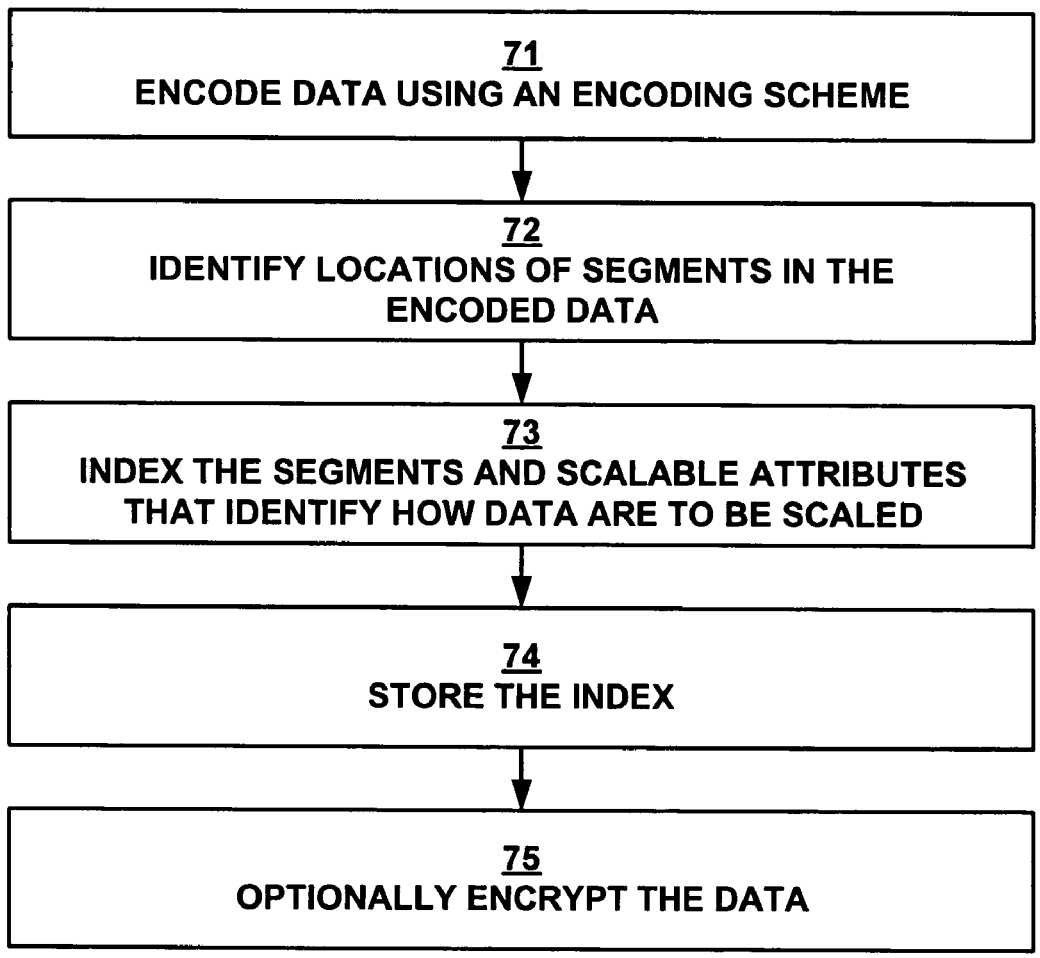
FIG. 7 is a flowchart of a process for encoding data according to one embodiment of the present invention.
Figure 8:
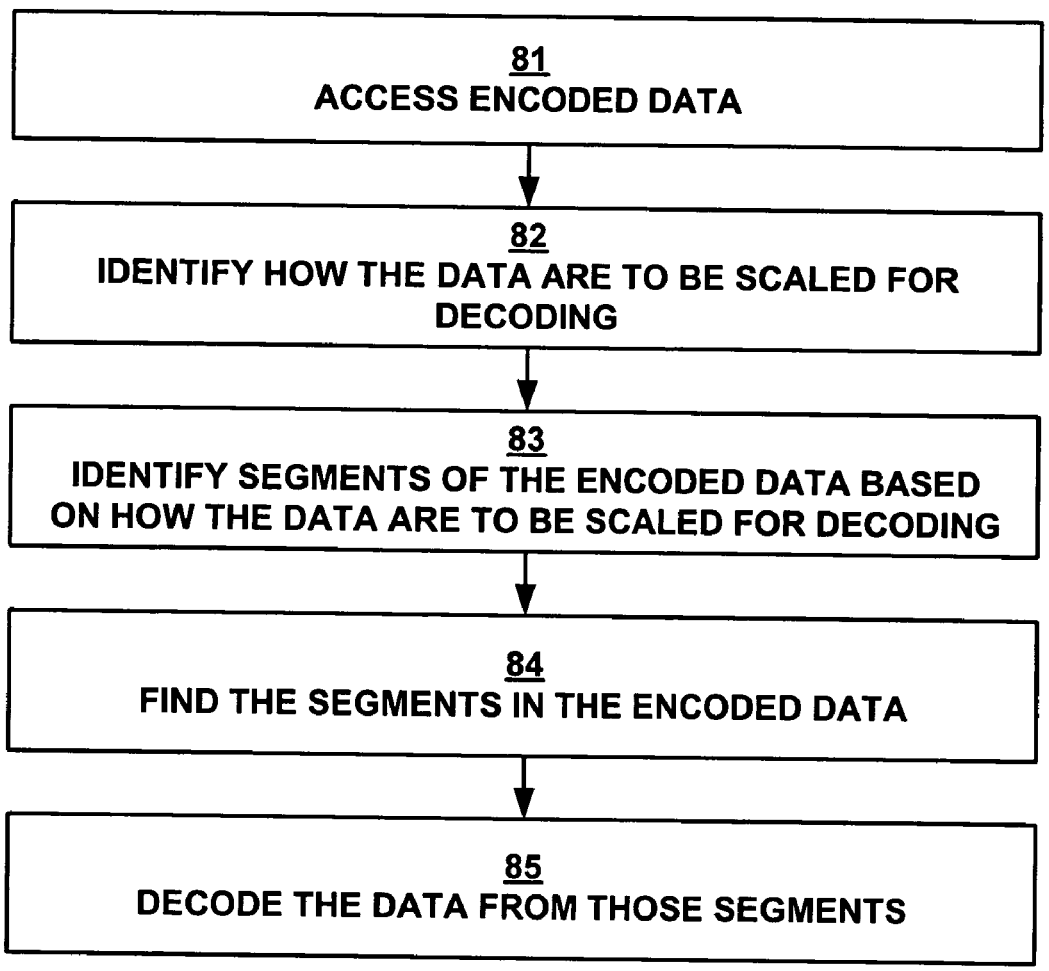
FIG. 8 is a flowchart of a process for decoding data according to one embodiment of the present invention.

FIG. 6 is a flowchart 60 of a process for scaling (e.g., transcoding) data according to one embodiment of the present invention. FIG. 7 is a flowchart 70 of a process for encoding data according to one embodiment of the present invention. FIG. 8 is a flowchart of a process 80 for decoding data according to one embodiment of the present invention. Although specific steps are disclosed in flowcharts 60, 70 and 80, such steps are exemplary. That is, embodiments of the present invention are well-suited to performing various other steps or variations of the steps recited in flowcharts 60, 70 and 80. It is appreciated that the steps in flowcharts 60, 70 and 80 may be performed in an order different than presented, and that not all of the steps in flowcharts 60, 70 and 80 may be performed. All of, or a portion of, the methods described by flowcharts 60, 70 and 80 may be implemented using computer-readable and computer-executable instructions which reside, for example, in computer-usable media of a computer system.

Generally, flowchart 60 is implemented by scaler 54 of FIGS. 5A and 5B (e.g., transcoder 34 or decoder 38 of FIG. 3); flowchart 70, by encoder 32 of FIGS. 3, 4A and 4B; and flowchart 80, by decoder 36 of FIG. 3. However, as mentioned above, different functional blocks can perform different functions, one device may perform multiple functions, or a function or functions may be distributed across multiple devices.

Referring first to FIG. 6, in step 61, a sequence of encoded data is accessed (e.g., in a bit stream or a file). The encoded data are organized according to an encoding scheme that was used to encode the data. In one embodiment, the encoding scheme is based on the JPEG2000 standard. Some or all of the encoded data may also be encrypted.

In step 62, a value for a scalable attribute is determined. The scalable attribute identifies how the encoded data are to be scaled. A scalable attribute may be, for example, bit rate (B), and the value of the scalable attribute may be B/4.

In one embodiment, the value for the scalable attribute is received from another device in communication with the scaling device. In one such embodiment, when the other device is to be the recipient of the scaled version of the encoded data, the encoded data are to be scaled based on the characteristics of that other device. To determine those characteristics, the scaling device can access profile information that provides the characteristics of the other device, and select the value of the scalable attribute according to the profile information. Alternatively, the scaling device can receive profile information from the other device, and select the value of the scalable attribute accordingly.

In step 63, information (e.g., scalable profile data) that includes a reference to segments of the encoded data that are associated with the scalable attribute is accessed. Importantly, the reference is beyond the syntax of the encoding scheme.

In one embodiment, the reference information (e.g., scalable profile data) is stored with the sequence of encoded data. In another embodiment, the reference information is stored separately from the sequence of encoded data.

In step 64, the scalable profile data is used to locate the segments in the encoded data. Importantly, the segments are found without requiring knowledge by the scaling device of the encoding scheme.

In step 65, a scaled version of the encoded data is created using the segments. Also, the scaled version of the encoded data is created without decrypting encrypted data.

In step 66, in one embodiment, the scaled version of the encoded data is forwarded to the downstream device.

In step 67, in one embodiment, modified reference information (e.g., modified scalable profile data) is generated based on the scaled version of the encoded data. Segments in the scaled version are associated with selected values of scalable attributes, independent of the encoding scheme, thereby allowing another device to locate the segments in the scaled version and to scale the scaled version without requiring knowledge of the encoding scheme. The modified reference information can be stored with or separate from the scaled version of the encoded data.

Referring now to FIG. 7, in step 71, data are encoded using an encoding scheme and stored in a file. In one embodiment, the encoding scheme is substantially compliant with the JPEG2000 standard.

In step 72, locations of data segments in the file are identified.

In step 73, the data segments and selected values of scalable attributes are indexed. A scalable attribute specifies how encoded data are to be scaled in a subsequent scaling operation. The index is independent of the encoding scheme, and allows a device to locate the segments and to scale encoded data without requiring knowledge of the encoding scheme. In one embodiment, the selected values of scalable attributes are input to the encoding device.

In step 74, reference information including the index of the data segments and the selected values of scalable attributes is stored. In one embodiment, the index is added to the file of encoded data. In another embodiment, the index is stored separately from the file.

In step 75, in one embodiment, at least some of the encoded data is encrypted. In one such embodiment, each data segment of encoded data is progressively encrypted.

Now with reference to FIG. 8, in step 81, a sequence of encoded data is accessed. The encoded data are ordered according to an encoding scheme used to encode the data. In one embodiment, the encoding scheme is substantially compliant with the JPEG2000 standard.

In step 82, the decoding device determines how the encoded data are to be scaled for decoding.

In step 83, information (e.g., scalable profile data) that identifies certain segments of the encoded data is accessed. This information is in addition to the syntax of the encoding scheme. The data segments are identified based on how the encoded data are to be scaled for decoding.

More specifically, in one embodiment, a value for a scalable attribute is determined. The value may be a user input, or it may be derived based on the characteristics and capabilities of the decoding device. The value of the scalable attribute identifies how the encoded data are to be scaled. The scalable profile data includes a reference from the scalable attribute value to certain data segments in the encoded data.

In step 84, using the information from step 83, the data segments are found in the encoded data. Importantly, the segments are located without requiring knowledge by the decoding device of the encoding scheme.

In step 85, the encoded data included in the data segments found in step 84 are decoded. If the encoded data is encrypted, then the data in the data segments can also be decrypted.

In summary, embodiments of the present invention allow scaling (e.g., transcoding) of encoded data in a secure and computationally efficient manner. Scaling can be accomplished without requiring knowledge of the scheme used to encode the data, and accordingly scaling can be accomplished on legacy devices even when the encoding scheme is relatively new and perhaps unknown to the scaling device.

Protection Profile Data Generating System and Method

Figure 9A:
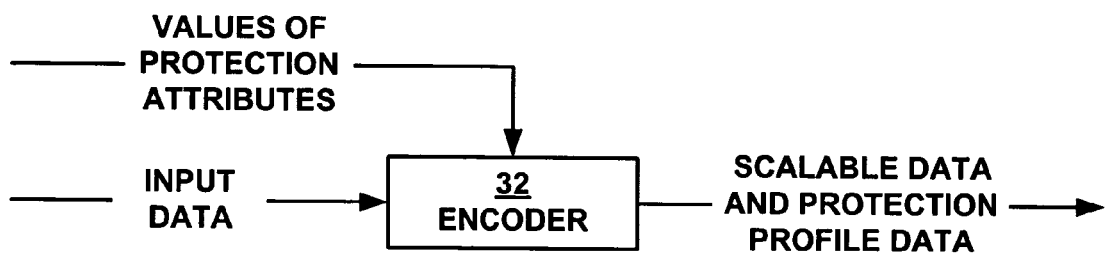
FIG. 9A shows a system for coupling data with a scalable media according to one embodiment of the present invention.

FIG. 9A shows a system for coupling data with a scalable media according to one embodiment of the present invention. FIG. 9A illustrates information flow into and out of encoder 32 according to one embodiment of the present invention. In the embodiment of FIG. 9A, data is associated with scalable media that identifies the portions of the scalable media that may combined in order to produce media that is scaled to possess a desired scalable attribute. Thereafter, the scalable media is encrypted. In addition, data is associated with the individual portions of the scalable media that identifies the protection attributes of the encryption scheme that is used to encrypt the individual portions of the scalable media.

In the present embodiment, encoder 32 receives input data (e.g., data such as image data that are to be encoded). Encoder 32 also receives data that details the attributes of the encryption scheme used to encrypt the input data.

For purposes of the present application, a protection attribute is defined as an attribute having a range parameters and associated values that specifies how the encoded data are to be protected. Protection attributes can include but are not limited to encryption primitives, encryption modes, CCSs, and mapping of crypto to scalable media segments.

Protection attribute values are values specified for the protection attributes. For example, protection attribute values for encryption primitive can include DES, 3-DES, AEC, etc. Protection attributes and values can be similarly defined for other types of data (e.g., audio data, graphics data, and the like). For example, a protection attribute value for audio data can indicate whether an audio track is protected using MAC or keyed-hashes as cryptographic checksums.

As previously discussed, encoder 32 encodes the input data using an encoding scheme such as an encoding scheme based on JPEG2000. As mentioned above, encoder 32 can provide other functionality. As a result of the encoding process, a bit stream such as that exemplified by bit stream 10 of FIG. 1, or a file containing such a bit stream, is generated. The output of encoder 32 includes what is referred to herein as scalable data, because the encoded data can be subsequently scaled by a transcoder or decoder.

Referring again to FIG. 9A, another output of encoder 32 includes what is referred to herein as protection profile data. In essence, protection profile data includes a cross-reference of protection attribute values and corresponding data segments within the scalable data. For example, the protection profile data may be configured as an index or lookup table that cross-references data segments and protection attribute values, as exemplified in Table 2 below (with reference also to FIG. 2).

TABLE 2

Exemplary Protection Profile Data

| Protection Attribute/Values | List of Data Segments (Byte Numbers) |
| --- | --- |
| Encryption Primitive/AES | 0–N |
| Encryption Mode/CBC | 0–b1 and b2–b3 |
| CCS/MAC | 0–b2 |
| Mapping/Multiple Keying | 0–b1 |
| Digital Signature/DSS | 0–N |

It is appreciated that the format of Table 2 is exemplary only, and that the protection profile data can be stored in just about any computer-readable format. In Table 2, bytes are identified by their byte numbers, but other addressing mechanisms may be used. Also, instead of identifying data segments by their byte or bit or block (e.g. 8 byte) range, other mechanisms can be used to identify data segments. In general, the protection profile data includes enough information to correlate a value of a protection attribute with one or more data segments in the bit stream 10 of FIG. 1.

It should be appreciated that Table 2 can include any protection attributes and protection attribute values selected by the user as an input to encoder 32 (FIG. 3). In addition, the list of data segments to which a particular protection attribute is to be applied can include multiple choices of data segments for each protection attribute value. This can provide a wide range of data protection flexibility at the encoder. Thus, the choice flexibility of exemplary embodiments, that allows the inclusion of multiple choices of data segments for each protection attribute value in the protection profile data, allows a user (e.g., providing input to the encoder) to select the type and degree of protection that suits his or her needs.

It should be noted that the scalable data (encoded and encrypted) that is output by encoder 32 can be scaled without requiring knowledge of the encoding scheme, or the encryption scheme employed by encoder 32. Whether the data are encoded using a JPEG2000 scheme or some other encoding scheme, a transcoder or decoder need only specify the type of scaling to be performed (e.g., reduce bit rate by one-fourth) to extract/parse from bit stream 10 (FIG. 1) the data segment(s) associated with that type of scaling.

In the embodiment of FIG. 9A, the scalable data and the protection profile data are stored together. For example, the protection profile data can be appended to the bit stream or file that contains the scalable data. For instances in which there is a large quantity of scalable data, portions of the scalable profile data may be spaced at intervals within the bit stream or file.

Figure 9B:
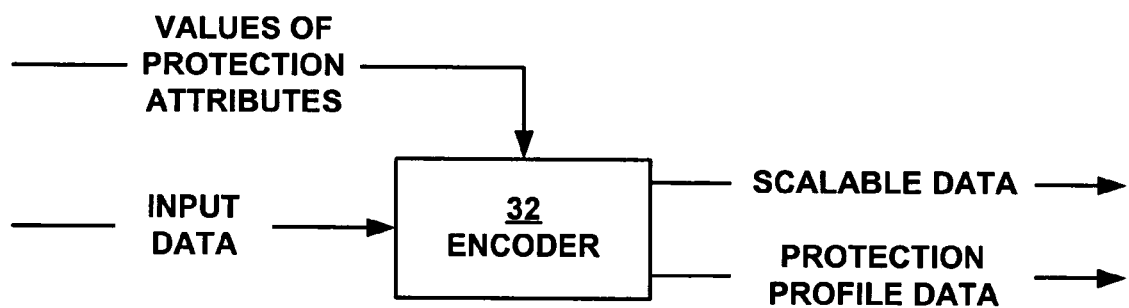
FIG. 9B shows a system for coupling data with a scalable media according to one embodiment of the present invention.

Alternatively, the protection profile data can be stored and handled separately from the scalable data, as illustrated by FIG. 9B. In the embodiment of FIG. 9B, it is not even necessary that the scalable profile data travel with the scalable data. For example, with reference to FIG. 3, the protection profile data can travel to transcoder 34, decoder 36 or decoder 38 by a path that is different from the path traveled by the scalable data. Alternatively, the protection profile data and the scalable data can be stored in separate locations, and then accessed and correlated by transcoder 34, decoder 36 or decoder 38 whenever necessary.

In operation, the encoder 32 of FIGS. 9A and 9B functions as follows. In one embodiment, values of protection attributes are input by a user, which may include the content creator, content distributor, or content consumer. Alternatively, values of protection attributes may be automatically selected based on information known by encoder 32 about network performance, downstream device capabilities, digital right management (DRM) policies, security concerns or vulnerabilities, and the like. Network performance characteristics such as available bandwidth may be monitored, and that information fed to encoder 32. Also, downstream devices (including the end-user device) may communicate directly with encoder 32.

Encoder 32 then encodes the input data in a conventional manner, using the encoding scheme it is employing (e.g., a JPEG2000 encoding scheme). In addition, the encoder 32 generates protection profile data for the encoded bit stream (the scalable data). That is, in one embodiment, for each of the input values of protection attributes, encoder 32 identifies corresponding data segments within the encoded data to which the protection attribute may be associated.

In one embodiment, encoder 32 can identify several choices or combinations of data segments that are associated with a particular value of a protection attribute. For example, in the image product context, for a particular encryption primitive, encoder 32 may identify several different combinations of data segments that may be encrypted using that encryption primitive. According to one embodiment, one combination may result in the same encryption primitive being applied to all portions of the image product. Another combination may result in one encryption primitive being applied to one region of interest in the image product, and another encryption primitive being applied to other regions of interest in the image product.

At the encoding stage, encoder 32 can apply intelligence (either programmed intelligence or intelligence based on user input) to decide which combination or combinations of data segments to associate with the protection profile data. Alternatively, all combinations can be associated with protection profile data; the encoder can decide which combination (e.g., some or all) of data segments to associate with a particular protection attribute based on user input or other considerations such as network performance characteristics, end-user device capabilities, digital rights management policies (DRM), or security vulnerabilities.

In another embodiment, data segments associated with various values of protection attributes may be defined ahead of time. In essence, the protection profile data exemplified by Table 1 is established in advance of data encoding. In this embodiment, the data are encoded and then encrypted in a manner that corresponds to the manner defined by the protection profile data. For example, referring to FIG. 2, the protection profile data may define in advance that bytes 0-b2 are to be encrypted using an encryption primitive having protection attribute value AES. The encoder would then encrypt these bytes accordingly.

Figure 10:
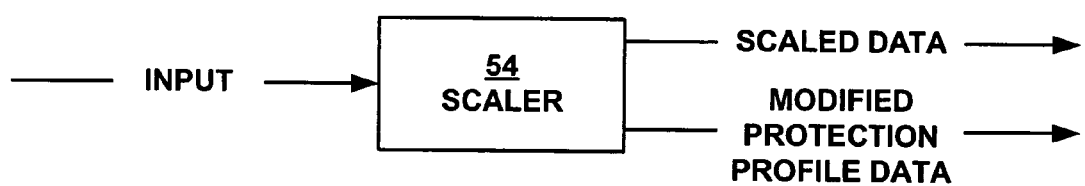
FIG. 10 shows information flowing into and out of a data scaler according to a second embodiment of the present invention.

FIG. 10 shows information flowing into and out of a data scaler 54 according to a second embodiment of the present invention, in which scaler 54 creates modified protection profile data. Scaler 54 can modify the protection profile data in much the same way that encoder 32 created the protection profile data. In the present embodiment, the modified scalable profile data is then output from scaler 54, either together with or separate from the scaled version of the encoded data, as described above.

In the present embodiment, protection profile data that is associated with individual portions of the scalable media identifies protection attributes that can include but is not limited to encryption primitives, encryption modes, cryptographic checksums, and the mapping of crypto to scalable media such as is shown in Table 2. Moreover, the protection profile data is used in the decryption of an encryption algorithm and a cryptographic technique that is used in the encryption scheme used to encrypt the individual portions of the scalable media.

In the present embodiment, respective individual portions of the scalable media may have different keys that are used to decrypt the individual portions of the scalable media, may use different encryption algorithms, and may use different CCSs. It should be appreciated that, respective classes of keys may be required to decrypt respective classes of scalable media. For example, a first key may be required to gain access to a file containing media having a first resolution while a second key may be required to gain access to a file containing media having a second resolution.

According to one embodiment, parameters of the protection profile data may change over time. It should be appreciated that the protection profile data can be remapped to reflect changes made to a sequence of data to which it is associated.

Figure 11:
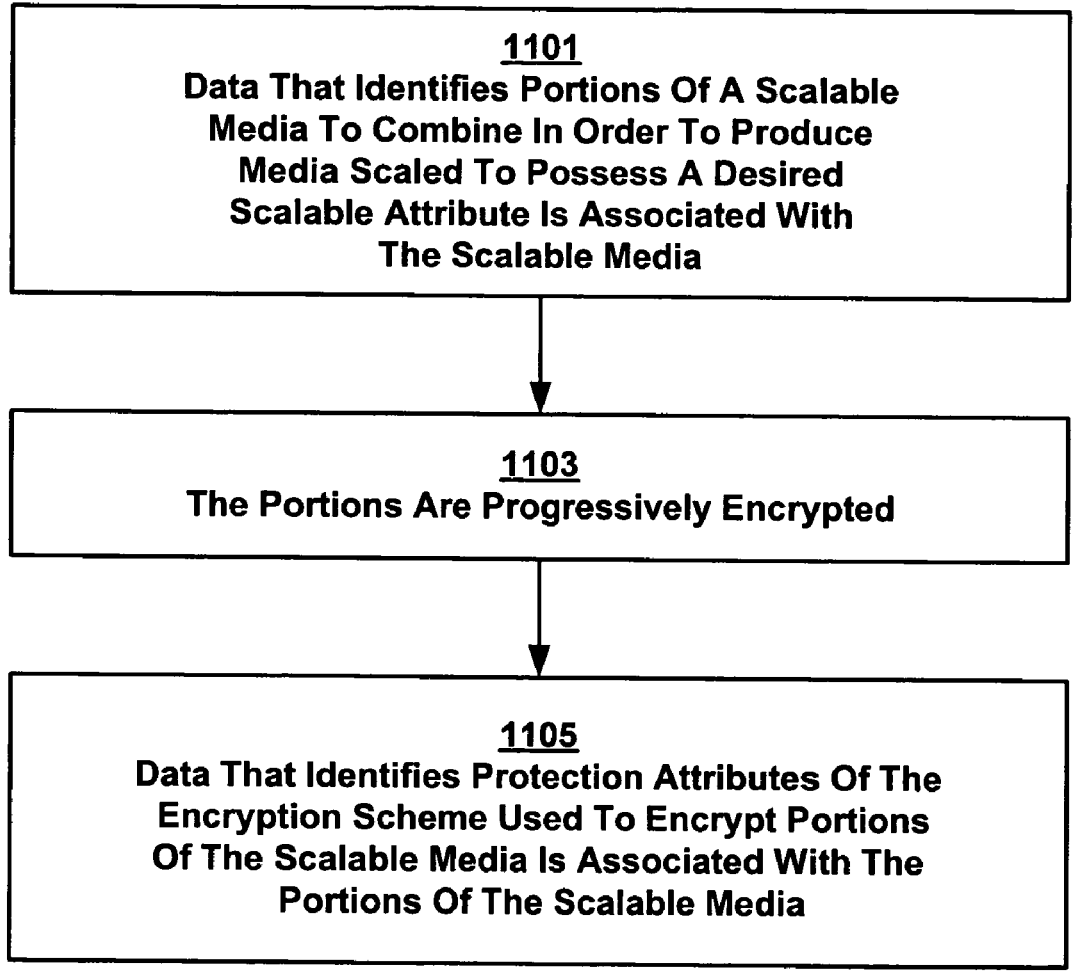
FIG. 11 shows the steps performed in a method for associating data with portions of a scalable media according to one embodiment of the present invention.

FIG. 11 shows the steps performed in a method for scaling portions of a scalable media according to one embodiment of the present invention. At step 1101, data is associated with scalable media that identifies portions of the scalable media to combine in order to produce media that is scaled to possess a desired scalable attribute. In the present embodiment, the scalable profile data that is associated with the individual portions of scalable media may be coupled to the scalable media or signaled remotely. At step 1103, the portions of the scalable media identified in step 1101, are encrypted. According to one embodiment, as discussed herein, the scalable media portions that constitute the scalable media can be encrypted using the same or different schemes.

At step 1105, data is associated with the identified portions of the scalable media that identifies protection attributes of the encryption scheme used to encrypt the identified portions of the scalable media. In the present embodiment, the protection profile data that is associated with the individual portions of scalable media may be coupled to the scalable media or signaled remotely.

Figure 12:
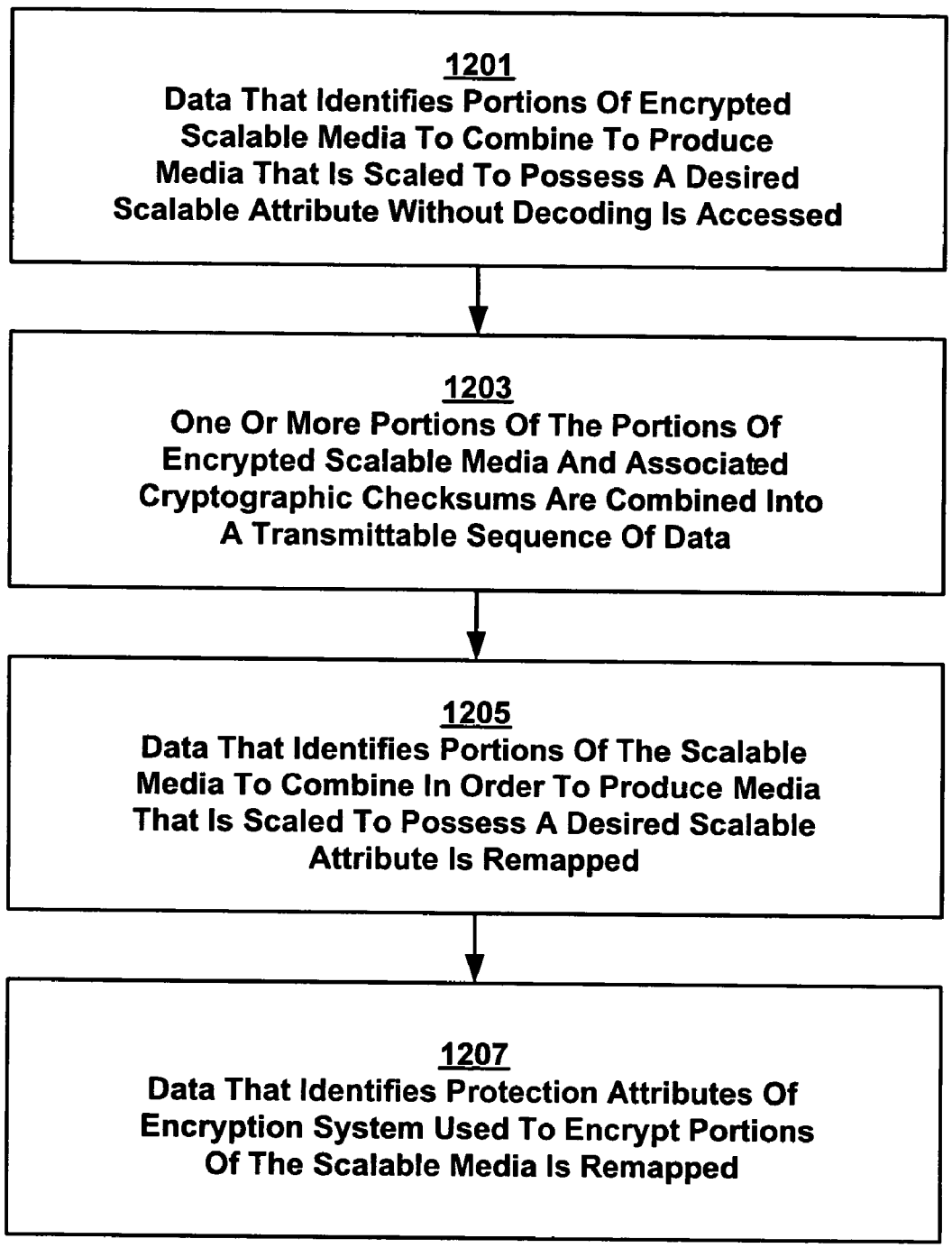
FIG. 12 is a flowchart of the steps performed in a method of scaling encrypted scalable media according to one embodiment of the present invention.

FIG. 12 is a flowchart of the steps performed in a method of scaling encrypted scalable media without decoding according to one embodiment of the present invention. At step 1201, data is accessed that is associated with the encrypted scalable media and that identifies portions of the encrypted scalable media to combine in order to produce media that is scaled to possess a desired scalable attribute. At step 1203, one or more of the portions of the encrypted scalable media and associated cryptographic checksums are combined into a transmittable sequence of data. At step 1205, data associated with the scalable media that identifies portions of the scalable media to combine in order to produce media that is scaled to possess a desired scalable attribute is remapped.

At step 1207, data associated with the portions of the scalable media that identifies protection attributes of the encryption system used to encrypt portions of the scalable media is remapped. It should be appreciated that one or more portions of the encrypted scalable media and associated cryptographic checksums can constitute a scaled version of the encrypted scalable media.

Figure 13:
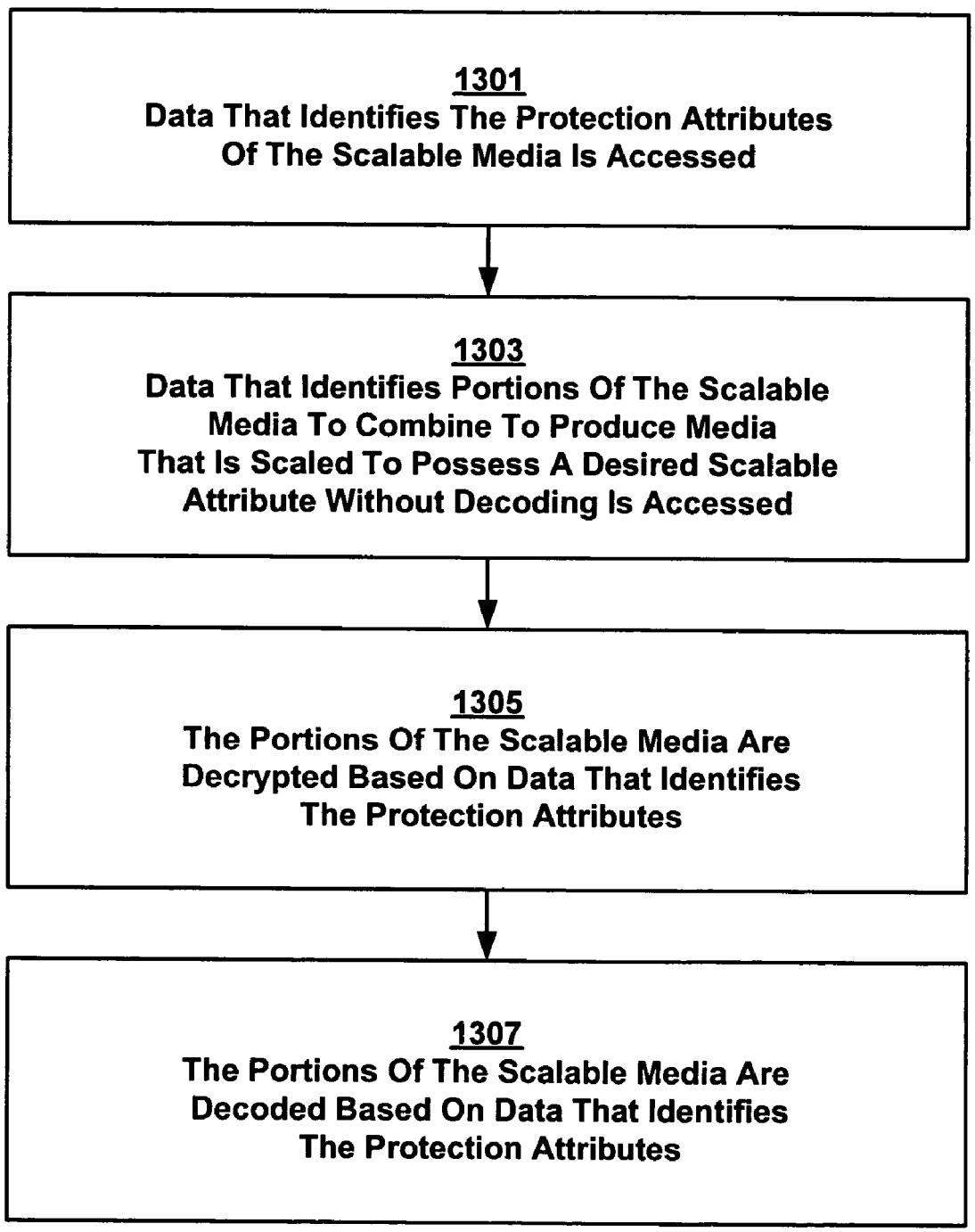
FIG. 13 is a flowchart of the steps performed in a method of decoding scalable media according to one embodiment of the present invention.

FIG. 13 is a flowchart of the steps performed in a method of decoding scalable media according to one embodiment of the present invention. At step 1301, data associated with portions of the scalable media that identifies protection attributes of the encryption system used to encrypt the portions of the scalable media are accessed. At step 1303, data associated with the scalable media that identifies portions of the scalable media to combine in order to produce media that is scaled to possess a desired scalable attribute is accessed.

At step 1305, the portions of the scalable media are decrypted based on the data associated with the portions of the scalable media that identifies protection attributes of the encryption system used to encrypt them. At step 1307, the portions of the scalable media are decoded based on the data associated with the scalable media that identifies portions of the scalable media to combine in order to produce media that is scaled to possess a desired scalable attribute.

In summary, methods for associating data with portions of a scalable media are disclosed. Data is associated with the scalable media that identifies portions of the scalable media to combine in order to produce media that is scaled to possess a desired scalable attribute. Portions of the scalable media are encrypted. Data is associated with the portions of the scalable media that identifies protection attributes of the encryption scheme used to encrypt the portions of the scalable media.

Scaling Progressively Encrypted Data without Knowledge of Encoding Scheme

Figure 14:
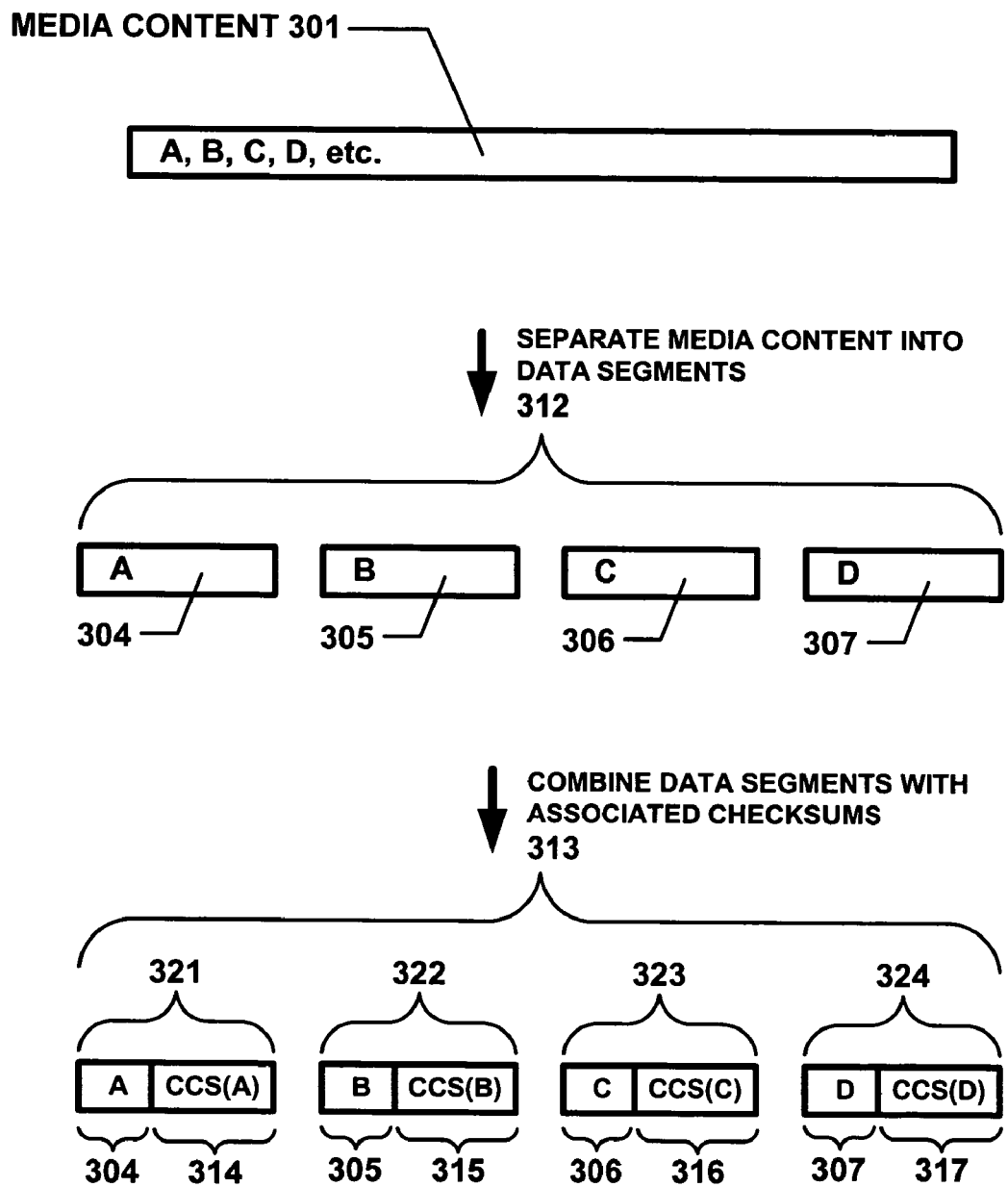
FIG. 14 illustrates a method for encoding a progressively encrypted sequence of scalable data according to one embodiment of the present invention.

FIG. 14 illustrates a method for encoding a progressively encrypted sequence of scalable data according to one embodiment of the present invention.

In the FIG. 14 embodiment, data (e.g., scalable profile data discussed with reference to FIGS. 4A and 4B) is associated with a sequence of scalable data that identifies combinable portions of the sequence of scalable data to combine in order to produce a scaled version of the progressively encrypted sequence of data. In the present embodiment, the scaled version of the progressively encrypted sequence of scalable data is scaled without knowledge of the encoding scheme of the progressively encrypted sequence of scalable data. Moreover, a cryptographic checksum (CCS) can be computed and associated with at least one combinable portion of the progressively encrypted sequence of scalable data. FIG. 14 shows a progressively encrypted sequence of media content 301 that is separated, at 312, into segments 304, 305, 306 and 307 (e.g., combinable portions).

It should be appreciated that each segment (e.g., combinable portion) can include at least one independently decodable part. In the FIG. 14 embodiment, the independently decodable parts are labeled A, B, C and D with each segment including only one independently decodable part. In alternate embodiments, more than one independently decodable part can be included in a segment.

According to one embodiment, a cryptographic checksum can be computed for each segment 304, 305, 306 and 307. In the FIG. 14 embodiment, at 313, after the computation of cryptographic checksums, each identified segment 304, 305, 306 and 307 is associated with a corresponding cryptographic checksum 314, 315, 316 and 317. The identified segments (e.g., combinable portions) and their associated cryptographic checksums are combined into a media segment 321, 322, 323 and 324.

It should be appreciated that the length of each segment, in embodiments of the present invention, is chosen so that its length plus that of its associated CCS is less than the maximum media segment payload size allowable or the maximum transmittable unit (MTU) allowable for the network. As discussed herein, a media segment can comprise a single truncatable unit or a plurality of truncatable units. It is noted also that, though there are four media segments illustrated in FIG. 14, any number of media segments can be used.

It should be appreciated that the terms "independently decodable part" and "truncatable unit" can have different meanings in the descriptions of embodiments of the present invention made herein. An independently decodable part of a media segment is a portion of the media segment's payload that can be decoded without the necessity of decoding other portions of the media segment payload. Moreover, if encrypted, the independently decodable part can be decrypted without the need to decrypt the remainder of the payload. A truncatable unit is a portion of a media segment payload that can be truncated from the media segment, with or without decryption, without detrimentally effecting the remainder of the media segment. It should be appreciated that although the terms can be used somewhat interchangeably, in the discussions made herein they maintain their separate meanings.

Figure 15A:
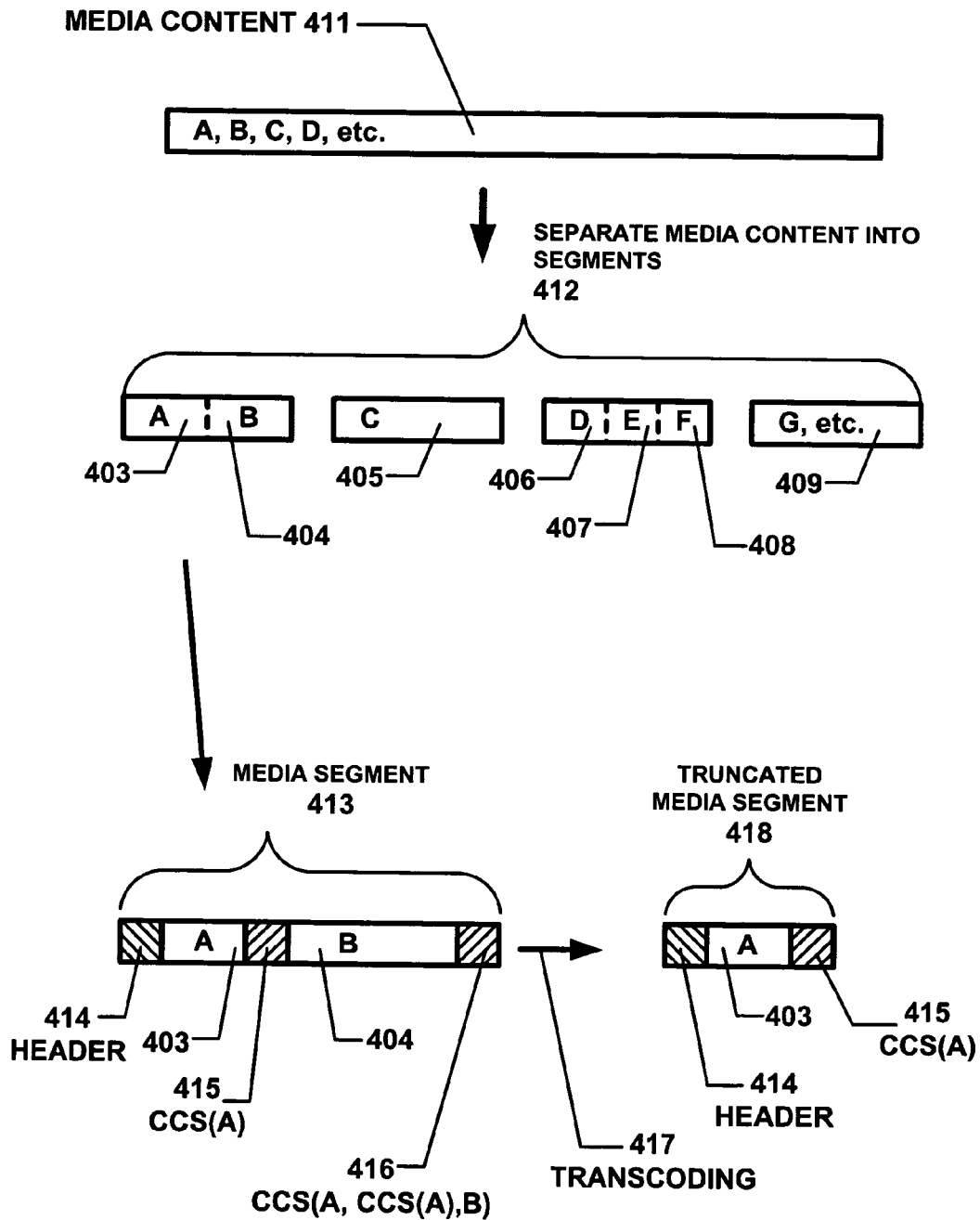
FIG. 15A illustrates the transcoding by truncation of a progressively encrypted sequence of scalable data according to one embodiment of the present invention.

FIG. 15A illustrates the transcoding by truncation of a progressively encrypted sequence of scalable media content according to one embodiment of the present invention. In the embodiment illustrated in FIG. 15A, media content 411 is separated, at 412, into segments, that each comprise one or more independently decodable parts (A, B, etc.). As discussed above with reference to FIG. 14, a media segment's payload can comprise one or more independently decodable parts. Moreover, according to some embodiments, the independently decodable parts can further comprise independently truncatable units.

In the FIG. 15A embodiment, a cryptographic checksum is computed for each of the decodable parts or truncatable units of media segment 413 in order of priority and for the entire preceding packet payload. First, a cryptographic checksum 415 is computed for the first truncatable unit A (e.g., 403) resulting in CCS(A) 415. Subsequently, a cryptographic checksum 416 is computed for the entire preceding media segment payload which includes independently decodable part A (e.g., 403), cryptographic checksum CCS (A) (e.g., 415), and independently decodable part B (e.g., 404). The resulting checksum is shown in FIG. 4A as CCS(A,CCS(A),B), 416. It should be appreciated that, if a third independently decodable part were included, the next cryptographic checksum could be represented as:

CCS(A,CCS(A),B,CCS(A,CCS(A),B),C).

In the present embodiment, a transcoder-readable header, 414, can be associated with media segment 413. According to exemplary embodiments, the transcoder readable header can contain information such as the location of the truncation points in scalable media segments, such as media segment 413, and scalable profile data that identifies segments of the scalable media segment data (e.g., media segment) that can be extracted in order to produce media that is scaled to possess a desired scalable attribute. In alternate embodiments, scalable profile data can reside in the middle the end or at different locations in the scalable media segment.

In the present embodiment, when a transcoding session is conducted (e.g., 417) the transcoder can truncate selected truncatable units in order to achieve a desired scaling result. According to exemplary embodiments, if a media segment being transcoded is encrypted, decryption is not required in order to perform this form of transcoding. In the example illustrated in FIG. 14A, truncatable unit B and its associated cryptographic checksum, 416, are truncated. The untruncated, and undecrypted, remainder of the media segment, 418, is then forwarded with its necessary cryptographic checksum, CCS(A) 415, independently decodable part A 403, and header 414, intact.

In the embodiment of the present invention illustrated in FIG. 15A, any number of truncatable units and their associated cryptographic checksum can be truncated from a media segment as necessary to meet transcoding requirements (e.g., to obtain a desired scalable attribute). In each case, the truncatable unit, its associated cryptographic checksum and subsequent truncatable units whose cryptographic checksums include calculation for the truncated units are also truncated.

Figure 15B:
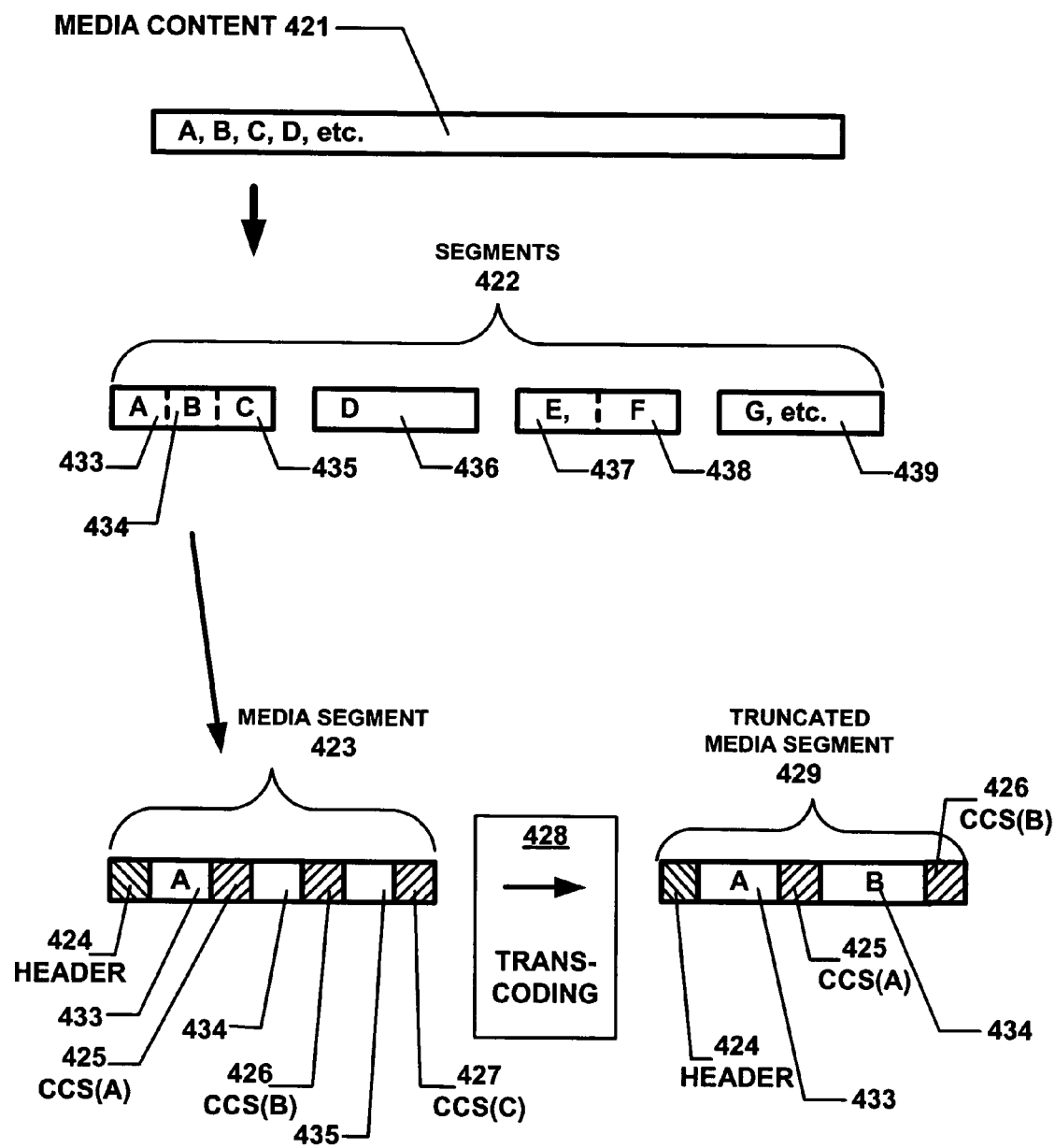
FIG. 15B illustrates the transcoding by truncation of a progressively encrypted sequence of scalable data according to an alternate embodiment of the present invention.

FIG. 15B illustrates the transcoding by truncation of a progressively encrypted sequence of scalable media content according to an alternate embodiment of the present invention. In the FIG. 15B embodiment, media content 421 is separated at 422 into segments which, as discussed above, may comprise any number of independently decodable parts, shown as A, B, C, D, etc. It is noted that, in this example, some segments comprise more independently decodable parts than others because of the size of each part (see FIG. 15B). In the FIG. 15B embodiment, the selection of the number of independently decodable parts is, predicated on the maximum size of the media segment. For example, independently decodable parts A, (e.g., 433), B (e.g., 434), and C (e.g., 435), are combined in one segment while independently decodable part D, 436, constitutes a similarly-sized segment by itself.

In the embodiment illustrated in FIG. 15B, a cryptographic checksum is calculated for each independently decodable part. According to this embodiment, the calculation of the cryptographic checksum is made independently of other independently decodable parts. Media segment 423 is formed from the combination of independently decodable part A (e.g., 433) and CCS(A) (e.g., 425), independently decodable part B (e.g., 434) and CCS(B) (e.g., 426), and independently decodable part C (e.g., 435) and CCS(C) (e.g., 427).

In the embodiment illustrated in FIG. 15B, the transcoding 428, of media segment 423 then involves truncating the selected independently decodable parts, or truncatable units, and their associated cryptographic checksums. In the example illustrated in FIG. 15B, truncatable unit C (e.g., 435) and CCS(C) (e.g., 427) are truncated. In this embodiment, transcoder-readable header 424 remains intact and retains it's information regarding the truncation points. Truncated media segment 429, therefore, is available to be transcoded by truncation subsequently by truncating either truncatable unit B (e.g., 434) and CCS(B) (e.g., 426) or truncatable unit A (e.g., 433) CCS(A) (e.g., 425).

In this fashion, transcoding can occur at any desired point in a network without any media segment having to be decrypted and re-encrypted to achieve a desired transcoding result. After each truncation, the remainder of the media segment, undecrypted, retains its necessary cryptographic checksums, and the security of the data remains intact.

It should be appreciated, in some embodiments, transcoding can be executed by deleting entire media segments from the media content. It is also noted that cryptographic checksums can also be used in unencrypted media streams, such as for media segment verification.

Figure 16A:
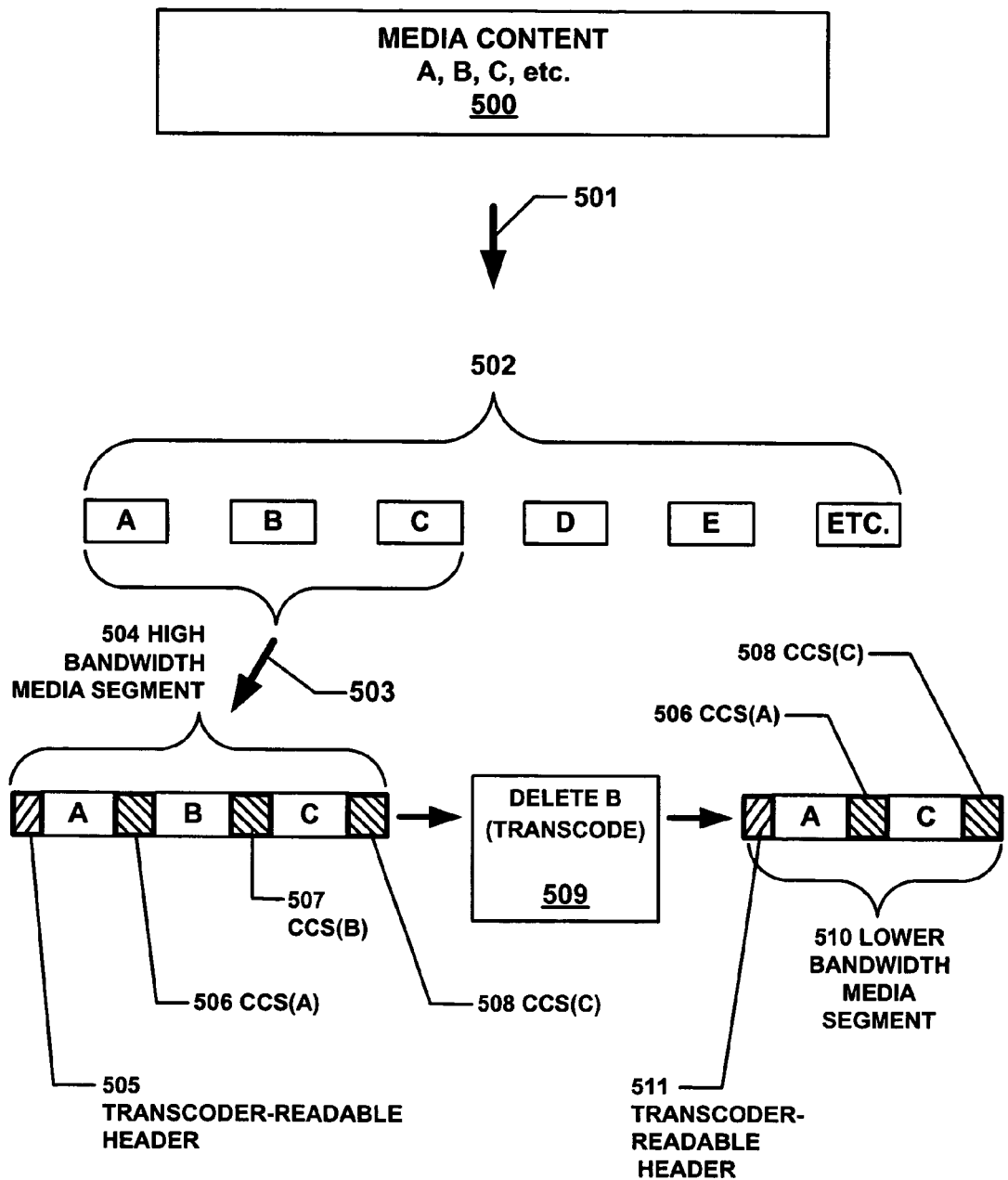
FIG. 16A illustrates the transcoding by truncation of a progressively encrypted sequence of scalable data according to one embodiment of the present invention.

FIG. 16A illustrates the transcoding of a progressively encrypted sequence of scalable media content according to one embodiment of the present invention. In the FIG. 16A embodiment, media content 500 (constituted by scalable data portions A, B and C, etc.) is separated (e.g., 501), into truncatable units (e.g., 502). Each media segment payload, in the secure media stream, is encrypted (e.g., 503) and appended with an independent cryptographic checksum (CCS). Referring to FIG. 16A, the cryptographic checksums are designated as CCS(A) (e.g., 506), CCS(B) (e.g., 507), and CCS(C) (e.g., 508). According to exemplary embodiments, the encrypted truncatable units, along with their associated cryptographic checksums, are combined to form appropriate length transmittable media segment (see FIG. 16A).

It is noted here that cryptographic checksums may be of many different types. A common checksum can involve a well-known hash function, which provides a fingerprint of the data contained in an encrypted media segment and can guarantee the authenticity of received data and the validity of decrypted data. Other examples of checksum functions that can be used to provide cryptographic checksum capability include Message Authentication Codes (MAC), keyed hashes such as MD4 & MD5 (Message Digest algorithms), SHA (Secure Hash Algorithm), RIPEMD (RACE Integrity Primitives Evaluation Message Digest), and HMAC (keyed-Hashing for Message Authentication). Also, in some implementations, digital signature schemes may also be used.

In another embodiment of the present invention, the separation of data segments into truncatable units is referred to as secure scalable streaming (SSS). Each media segment can be transcoded by truncating the media segment at appropriate truncation points which may be defined in a header included in the media segment. For example, during transcoding, bit rate reduction, frame rate reduction, or the like is achieved by truncating, or eliminating, one or more truncatable units from the media segment.

In the FIG. 16A embodiment, a transcoder-readable header 505 is written and coupled to a transmittable media segment. As discussed with reference to FIG. 16A, above, the transcoder-readable header (e.g., scalable profile data, protection profile data, etc.) includes information relating to the media segment payloads accompanying the media segment but does not disclose the contents of the media segment's payloads. By reading the transcoder-readable header, the transcoder can delete portions (e.g., 509) or "scale down" a transmittable media segment without decrypting either the deleted part or the remainder of the media segment, as is illustrated in FIG. 16A at 510. In the example shown, independently decodable part B with its associated cryptographic checksum, is deleted with no effect on independently decodable parts A or C or their associated cryptographic checksums. Consequently, end-to-end security of the streamed media data is maintained and a receiver of the streamed media can validate the integrity of the transcoded data.

Figure 16B:
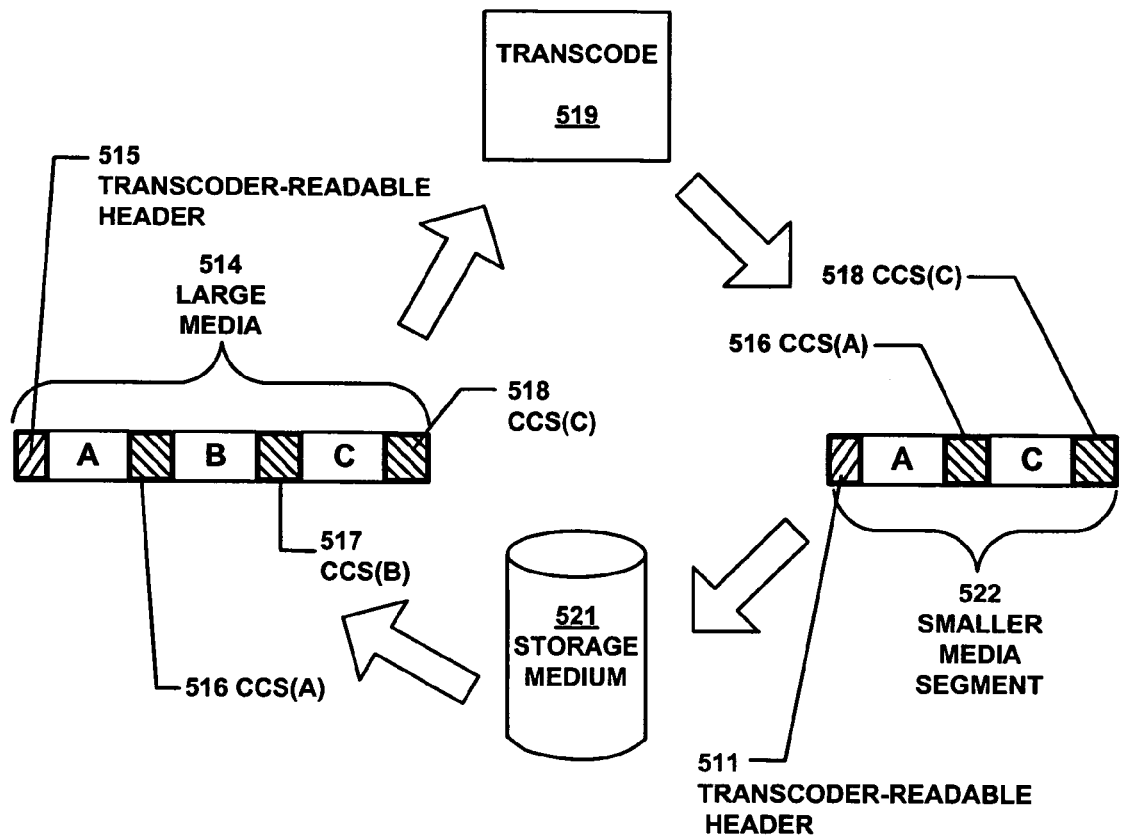
FIG. 16B illustrates the transcoding by truncation of a progressively encrypted sequence of scalable data according to one embodiment of the present invention.

In the embodiments illustrated in FIGS. 16A and 16B, after transcoding is completed, a new transcoder-readable header, 511, may be written to reflect the content of the newly constituted media segment, 510. As in the previous transcoder-readable header, information about the start and end points of the included media segment payloads and the media segment payload priority can be included but information disclosing the contents is not. Moreover, because the new transcoder-readable header can be written by a transcoder that does not have the key with which to decrypt the media segment payloads or to evaluate the CCSs, the new transcoder-readable header is not capable of disclosing media segment payload contents.

With a new transcoder-readable header, possible further transcoding and scaling can be performed at other downstream locations. In addition to media segment payload size and location, media segment payload priority can be included in the transcoder-readable header. For example, priority information can be included, such as that identifying components of a web page that are considered discardable by the web page owner. In the case of transmission to a handheld device with a lower display capability than a large desktop computer, much of the information in complex web pages can be lost. By making lower priority information removable in early transcoding, valuable bandwidth can be preserved for other uses when transmitting data to such smaller devices.

Embodiments of the present invention are enabled to process media segments that are not streamed. FIG. 16B illustrates, in block format, the process of another embodiment. Here, stored data is manipulated without disturbing the cryptographic checksums. Large media segment 514, comprising segments A, B, & C, is taken from storage medium 521. In the example of FIG. 16B, data is in essence compressed to reduce storage space. This is accomplished by the removal of a segment of data, in this case segment B, and its associated CCS, 517, by transcoding, 519. The result of such transcoding is the smaller media segment 522. It is noted that transcoding in this manner leaves segments A and C intact and, significantly, CCS(A) 516 and CCS(C) 518, are undisturbed. If necessary to later operations, transcoder-readable header 515 can be replaced by new transcoder readable header 511.

It is noted that the transcoding schemes provided by embodiments of the present invention are not limited to streamed data but can also be used wth stored data. Additionally, the transcoding techniques are useful for unencrypted data as well as encrypted data. In either case, transcoding can occur without disruption of the cryptographic checksums and without having to read the encoded data.

In the present embodiment, media segments may be any appropriate division that allows one or more of the segments and their associated cryptographic checksums, to fit into a communication media segment. An example of appropriately separated independently decodable parts is parts of highly detailed compressed images, such as can be transmitted with the compression standard developed by the Joint Picture Expert Group (JPEG), for example JPEG-2000.

It should be appreciated that in many instances, the first data transmitted contains data sufficient to produce a highly pixilated image. Subsequently transmitted data then successively refines the image detail. The presentation of such an image on a large display can make use of the enhanced detail. However, the display on a handheld computer may show no difference between the image after the first refinement and the image after the last and most highly detailed refinement. Consequently, a logical transcode can remove the more highly detailed data from the stream if the receiver is unable to use the detail. In some instances of transmitted data, a single packet may contain data comprising several levels of detail. However, some larger images may require several media segments to carry all the requisite data.

Figure 17:
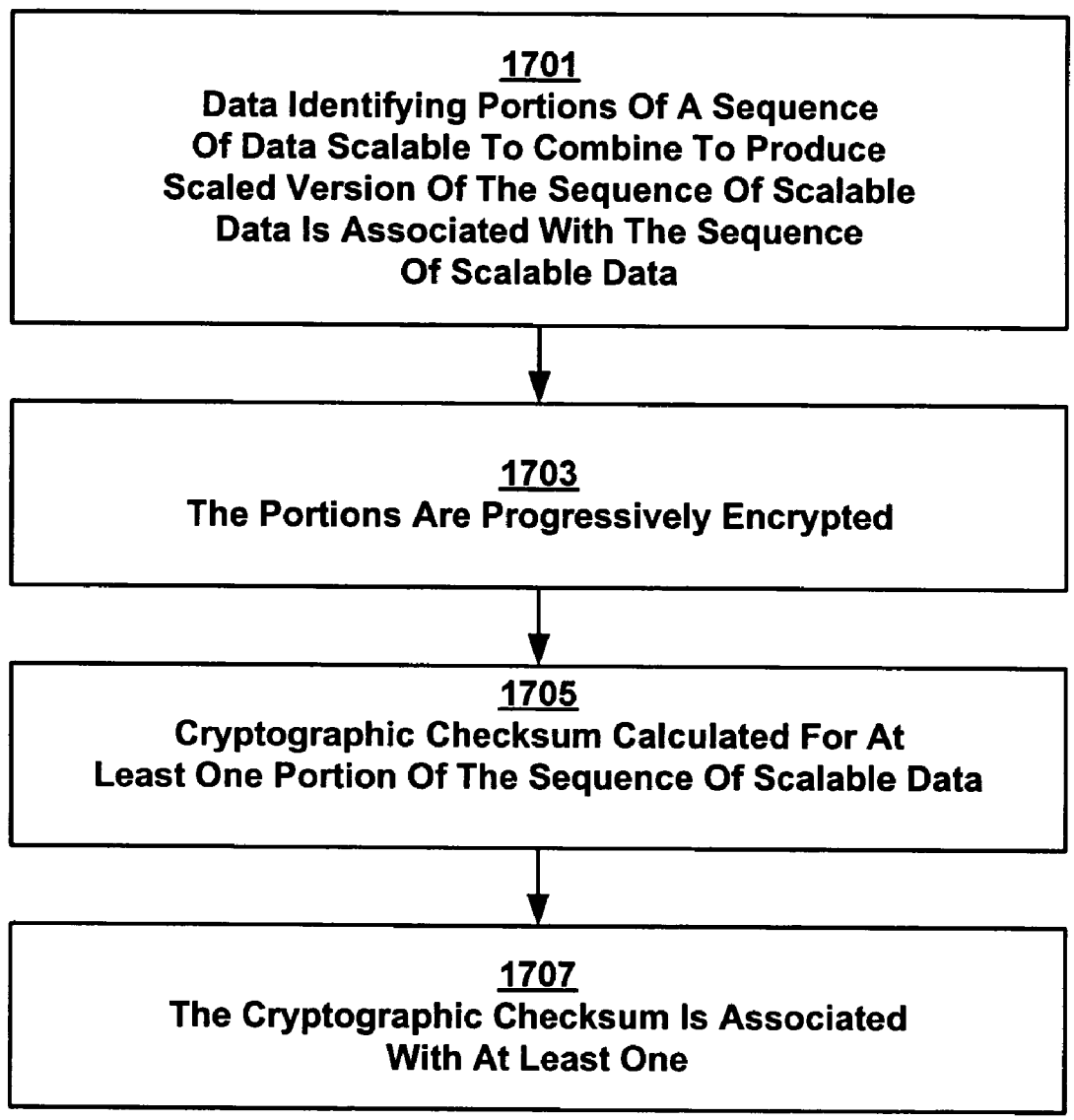
FIG. 17 is a flowchart of the steps performed in a method for encoding a progressively encrypted sequence of scalable data according to one embodiment.
Figure 18:
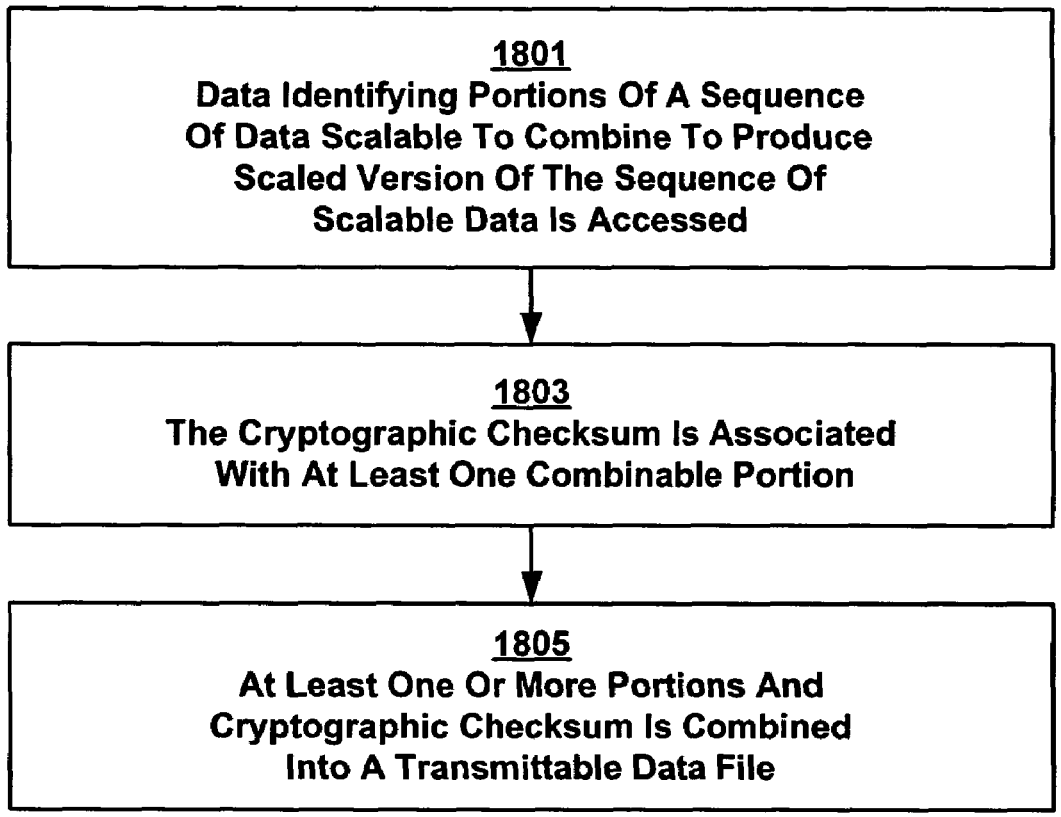
FIG. 18 is a flowchart of the steps performed in a method of transcoding a progressively encrypted sequence of scalable data according to one embodiment.
Figure 19:
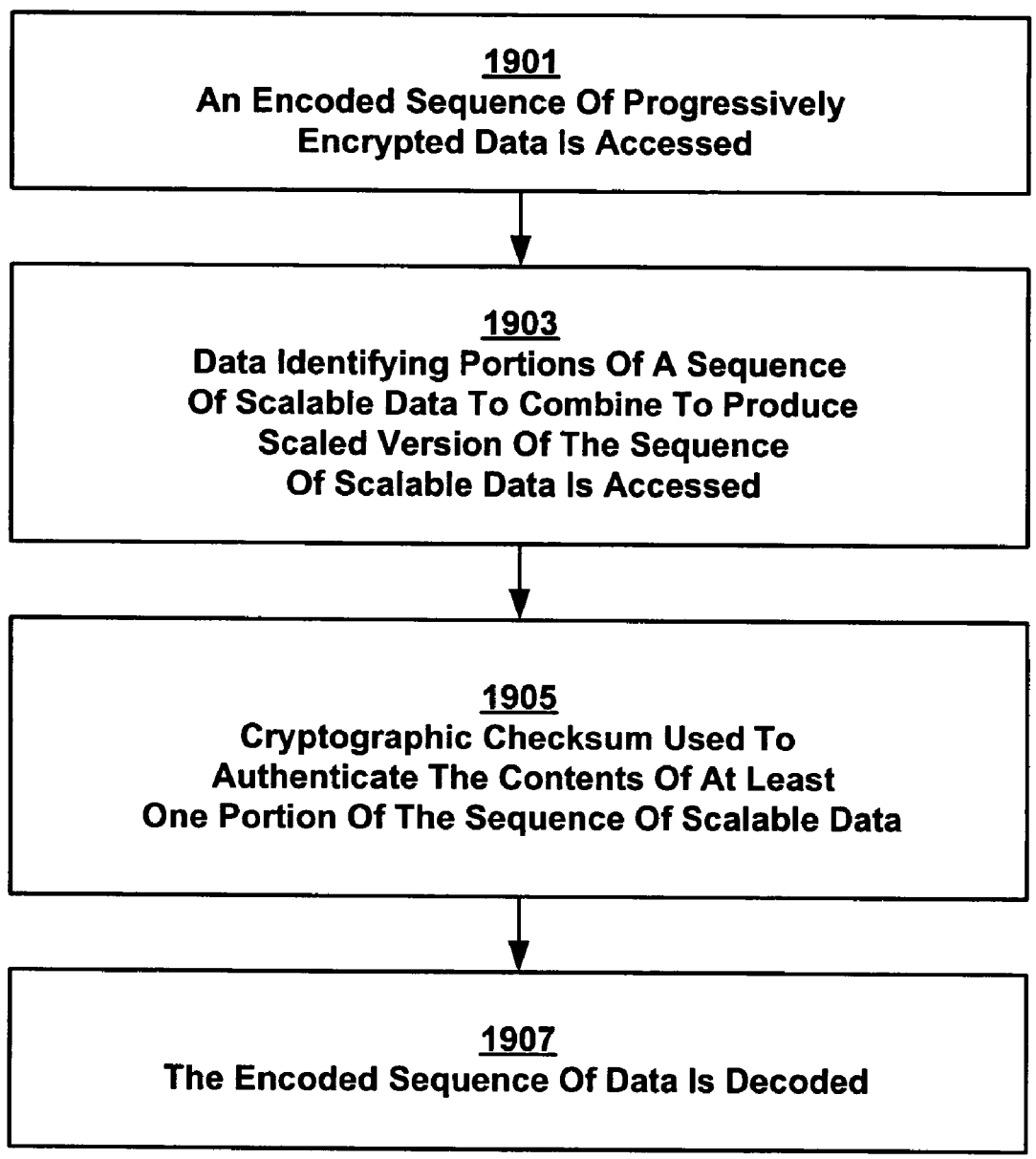
FIG. 19 is a flowchart of the steps performed in a method of decoding a progressively encrypted sequence of scalable data according to one embodiment of the present invention.

FIGS. 17–19 are flowcharts of the steps performed in methods for scaling progressively encrypted data without knowledge of its encoding scheme. Although specific steps are disclosed in the flowcharts, such steps are exemplary. That is, embodiments of the present invention are well-suited to performing various other steps or variations of the steps recited in the flowcharts. It is appreciated that the steps in the flowcharts may be performed in an order different than presented, and that not all of the steps in the flowcharts may be performed. All of, or a portion of, the methods described by the flowcharts may be implemented using computer-readable and computer-executable instructions which reside, for example, in computer-usable media of a computer system.

FIG. 17 is a flowchart of the steps performed in a method for encoding a progressively encrypted sequence of scalable data according to one embodiment. At step 1701, data is associated with a progressively encrypted sequence of scalable data that identifies combinable portions of the progressively encrypted sequence of scalable data to combine in order to produce a version of the progressively encrypted sequence of scalable data that is scaled to possess a desired scalable attribute. According to one embodiment, the scaled version of said progressively encrypted sequence of scalable data is scaled without being decoded. At step 1703, a cryptographic checksum is computed for at least one portion of the progressively encrypted sequence of scalable data. At step 1705, a cryptographic checksum is associated with at least one portion of the progressively encrypted sequence of scalable data.

FIG. 18 is a flowchart of the steps performed in a method of transcoding a progressively encrypted sequence of scalable data according to one embodiment. At step 1801, data associated with the progressively encrypted sequence of scalable data is accessed that identifies combinable portions of the progressively encrypted sequence of scalable data to combine in order to produce a scaled version of the sequence of data that is scaled to possess a desired scalable attribute. According to one embodiment, the scaled version of said progressively encrypted sequence of scalable data is scaled without being decoded. At step 1803, one or more of the combinable portions of the progressively encrypted sequence of scalable data and their associated cryptographic checksums are combined into a transmittable sequence of data.

FIG. 19 is a flowchart of the steps performed in a method of decoding a progressively encrypted sequence of scalable data according to one embodiment of the present invention. At step 1801, an encoded and progressively encrypted sequence of scalable data is accessed. At step 1803, data associated with the encoded and progressively encrypted sequence of scalable data is accessed that identifies how combinable portions of the progressively encrypted sequence of scalable data are to be scaled to achieve a desired scalable attribute. In the present embodiment, scaling is accomplished without decoding the progressively encrypted sequence of scalable data.

At step 1905, a cryptographic checksum is used in order to authenticate the contents of at least one combinable portion of the progressively encrypted sequence of scalable data. At step 1907, the encoded and progressively encrypted sequence of scalable data is decoded based on the data that is associated with the encoded and progressively encrypted sequence of scalable data. This data identifies how combinable portions of the encoded and progressively encrypted scalable data are to be scaled to achieve a desired scalable attribute.

According to one embodiment, at least one combinable portion of the progressively encrypted scalable data and a cryptographic checksum can be encrypted. In exemplary embodiments, at least one combinable portion can be enabled to be decrypted independently of other combinable portions that constitute the progressively encrypted scalable data. Moreover, a cryptographic checksum can be computed for each combinable portion of the progressively encrypted sequence of scalable data.

According to one embodiment, the at least one combinable portion of the progressively encrypted sequence of scalable data is enabled to be decrypted independently of other portions comprising said progressively encrypted sequence of scalable data. In the present embodiment, the progressively encrypted sequence of scalable data comprises a plurality of combinable portions. Moreover, a first cryptographic checksum can be calculated for a first combinable portion of said progressively encrypted sequence of scalable data, and a second cryptographic checksum can be calculated for the combination of a second combinable portion of the progressively encrypted sequence of scalable data, the first combinable portion of the progressively encrypted sequence of scalable data, and the first cryptographic checksum.

According to one embodiment, the cryptographic checksum can be computed using a hash function. In addition, the data associated with the encoded and progressively encrypted sequence of scalable data can include information related to the combinable portions of the progressively encrypted sequence of scalable data and the cryptographic checksums. It should be appreciated that the data associated with the encoded and progressively encrypted sequence of scalable data can enable the transcoding of the progressively encrypted sequence of scalable data.

According to one embodiment the combinable portions of the progressively encrypted sequence of scalable data and the cryptographic checksums can be enabled to be encrypted independently of a transcoder readable header. Moreover, the combinable portions of the progressively encrypted sequence of scalable data and the cryptographic checksums can be enabled to be decrypted independently of the data associated with the progressively encrypted sequence of scalable data. In addition, the data associated with the progressively encrypted sequence of scalable data can be enabled to be read independently of the combinable portions of the progressively encrypted sequence of scalable data and the cryptographic checksums.

According to one embodiment, a cryptographic checksum can be computed based on one of the combinable portions of the progressively encrypted sequence of scalable data. The cryptographic checksum can be computed based on a plurality of combinable portions and associated checksums. Moreover, the cryptographic checksum can be calculated using a hash function. In an alternative embodiment, the cryptographic checksum can be calculated using a message digest function.

According to one embodiment, the cryptographic checksum can be calculated using a message authentication code function. In another embodiment, the cryptographic checksum can be calculated using a keyed-hashing-for-message-authentication function. In yet another embodiment, the cryptographic checksum can be calculated using a digital signature function.

According to one embodiment, the data associated with the progressively encrypted sequence of scalable data is enabled to be written independently of combinable portions of the progressively encrypted sequence of scalable data and the cryptographic checksums. It should be appreciated that each of the combinable portions of the progressively encrypted sequence of scalable data can be enabled to be extracted from a transmittable packet independently of other combinable portions of the progressively encrypted sequence of scalable data in the packet.

In the present embodiment, data that is associated with the progressively encrypted sequence of scalable data includes information related to the combinable portions of the progressively encrypted sequence of scalable data and a cryptographic checksum. According to one embodiment, the data associated with the progressively encrypted sequence of scalable data enables the transcoding of a data packet.

It should be appreciated that the combinable portions of the progressively encrypted sequence of scalable data and the cryptographic checksums can be enabled to be encrypted independently of a transcoder readable header. In one embodiment, the combinable portions of the progressively encrypted sequence of scalable data and the cryptographic checksums are enabled to be decrypted independently of the data associated with the encoded and progressively encrypted sequence of scalable data. Moreover, the data associated with the progressively encrypted sequence of scalable data can be enabled to be read independently of the combinable portions of the progressively encrypted sequence of scalable data and the cryptographic checksums.

In summary, the methods of the present invention provide a method for scaling a progressively encrypting sequence of scalable data for scaling a progressively encrypted sequence of scalable data without having knowledge of its encryption scheme. The method includes associating data with the progressively encrypted sequence of scalable data that identifies combinable portions of the progressively encrypted sequence of scalable data to combine in order to produce a scaled version of the progressively encrypted sequence of scalable data. The scaled version of the progressively encrypted sequence of scalable data is scaled to possess a desired scalable attribute. Moreover, the scaled version of the progressively encrypted sequence of scalable data is scaled without being decoded. A cryptographic checksum is computed for at least one combinable portion of the progressively encrypted sequence of scalable data and, a cryptographic checksum is associated with the at least one combinable portion of the progressively encrypted sequence of scalable data.

Encoders

Figure 20:
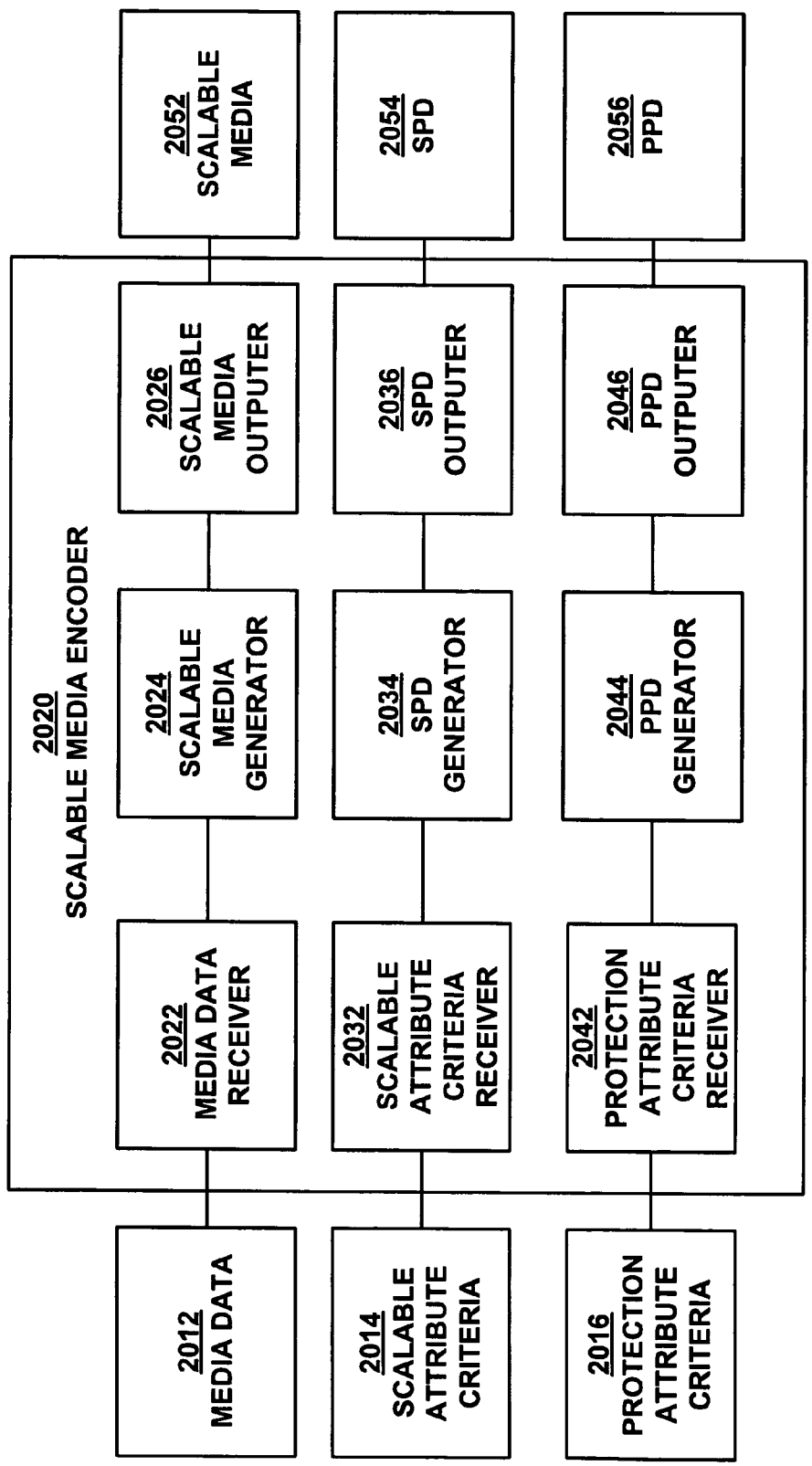
FIGS. 20, 21 and 22 are block diagrams of encoders, according to embodiments of the present invention.

FIG. 20 is a block diagram that depicts a scalable media encoder, according to one embodiment of the present invention.

According to one embodiment, scalable media encoder 2020 is any device, such as a portable communications device, a stationary computing device, or a digital image capturing device, that can encode any type of scalable media using an encoding scheme such as JPEG 2000 or MPEG. Examples of portable communications devices include, but are not limited to, pocket personal computers, laptops, digital cameras, video cameras and cell phones. Examples of stationary computing devices include, but are not limited to, personal computers, televisions, and servers. The servers may be ASIC servers. Examples of digital image capturing devices include, but are not limited to, digital cameras and video cameras.

According to one embodiment, scalable media encoder 2020 receives media data 2012, scalable attribute criteria 2014, and protection attribute criteria 2016. The scalable attribute criteria 2014 may list scalable attributes that the scalable media encoder 2020 may use for generating the segments of the scalable media 2052 that may be extracted by another device, as described herein. Examples of scalable attributes include but are not limited to resolution, bitrate, color, as described herein. Examples of devices that may extract segments include but are not limited to translators and decoders.

In yet another embodiment, as depicted in FIG. 20, scalable media encoder 2020 includes a media data receiver 2022 that is configured to receive media data 2012. Media data 2012 may be scalable media such as an image in JPEG 2000 format or a non-scaled image such as a scanned image of a picture, according to one embodiment.

Scalable media encoder 2020, further includes, as depicted in FIG. 20, a scalable media generator 2024 that is coupled to media data receiver 2022, according to one embodiment. For example, in one embodiment, scalable media generator 2024 may generate scalable media 2052, in the case where media data 2012 is a non-scaled image.

Still referring to FIG. 20, scalable media encoder 2020, also includes a scalable media outputter 2026 that is coupled to scalable media generator 2024 and that is adapted to outputting scalable media 2052, in one embodiment.

Scalable media encoder 2020, as depicted in FIG. 20, further includes a scalable attribute criteria receiver 2032 that is configured to receive scalable attribute criteria 2014, according to one embodiment. In yet another embodiment, scalable attribute criteria receiver 2032 is coupled to a scalable profile data generator 2034 that is adapted to generate scalable profile data 2054, which may include segments that another device, such as a translator or a decoder, may extract from scalable media 2052 to achieve the desired results for one or more scalable attributes, as described herein. The scalable profile data generator 2034, in yet another embodiment, is coupled to a scalable profile data outputter 2036 which is adapted for outputting scalable profile data 2054.

Still referring to FIG. 20, scalable media encoder 2020, according to one embodiment, further includes a protection attribute criteria receiver 2042 that is configured to receive protection attribute criteria 2016, as already described herein. The protection attribute criteria receiver 2042, according to still another embodiment, is coupled to a protection profile data generator 2044 that is adapted to generate protection profile data 2056 based, at least in part, on the protection attribute criteria 2016 that scalable media encoder 2020 received, according to a embodiments described herein. The protection profile data generator 2044 is coupled to a protection profile data outputter 2046, which is adapted to output the protection profile data 2056, according to another embodiment. In still another embodiment, the scalable media 2052 may be encrypted using the protection profile data 2056, according to embodiments already described herein. In yet another embodiment, the scalable media 2052 may be unencrypted. There are a number of protection mechanisms that may be applied. For example, cryptographic checksums may be applied for integrity checking, or digital signatures for authentication, etc.

According to one embodiment, the scalable attribute criteria receiver 2032 and/or the protection attribute criteria receiver 2042 may be generalized user interfaces (GUIs). For example, a user may use a GUI to enter attributes, such as resolutions, bitrates, etc., to indicate how the scalable media generator 2024 may generate scalable profile data 2054 for those attributes, according to embodiments already described herein. Similarly, a user may use a GUI to enter attributes, such as Data Encryption Standard (DES), encryption modes such as Electronic Code Book (ECB), etc., to indicate how the protection profile data generator 2044 may generate protection profile data 2056 indicating how portions of scalable media 2052 should be or are protected with those attributes, according to embodiments already described herein.

According to one embodiment, the processing performed by scalable media encoder 2020 may be complex or simple. For example, the scalable media generator 2024 of scalable media encoder 2020 may generate scalable media 2052 that may be scaled in many alternative ways or with only a few alternative, as already described herein.

Media data 2012, scalable attribute criteria 2014, and/or protection attribute criteria 2016 may be communicated to scalable media encoder 2020 using a network, according to one embodiment. In another embodiment, media data 2012, scalable attribute criteria 2014, and/or protection attribute criteria 2016 may be retrieved by scalable media encoder 2020 from a storage device, such as a compact disk (CD), a digital video disk (DVD), or a direct access storage device (DASD).

As depicted in FIG. 20, scalable media 2052, scalable profile data 2054, and/or protection profile data 2056 may be transmitted to another device, such as a transcoder or a decoder, using a network, according to one embodiment. According to another embodiment, scalable media 2052, scalable profile data 2054, and/or protection profile data 2056 may be transmitted to another device, such as a transcoder or a decoder, via a storage device, such as a compact disk (CD), a digital video disk (DVD), or a direct access storage device (DASD).

In still another embodiment, two or more of the outputters (2026, 2036, 2046) may be combined. For example, scalable media outputter 2052 and the scalable profile data outputter 2036 may be combined into one outputter. Similarly, scalable media outputter 2026 and protection profile data outputter 2046 may be combined into one outputter. Alternatively, all three outputters (2026, 2036, 2046) may be combined into one outputter.

Scalable media 2052, scalable profile data 2054, and protection profile data 2056 may be separate files or combined together in a single file in any combination, according to one embodiment, For example, scalable media 2052, scalable profile data 2054, and protection profile data 2056 may be in a single file together. In a second example, scalable media 2052 and scalable profile data 2054 may be in a file together, while protection profile data 2056 is in a separate file. In a third example, scalable media 2052 and protection profile data 2056 may be in a file together, while scalable profile data 2054 is in a separate file.

Figure 21:
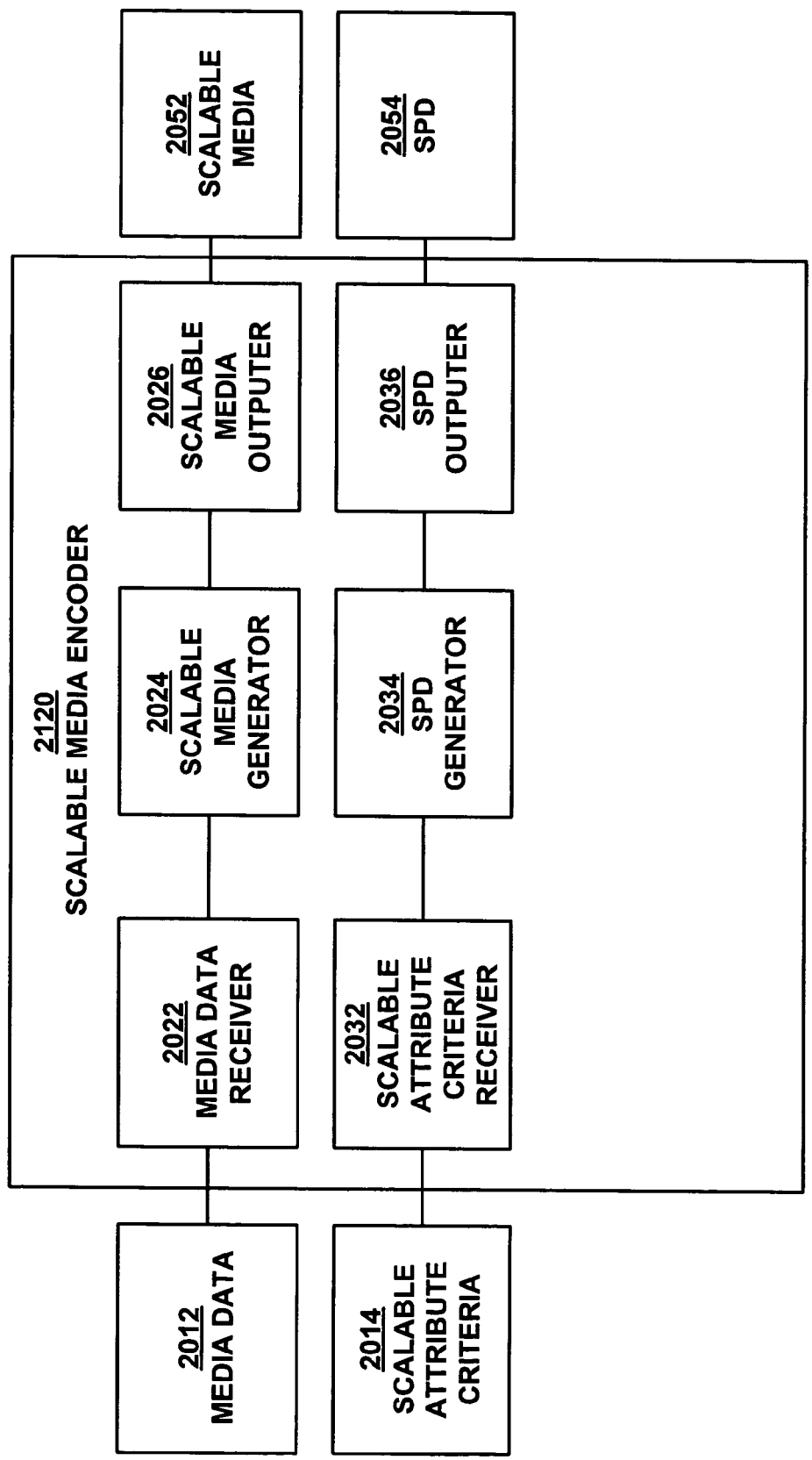

FIG. 21 is a block diagram that depicts a scalable media encoder, according to another embodiment of the present invention. FIG. 21 depicts a scalable media encoder 2120 that is similar to the scalable media encoder 2020 depicted in FIG. 20, except that scalable media encoder 2120 does not include a protection attribute criteria receiver 2042 which receives protection attribute criteria 2016, a protection profile data generator 2044 and a protection profile data outputter 2046 that outputs a protection profile data 2056.

In one embodiment, the process of encrypting the scalable media 2052 may be performed using a web page. For example, since scalable media encoder 2120 does not include a protection attribute criteria receiver 2042, protection profile data generator 2044, and a protection profile data outputter 2046, the scalable media 2052 may be encrypted using protection profile data 2056 some where other than at scalable media encoder 2020, such as a web page.

Figure 22:
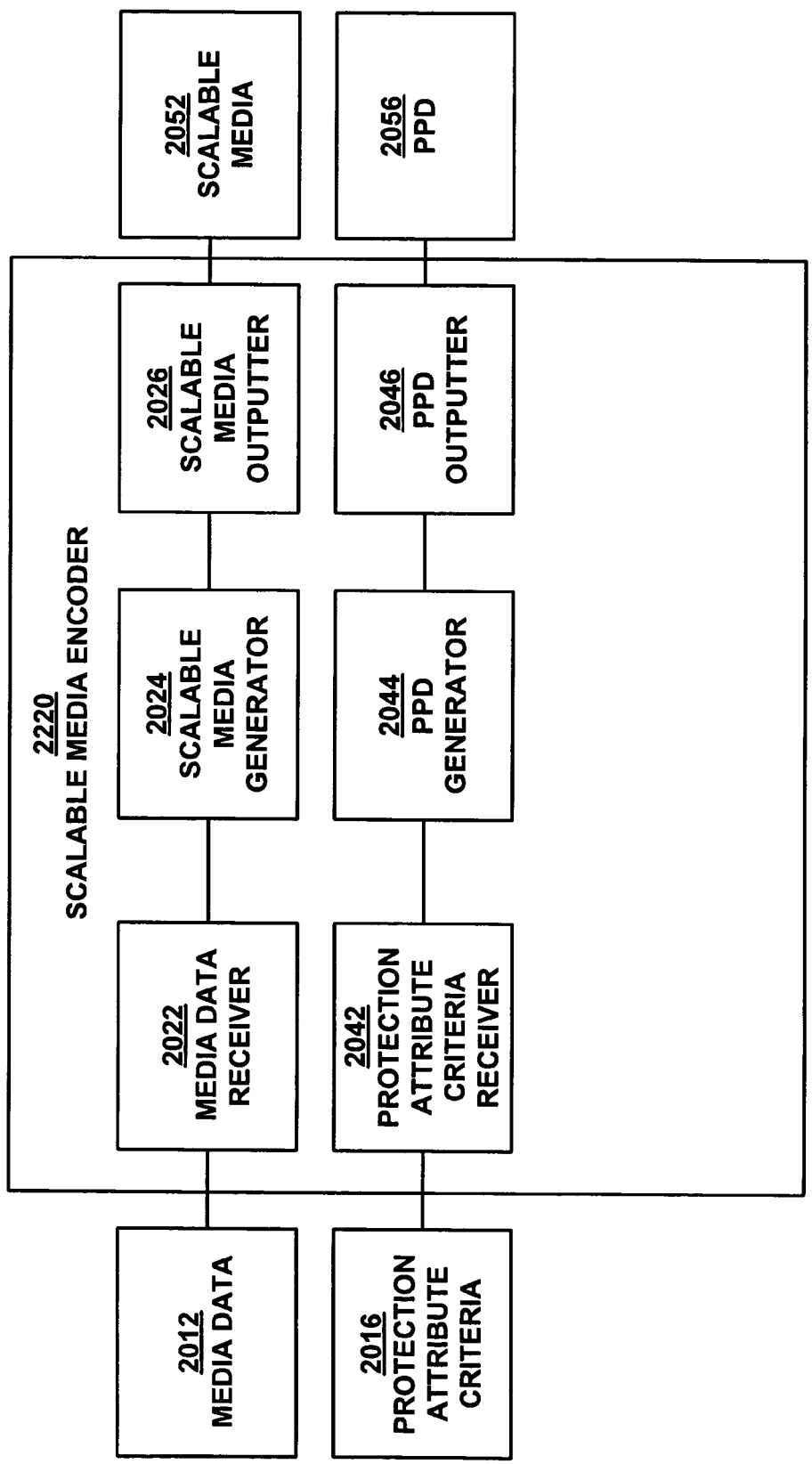

FIG. 22 is a block diagram that depicts a scalable media encoder, according to another embodiment of the present invention. FIG. 22 depicts a scalable media encoder 2220 that is similar to the scalable media encoder 2020 depicted in FIG. 20, except that scalable media encoder 2220 does not include a scalable attribute criteria receiver 2032 which receives scalable attribute criteria 2014, a scalable profile data generator 2034 and a scalable profile data outputter 2036 that outputs a scalable profile data 2054.

Decoders

Figure 23:
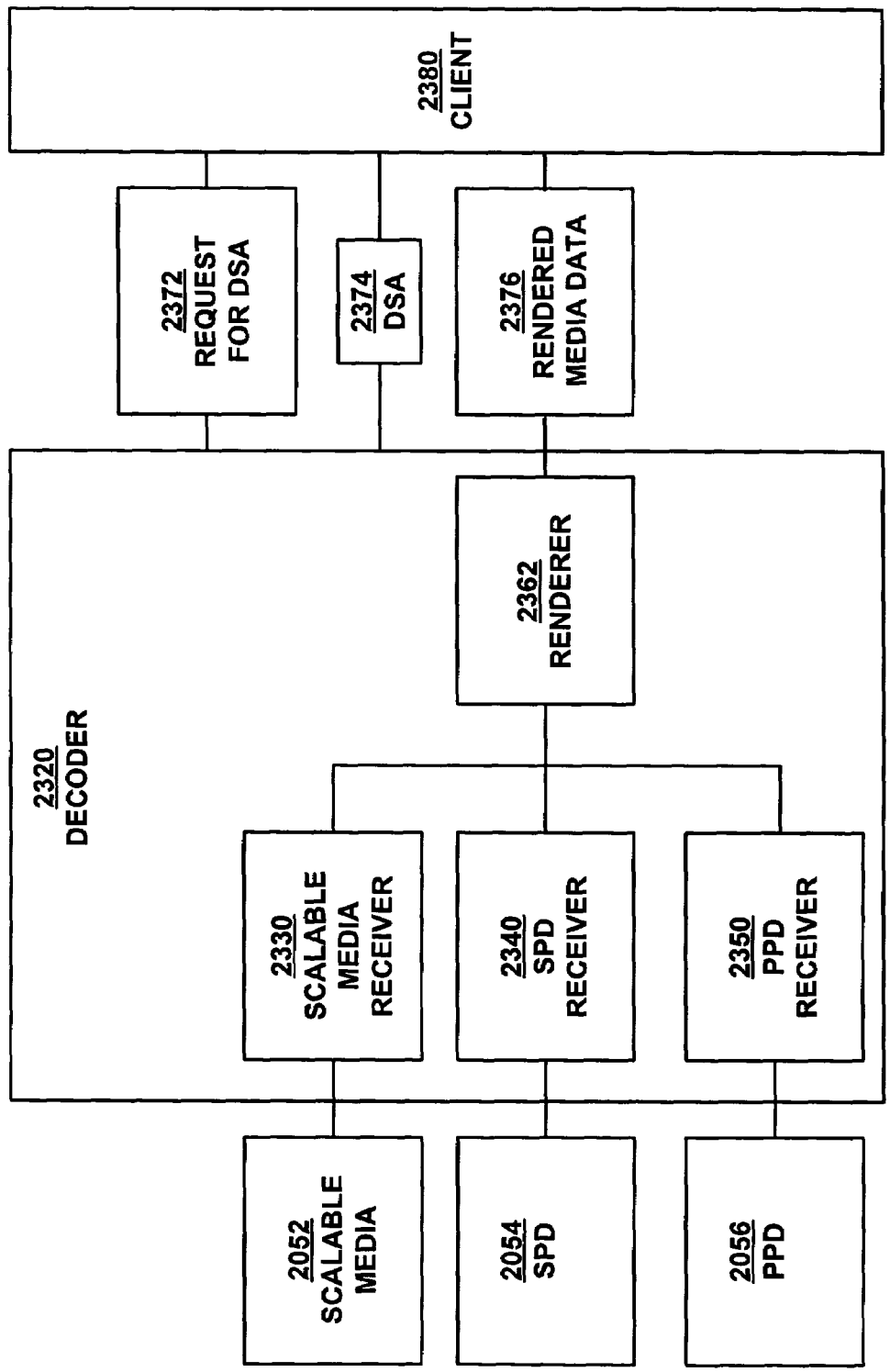
FIGS. 23, 24 and 25 are block diagrams depicting decoders, according to embodiments of the present invention.

FIG. 23 is a block diagram that depicts a decoder, according to one embodiment of the present invention. According to one embodiment, decoder 2320 is any device, such as a portable communications device, a stationary computing device, or a digital image capturing device, that can decode any type of scalable media, such as JPEG 2000 or MPEG.

Typically, users interact with a client device, such as a television, a PDA, a DVD player, or a computer monitor, to request that one or more images be displayed on the client device. A decoder 2320 may communicate with or be a part of a client device 2380. As a part of providing the image to the client device 2380 for viewing by a user, the decoder 2320 and client 2380 may communicate about the client's 2380 capabilities for displaying the images and/or the users desire in how to view the images. As a part of this communication, the decoder 2320 may request the desired scalability attribute 2372. For example, the desired scalability attribute 2372 may indicate the band width that the client 2380 capable of handling or whether the user want to see the images in black and white or in color. The client 2380 may return the desired scalable attribute 2374 to the decoder 2320. Other examples of client devices include, but are not limited to, a portable communications device, a stationary computing device and a digital image capturing device.

There are many legacy decoders that are not capable of decoding and/or decrypting scalable media, such as JPEG 2000 files or MPEG files. According to one embodiment, decoder 2320 is a legacy device. By installing software or components such as scalable media receiver 2330, scalable profile data receiver 2340, protection profile data receiver 2350, and renderer 2362 onto a legacy decoder 2320, that legacy decoder 2320 may become capable of decoding and/or decrypting scalable media 2052, according to embodiments already described herein. For example, renderer 2362 may decode and/or decrypt scalable media 2052 to provide rendered media data 2376 for viewing on client 2380.

As depicted in FIG. 23, scalable media receiver 2330 is configured to receive scalable media 2052, scalable profile data 2054, and protection profile data 2056. According to one embodiment, the scalable media receiver 2330 includes receivers 2330, 2340, 2350 that are configured to receive the scalable media 2052, scalable profile data 2054, and protection profile data 2056. The receivers 2330, 2340, 2350 are coupled to renderer 2362, according to another embodiment. According to embodiments already described herein, renderer 2362 decodes scalable media 2052 using scalable profile data 2054 by extracting portions of scalable media 2052 based on the scalable profile data 2054 and/or decrypts scalable media 2052 using protection profile data 2056.

In still another embodiment, two or more of the receivers (2330, 2340, 2350) may be combined. For example, scalable media receiver 2330 and the scalable profile data receiver 2340 may be combined into one receiver. Similarly, scalable media receiver 2330 and protection profile data receiver 2350 may be combined into one receiver. Alternatively, all three receivers (2330, 2340, 2350) may be combined into one receiver.

Scalable media 2052, scalable profile data 2054, and protection profile data 2056 may be separate files or combined together in a single file in any combination, according to one embodiment, For example, scalable media 2052, scalable profile data 2054, and protection profile data 2056 may be in a single file together. In a second example, scalable media 2052 and scalable profile data 2054 may be in a file together, while protection profile data 2056 is in a separate file. In a third example, scalable media 2052 and protection profile data 2056 may be in a file together, while scalable profile data 2054 is in a separate file.

Figure 24:
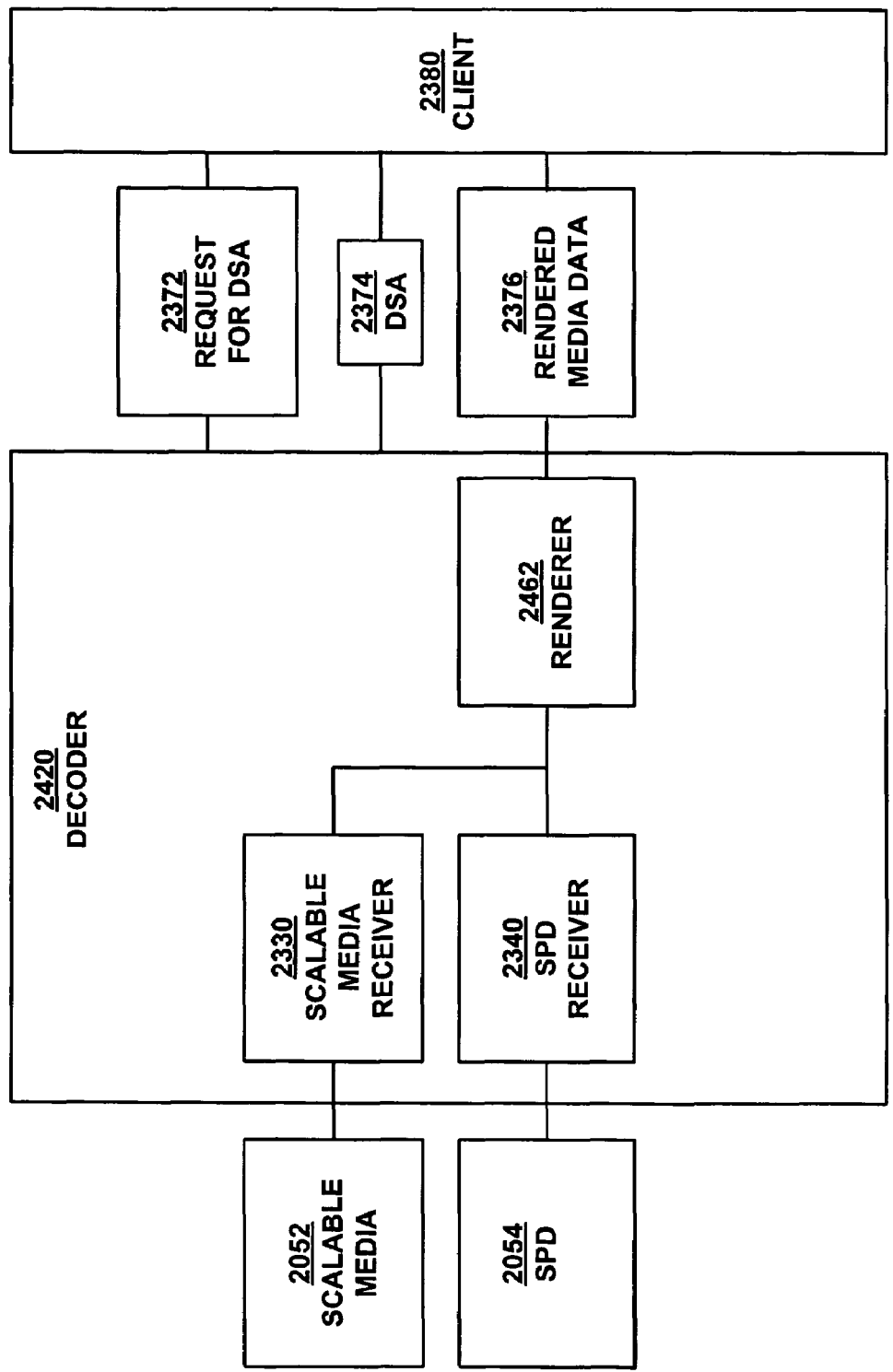

FIG. 24 is a block diagram that depicts a decoder, according to another embodiment of the present invention. FIG. 24 depicts a decoder 2420 that is similar to the decoder 2320 depicted in FIG. 23, except that decoder 2420 does not include a protection profile data receiver 2350 which receives protection profile data 2056. Therefore, according to one embodiment, unlike renderer 2362 depicted in FIG. 23, renderer 2462 in FIG. 24 does not decrypt scalable media 2052 with protection profile data 2350. However, in yet another embodiment, renderer 2462 may decrypt scalable media 2052 using another technique.

Figure 25:
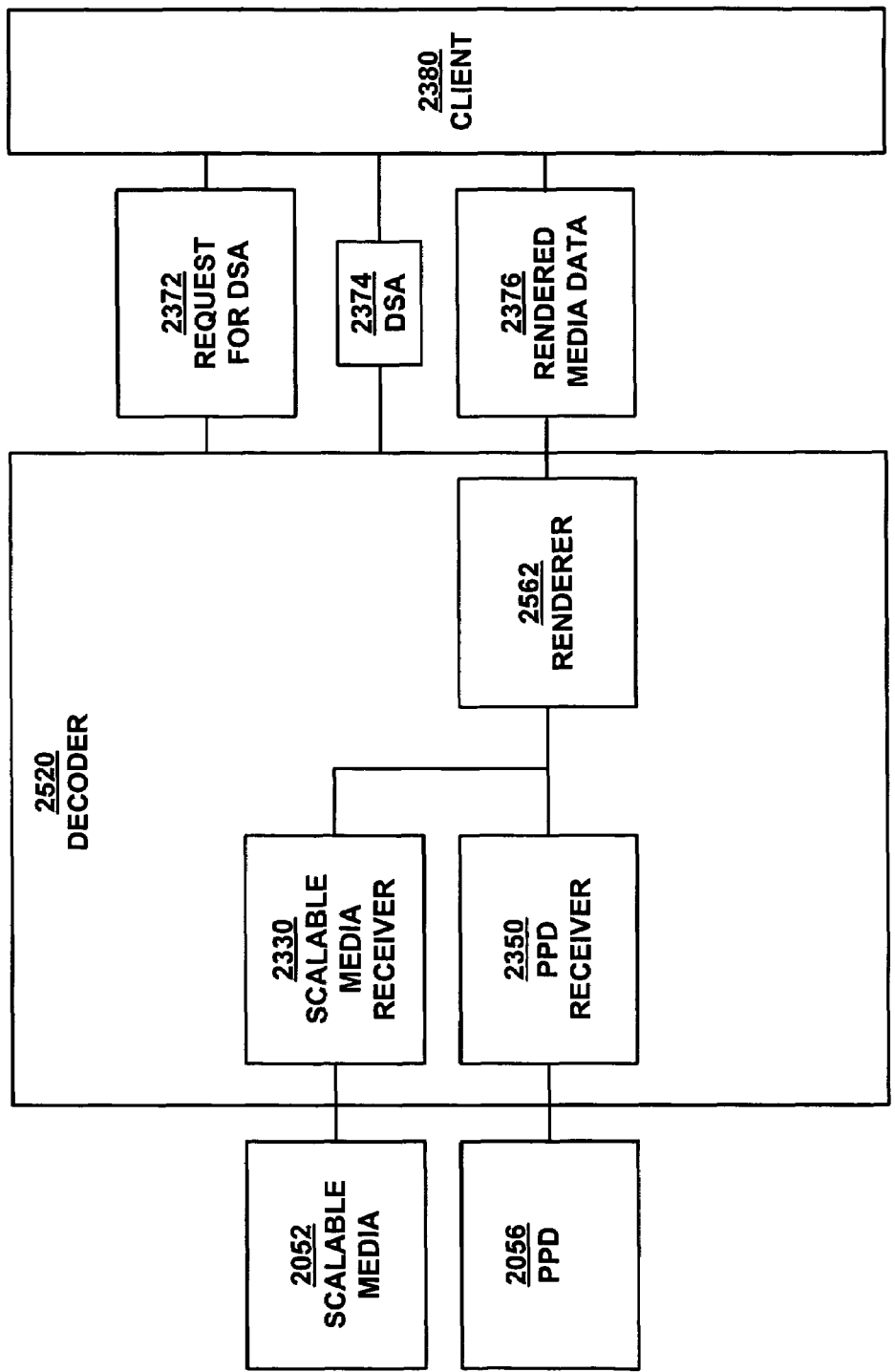

FIG. 25 is a block diagram that depicts a decoder, according to yet another embodiment of the present invention. FIG. 25 depicts a decoder 2520 that does not include a scalable profile data receiver which receives scalable profile data 2054. Therefore, according to one embodiment, renderer 2562 in FIG. 25 may include logic for parsing scalable media 2052 without a scalable profile data 2054. For example, assuming that scalable media 2052 is a JPEG 2000 file, renderer 2562 may be able to read a table of contents for scalable media 2052 to determine what segments of scalable media 2052 correspond to segments referred to in the cryptographic mapping associated with protection profile data 2056 in order to decrypt scalable media 2052. However, in yet another embodiment, renderer 2462 may decrypt scalable media 2052 using another technique. In yet another embodiment, renderer 2462 may not be fully aware of a table of contents associated with scalable media 2052, but, may only have a minimal amount of logic for parsing certain aspects of the table of contents.

According to one embodiment, any one of scalable media 2052, scalable profile data 2054, and/or protection profile data 2056 may be communicated to a decoder 2320, 2420, 2520 over a network. According to another embodiment, any one of scalable media 2052, scalable profile data 2054, and/or protection profile data 2056 may be retrieved by decoder 2320, 2420, 2520 from a storage device. The storage device may be a part of the decoder 2320, 2420, 2520.

According to one embodiment, decoders 2320, 2420, 2520 may transmit rendered media data 2376 over a network to a client 2380. In yet another embodiment, rendered media data 2376 may be stored on a storage device where it is subsequently retrieved by a client 2380. The storage device may be a part of the decoder 2320, 2420, 2520.

The discussion of decoders 2320, 2420, 2520 in this section has assumed that the decoders 2320, 2420, 2520 were at the end of a chain of devices that include encoders, transcoders, and possible other decoders before delivering an image to a client 2380. According to one embodiment, renderers 2362, 2462, 2562 may have logic for parsing enough of the table of contents associated with a scalable media 2052 to decompress the scalable media 2052 and provide an image to a client 2380.

Transcoders

There are legacy devices that are not capable of transcoding scalable media, such as JPEG 2000 files or MPEG files. In this section, many ways of upgrading legacy devices with various software, hardware, and/or microcode components so that the legacy devices are capable of transcoding scalable media shall be discussed.

Figure 26:
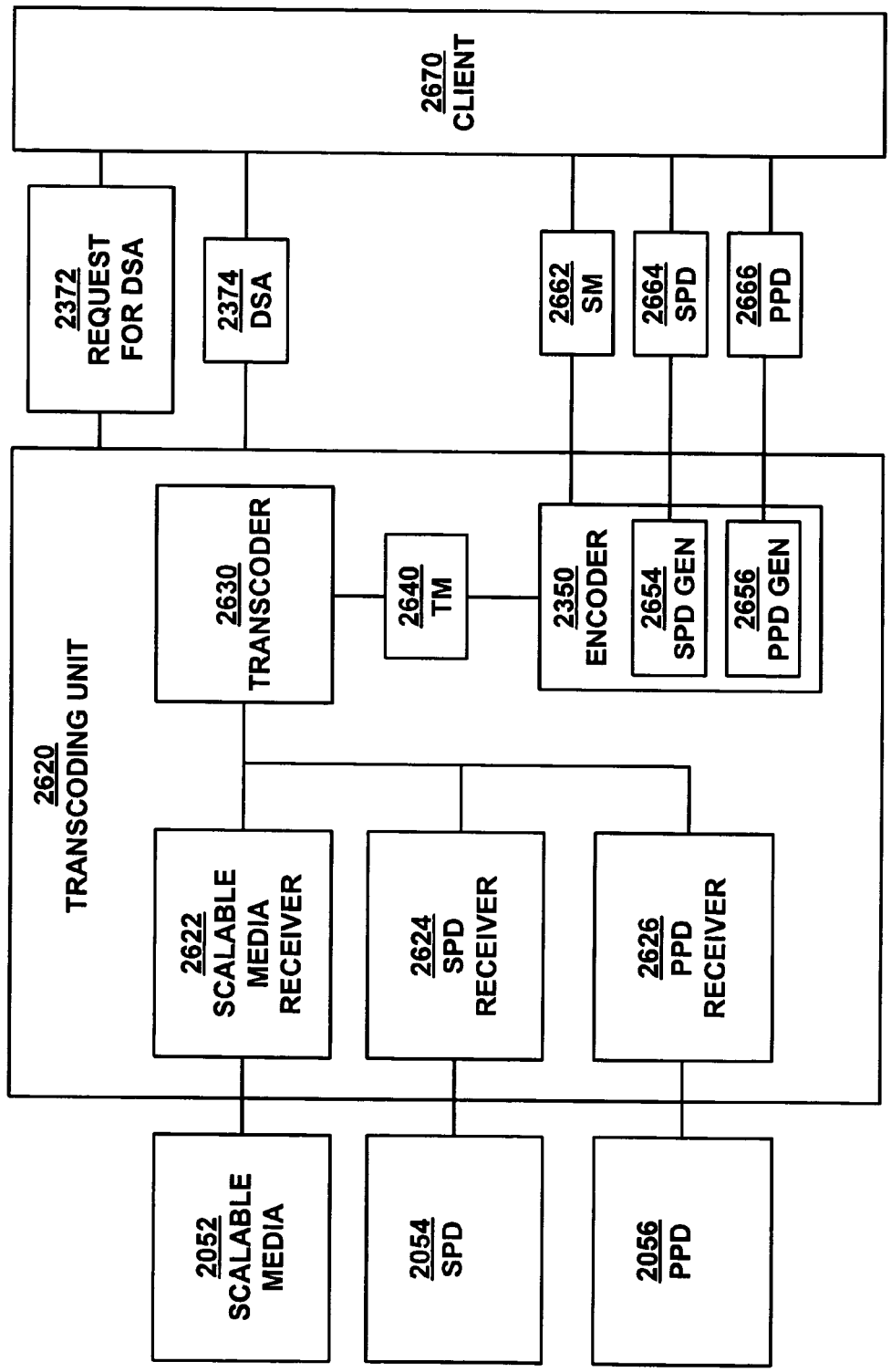
FIGS. 26, 27, 28, 29, 30, 31 and 32 are block diagrams depicting transcoders, according to embodiments of the present invention.

FIG. 26 is a block diagram that depicts a transcoding unit, according to one embodiment of the present invention. Transcoding unit 2620 may be any device, such as a portable communications device, a stationary computing device, or a digital image capturing device that can transcode any type of scalable media, such as JPEG 2000 or MPEG. As with the previously described decoders, transcoding unit 2620 may request a desired scalable attribute 2372 from a device 2670, according to one embodiment. In this case, device 2670 may provide the desired scalable attribute 2374. According to one embodiment, device 2670 may be another transcoding unit, a decoder, or a client device, among other things.

As depicted in FIG. 26, transcoding unit 2620 receives scalable media 2052, scalable profile data 2054, and protection profile data 2056, according to one embodiment. Transcoding unit 2620, performs operations on scalable media 2052, scalable profile data 2054, and protection profile data 2056 to produce new scalable media 2662, new scalable media data 2664, and new protection profile data 2666, according to another embodiment. Further, transcoding unit 2620, according to yet another embodiment, includes a transcoder 2630 that extracts segments from scalable media 2052 based on scalable profile data 2054, according to embodiments described here, and combines those segments to produce transcoded media 2640 that is communicated to an encoder 2650.

The encoder 2650, according to one embodiment, receives transcoded media 2640, which may be scalable media or a non-scaled data such as a bit map. Encoder 2650 may be a scalable media encoder, such as a JPEG 2000 or an MPEG encoder, that is capable of taking a non-scaled bit map to create new scalable media 2662, according to one embodiment. In another embodiment, encoder 2650 may only have enough logic to generate scalable media 2662 for certain attributes.

Further, as depicted in FIG. 26, encoder 2650 includes a scalable profile data generator 2654 and a protection profile data generator 2656 that generate new scalable profile data 2664 and new protection profile data 2666, according to one embodiment. In one embodiment, encoder 2650 generates the scalable profile data 2664 and protection profile data 2666 by analyzing the transcoded media 2640. In another embodiment, encoder 2650 may receive input, such as scalable attribute criteria 2014 and/or protection attribute criteria 2016, as already described herein, to generate scalable profile data 2664 and protection profile data 2666.

In yet another embodiment, encoder 2650 produces new scalable profile data 2664 by altering the offsets associated with the segments indicated in the new scalable profile data 2054 to produce new scalable profile data 2664 to reflect that certain segments have been extracted from scalable media 2052, according to embodiments already described herein. In still another embodiment, encoder 2650 produces new scalable profile data 2664 by marking what transcoding operations have been performed, e.g., what segments have been extracted, according to embodiments already described herein.

Similarly, according to another embodiment, encoder 2650 may produce new protection profile data 2666 by modifying the cryptographic mapping associated with the protection profile data 2056 to produce protection profile data 2666. In one embodiment, the cryptographic mapping may be modified by altering offsets associated with the segments extracted from scalable media 2052 on scalable profile data 2054, according to embodiments already described herein. In another embodiment, the cryptographic mapping may be modified by marking what transcoding operations have been performed on scalable media 2052, according to embodiments already described herein.

Figure 27:
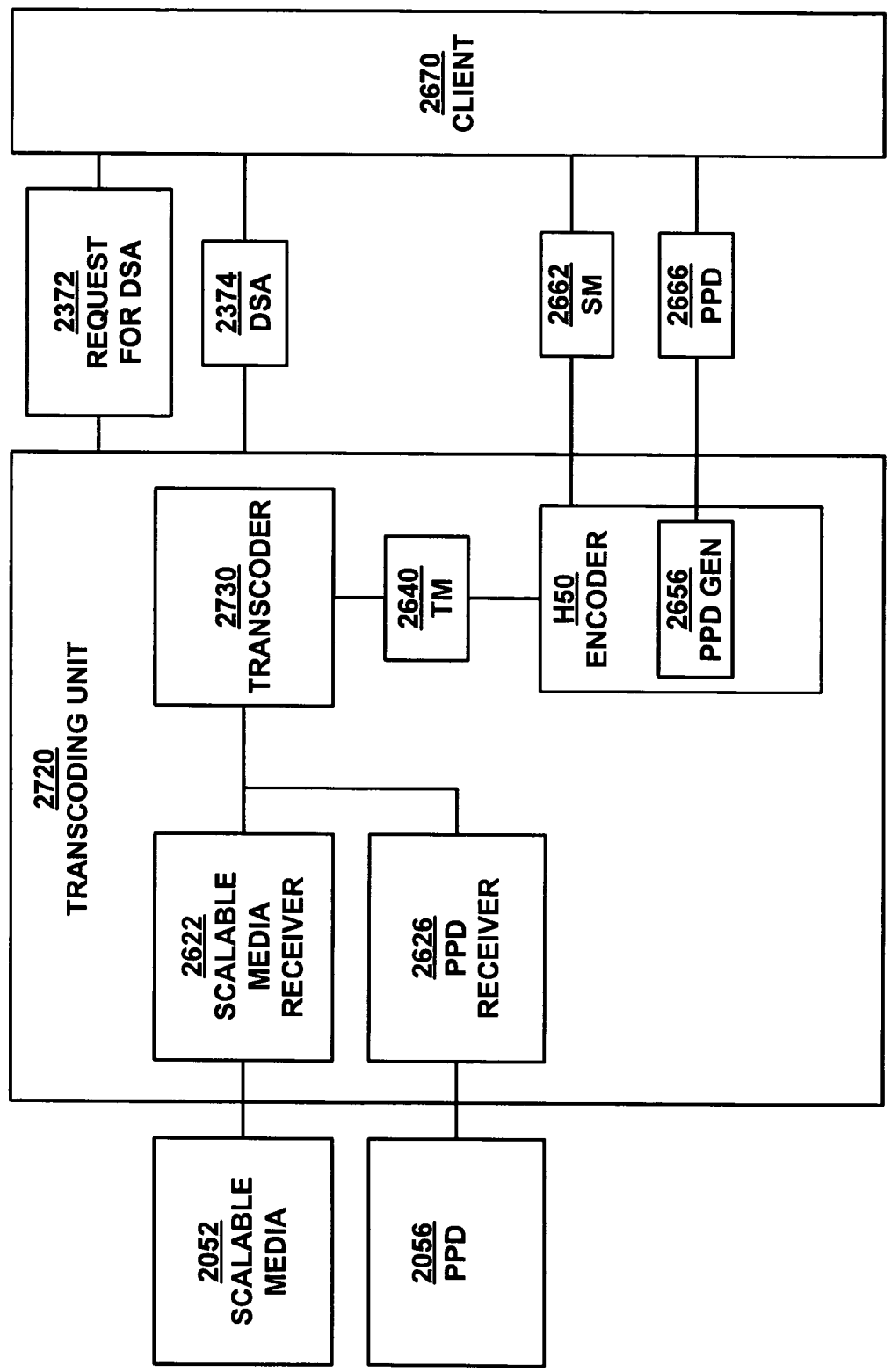

FIG. 27 is a block diagram that depicts a transcoding unit, according to another embodiment of the present invention. Transcoding unit 2720 may be any device, such as a portable communications device, a stationary computing device, or a digital image capturing device that can transcode any type of scalable media, such as JPEG 2000 or MPEG.

FIG. 27 depicts a transcoding unit 2720 that does not include a scalable profile data receiver which receives scalable profile data 2054. Therefore, according to one embodiment, transcoder 2730 in FIG. 27 may include logic for parsing scalable media 2052 without a scalable profile data 2054. For example, assuming that scalable media 2052 is a JPEG 2000 file, transcoder 2730 may be able to read a table of contents for scalable media 2052 to determine what segments of scalable media 2052 correspond to segments referred to in the cryptographic mapping associated with protection profile data 2056 in order to transcode scalable media 2052 and produce transcoded media 2640. Transcoder 2730 may only have a minimal amount of logic for parsing certain aspects of the table of contents.

Transcoding unit 2720 further includes, an encoder 2750, according to one embodiment, that receives transcoded media 2640, which may be scalable media or non-scaled data such as a bit map. Encoder 2750 may be a scalable media encoder, such as a JPEG 2000 or an MPEG encoder, that is capable of taking a non-scaled bit map to create new scalable media 2662, according to one embodiment. In another embodiment, encoder 2750 may only have enough logic to generate scalable media 2662 for certain attributes.

As depicted in FIG. 27, encoder 2750 includes a protection profile data generator 2656 that generates the new protection profile data 2666, according to one embodiment. In one embodiment, protection profile data generator 2656 generates the protection profile data 2666 by analyzing the transcoded media 2640. In another embodiment, protection profile data generator 2656 may receive input, such as protection attribute criteria 2016, as already described herein, to generate protection profile data 2666.

Figure 28:
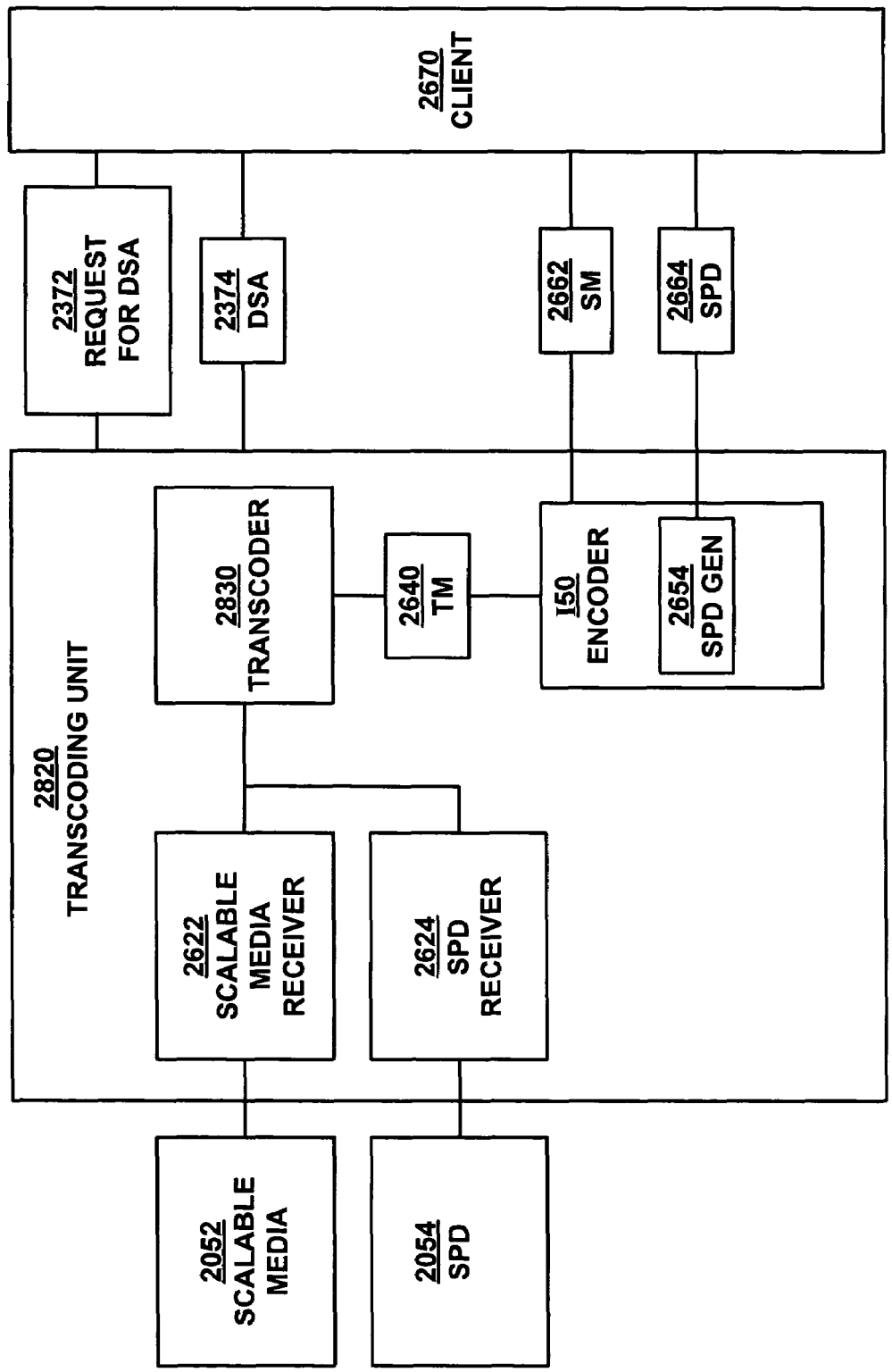

FIG. 28 is a block diagram that depicts a transcoding unit, according to another embodiment of the present invention. Transcoding unit 2820 may be any device, such as a portable communications device, a stationary computing device, or a digital image capturing device that can transcode any type of scalable media, such as JPEG 2000 or MPEG.

According to one embodiment, transcoding units do not need the protection profile data 2656 since, typically, transcoding units do not decrypt the media data, such as scalable media data 2052, that the transcoding units receive. For example, FIG. 28 depicts a transcoding unit 2820 that is similar to the transcoding unit 2620 depicted in FIG. 26, except that transcoding unit 2820 does not include a protection profile data receiver 2626. Therefore, according to one embodiment, transcoder 2830 depicted in FIG. 28 does not require logic for parsing protection profile data 2056.

Transcoding unit 2820 further includes, an encoder 2850, according to one embodiment, that receives transcoded media 2640, which may be scalable media or a non-scaled data such as a bit map. Encoder 2850 may be a scalable media encoder, such as a JPEG 2000 or an MPEG encoder, that is capable of taking a non-scaled bit map to create new scalable media 2662, according to one embodiment. In another embodiment, encoder 2750 may only have enough logic to generate scalable media 2662 for certain attributes.

Encoder 2850 includes a scalable profile data generator 2654 that generates the new scalable profile data 2664, according to one embodiment. In one embodiment, scalable profile data generator 2654 generates the scalable profile data 2664 by analyzing the transcoded media 2640. In another embodiment, scalable profile data generator 2654 may receive input, such as scalable attribute criteria 2014, as already described herein, to generate scalable profile data 2664.

Figure 29:
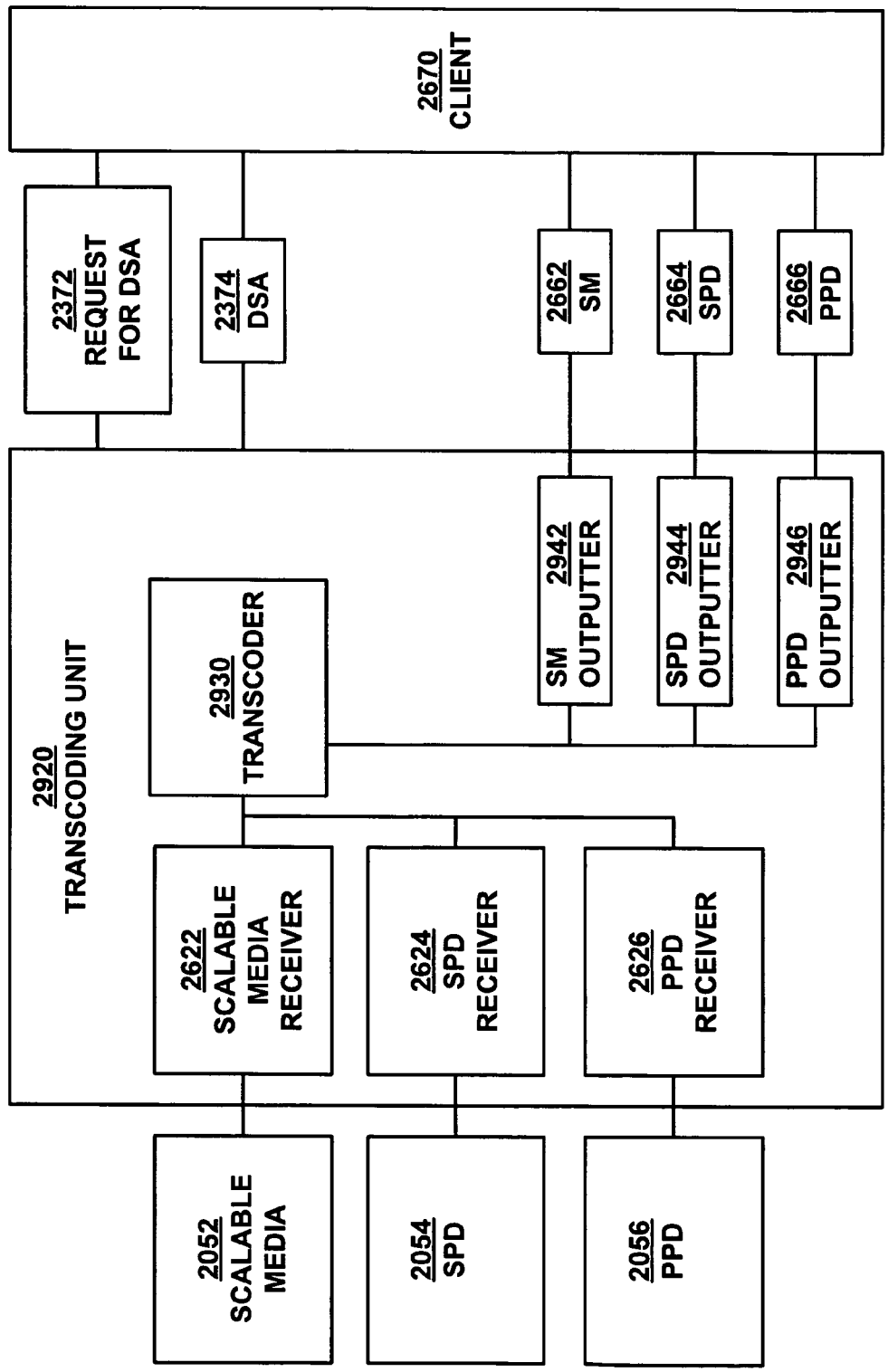

FIG. 29 is a block diagram that depicts a transcoding unit, according to another embodiment of the present invention. Transcoding unit 2920 may be any device, such as a portable communications device, a stationary computing device, or a digital image capturing device that can transcode any type of scalable media, such as JPEG 2000 or MPEG. As with transcoding unit 2620, transcoding unit receives scalable media 2052, scalable profile data 2054, and protection profile data 2056 with respective receivers (2622, 2624, 2626), according to one embodiment. Further transcoding unit 2920 outputs scalable media 2662, scalable profile data j64, and protection profile data j66 with respective outputters (2942, 2944, 2946), according to another embodiment.

As depicted in FIG. 29, according to one embodiment, transcoding unit 2920 includes a transcoder 2930 that extracts segments from scalable media 2052 based on scalable profile data 2054, according to embodiments described here, to produce new scalable media 2662. Further, according to another embodiment, transcoder 2930 processes scalable profile data 2054 to produce new scalable profile data 2664.

In one embodiment, transcoder 2930 produces new scalable profile data 2664 by altering the offsets associated with the segments indicated in the new scalable profile data 2054 to produce scalable profile data 2664 to reflect that certain segments have been extracted from scalable media 2052, according to embodiments already described herein. In another embodiment, transcoder 2930 produces new scalable profile data 2664 by marking what transcoding operations have been performed, e.g., what segments have been extracted from scalable media 2052, according to embodiments already described herein.

Transcoder 2930 may produce new protection profile data 2666 by modifying the cryptographic mapping associated with the protection profile data 2056 to produce protection profile data 2666. In one embodiment, the cryptographic mapping may be modified by altering offsets associated with the segments extracted from scalable media 2052 based on scalable profile data 2054, according to embodiments already described herein. In another embodiment, the cryptographic mapping may be modified by marking what transcoding operations have been performed, according to embodiments already described herein.

Figure 30:
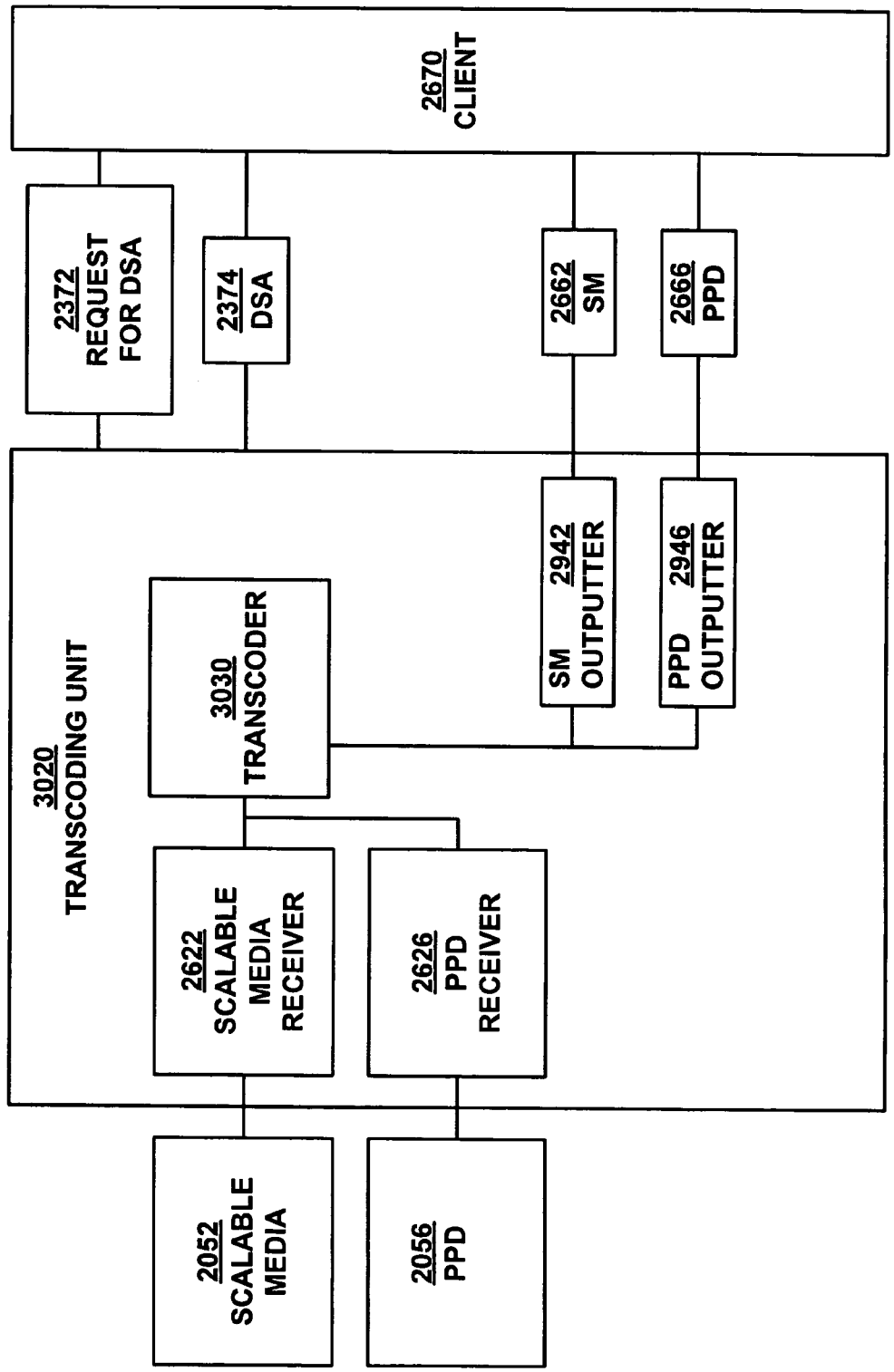

FIG. 30 is a block diagram that depicts a transcoding unit, according to another embodiment of the present invention. Transcoding unit 3020 may be any device, such as a portable communications device, a stationary computing device, or a digital image capturing device that can transcode any type of scalable media, such as JPEG 2000 or MPEG.

FIG. 30 depicts a transcoding unit 3020 that does not include a scalable profile data receiver which receives scalable profile data 2054. Therefore, according to one embodiment, transcoder 3030 in FIG. 30 may include logic for parsing scalable media 2052 without a scalable profile data 2054. For example, assuming that scalable media 2052 is a JPEG 2000 file, transcoder 3030 may be able to read a table of contents for scalable media 2052 to determine what segments of scalable media 2052 correspond to segments referred to in the cryptographic mapping associated with protection profile data 2056 in order to modify the cryptographic mapping as already described herein. In yet another embodiment, transcoder 3030 may not be fully aware of a table of contents associated with scalable media 2052, but, may only have a minimal amount of logic for parsing certain aspects of the table of contents.

Figure 31:
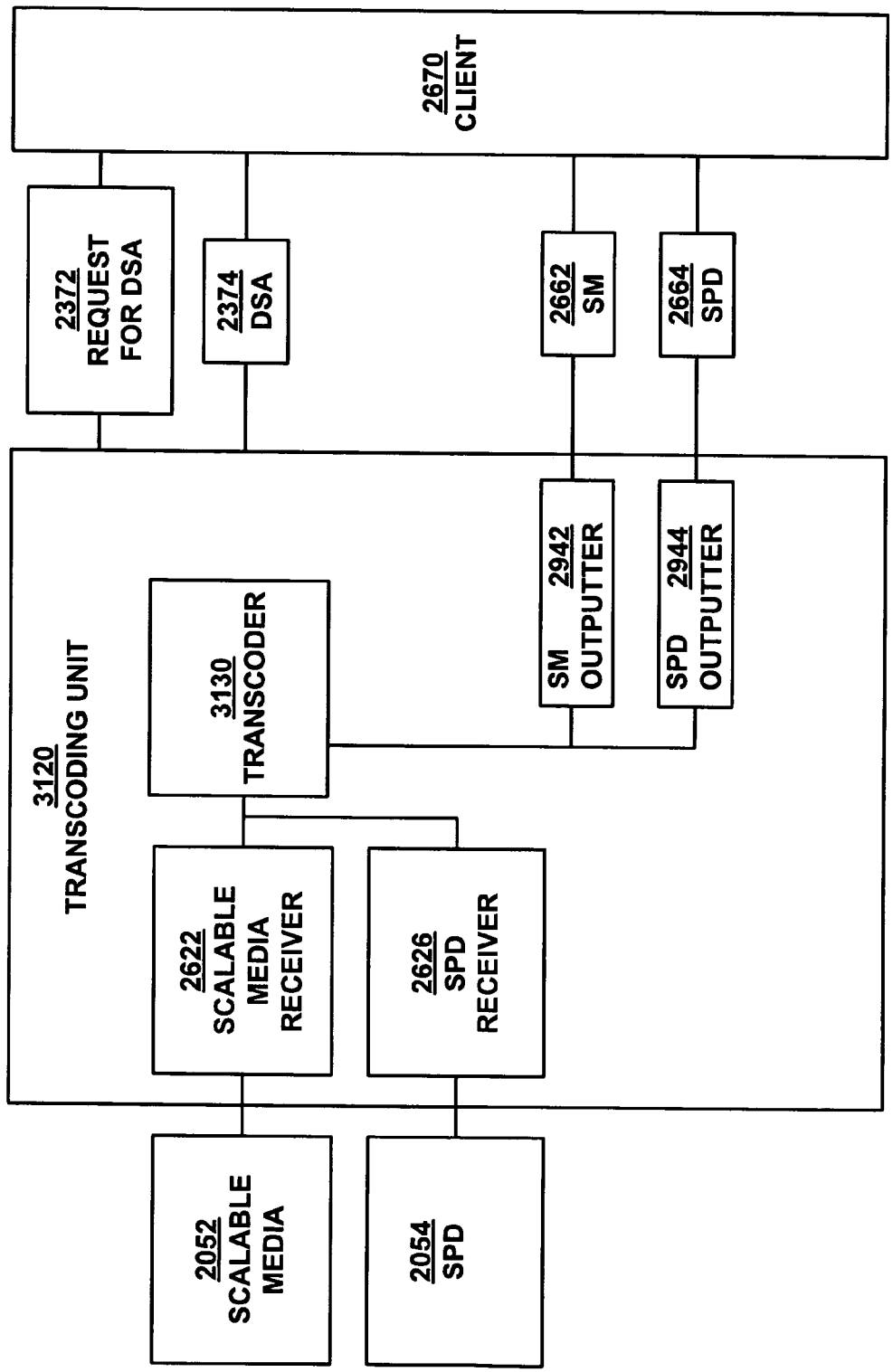

FIG. 31 is a block diagram that depicts a transcoding unit, according to another embodiment of the present invention. FIG. 31 depicts a transcoding unit 3120 that is similar to the transcoding unit 2920 depicted in FIG. 29, except that transcoding unit 3120 does not include a protection profile data receiver 2626. Therefore, according to one embodiment, transcoder 2830 depicted in FIG. 28 does not require logic for parsing protection profile data or for modifying the cryptographic mapping of a protection profile data, according to embodiments already described herein.

Figure 32:
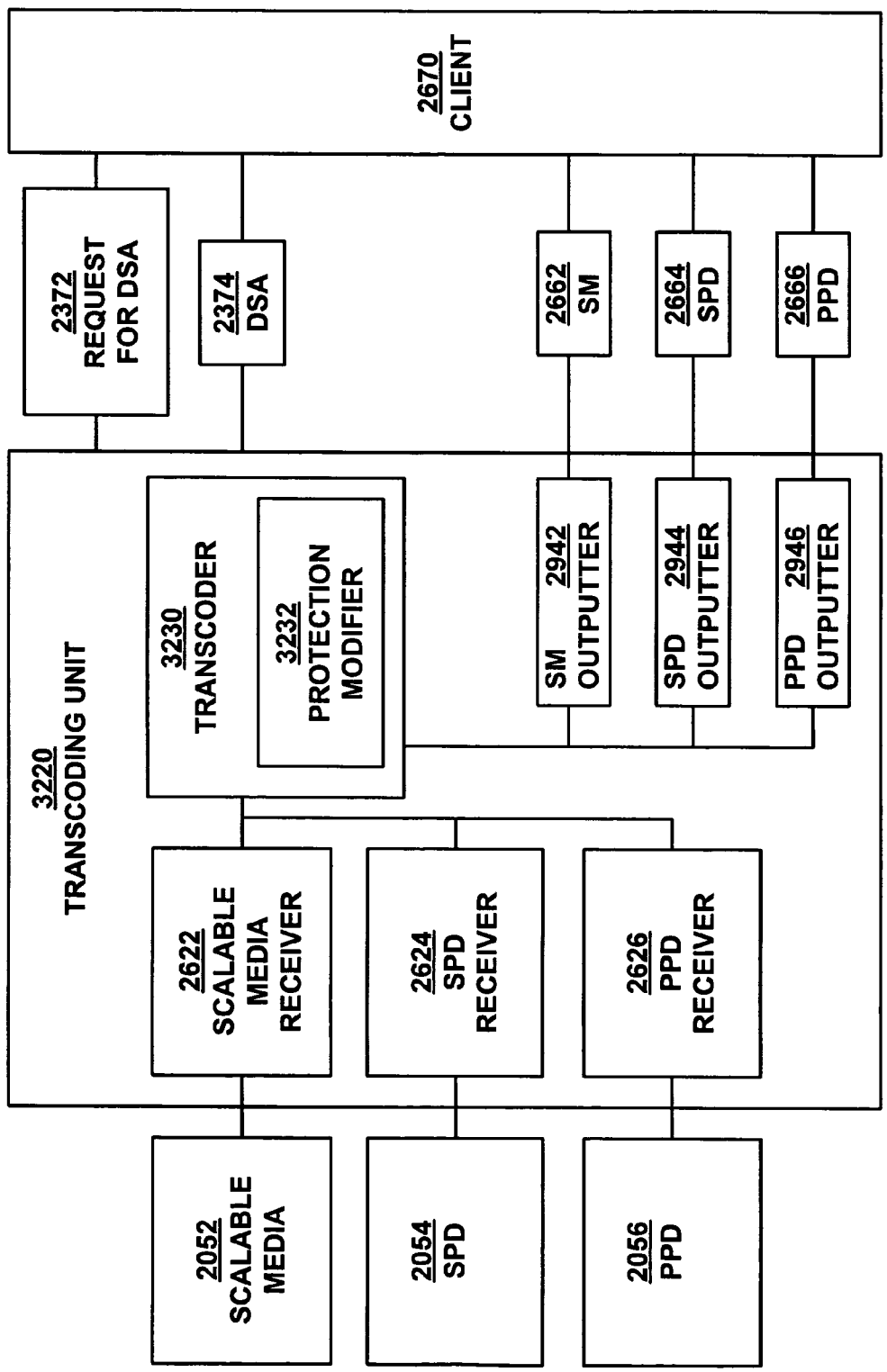

FIG. 32 is a block diagram that depicts a transcoding unit, according to another embodiment of the present invention. FIG. 32 depicts a transcoding unit 3220 that is similar to the transcoding unit 2920 depicted in FIG. 29, except that transcoding unit 3220 includes a transcoder 3230 with a protection modifier 3232. According to one embodiment, protection modifier 3232 may modify protection or add layers of protection, according to embodiments described herein. Although only FIG. 32 depicts a protection modifier 3232, according to another embodiment, the transcoding units 2620, 2720, 2820, 2920, 3020, 3120, 3220 (FIGS. 26–32) may also include protection modifiers.

In yet another embodiment, input, such as scalable attribute criteria 2014 and/or protection attribute criteria 2016 may be received by an encoder 2650, 2750, 2850 (FIGS. 26–28) to generate scalable profile data 2664 and/or protection profile data 2666.

According to one embodiment, the scalable profile data 2054 and/or the protection profile data 2056 may be encrypted, in which case, whatever transcoding unit 2620, 2720, 2820, 2920, 3020, 3120, 3220 (FIGS. 26–32) that receives the data (2054, 2056) would need the key to decrypt the data (2054, 2056).

There are legacy transcoders that are not capable of transcoding scalable media, such as JPEG 2000 files or MPEG files. According to one embodiment, transcoding units 2620, 2720, 2820, 2920, 3020, 3120, 3220 (FIGS. 26–32) are legacy devices. By installing software, hardware, and/or microcode components such as receivers 2622, 2624, 2626, transcoders 2630, 2730, 2830, 2930, 3030, 3130, 3230 encoders 2650, 2750, 2850, and outputters 2942, 2944, 2946 onto transcoding units 2620, 2720, 2820, 2920, 3020, 3120, 3220 the transcoding units 2620, 2720, 2820, 2920, 3020, 3120, 3220 may become capable of transcoding scalable media 2052, according to embodiments already described herein.

According to one embodiment, scalable media 2052 is encrypted. For example, scalable profile data 2054 enable transcoders 2630, 2830, 2930, 3130, 3230 (FIGS. 26, 28, 29, 31, 32) to extract segments from scalable media 2052, according to embodiments already described herein. In order to do this, the transcoders 2630, 2830, 2930, 3130, 3230 may receive the keys to un-encrypt the scalable media 2052. According to another embodiment, scalable media 2052 is not encrypted.

Scalable media data 2052, scalable profile data 2054, and/or protection profile data 2056 may be communicated to transcoding units 2620, 2720, 2820, 2920, 3020, 3120, 3220 (FIGS. 26–32) from another device, such as an encoder or another transcoder, using a network, according to one embodiment. In another embodiment, scalable media data 2052, scalable profile data 2054, and/or protection profile data 2056 may be retrieved by transcoding units 2620, 2720, 2820, 2920, 3020, 3120, 3220 from a storage device. In still another embodiment, the storage device may be a part of the respective transcoding unit 2620, 2720, 2820, 2920, 3020, 3120, 3230.

Scalable media 2662, scalable profile data 2664, and/or protection profile data 2666 (FIGS. 26–32) may be transmitted to another device, such as another transcoder or a decoder, using a network, according to one embodiment. According to another embodiment, scalable media 2662, scalable profile data 2664, and/or protection profile data 2666 may be stored on a storage device where another device, such as a transcoder or a decoder may retrieve them. In still another embodiment, the storage device may be a part of the respective transcoding unit 2620, 2720, 2820, 2920, 3020, 3120, 3220.

In yet another embodiment, two or more of the receivers 2622, 2624, 2626 (FIGS. 26–32) may be combined into one receiver. For example, scalable media receiver 2622 and scalable profile data receiver 2624 may be combined into one receiver. Similarly, scalable media receiver 2622 and protection profile data receiver 2626 may be combined into one receiver. Alternatively, all three receivers (2622, 2624, 2626) may be combined into one receiver.

In still another embodiment, two or more of the outputters 2942, 2944, 2946 FIGS. 29, 30, 31, 32) may be combined into one outputter. For example, scalable media outputter 2942 and scalable profile data outputter 2944 may be combined into one outputter. Similarly, scalable media outputter 2942 and protection profile data outputter 2946 may be combined into one outputter. Alternatively, all three outputters (2942, 2944, 2946) may be combined into one outputter.

In yet another embodiment, the generators 2654, 2656 (FIGS. 29, 30, 31, 32) may be combined into one generator.

As already discussed, scalable media 2052, scalable profile data 2054, and protection profile data 2056 (FIGS. 26–32) may be in separate files or combined together in a single file in any combination, according to one embodiment.

According to another embodiment, to maintain the security of scalable media 2052, the transcoding unit 2620, 2720, 2820, 2920, 3020, 3120, 3220 (FIGS. 26–32) does not receive the keys that were used for encrypting the scalable media 2052. In this case, only a decoder (2320, 2420, 2520) would receive the keys in order to decrypt the scalable media 2052.

Encoders 2020, 2120, 2220 (FIGS. 20–22) and transcoding units 2620, 2720, 2820, 2920, 3020, 3120, 3220 (FIGS. 26–32) may be in a single device, according to one embodiment. Encoders 2020, 2120, 2220 (FIGS. 20–22) and decoders 2320, 2420, 2520 (FIGS. 23–25) may be in a single device, according to another embodiment. In yet another embodiment. In still another embodiment, transcoding units 2620, 2720, 2820, 2920, 3020, 3120, 3220 (FIGS. 26–32) and decoders 2320, 2420, 2520 (FIGS. 23–25) may be in a single device. Encoders 2020, 2120, 2220 (FIGS. 20–22), transcoding units 2620, 2720, 2820, 2920, 3020, 3120, 3220 (FIGS. 26–32), and decoders 2320, 2420, 2520 (FIGS. 23–25) may all three be in a single device.

The functions associated with the encoders 2020, 2120, 2220, transcoding units 2620, 2720, 2820, 2920, 3020, 3120, 3220, and decoders 2320, 2420, 2520 depicted in FIGS. 26–32, m may be moved around and combined in many ways that would be apparent to one of ordinary skill in the art.

Embodiments of the present invention are thus described. While the present invention has been described in particular embodiments, it should be appreciated that the present invention should not be construed as limited by such embodiments, but rather construed according to the following claims.

What is claimed is:

1. A media data encoding apparatus comprising:
a media data receiver for receiving media data;
a scalable media generator for generating scalable media based on said media data, wherein said scalable media are encoded according to an encoding scheme;
a scalable attribute criteria receiver for receiving scalable attribute criteria that identify how said scalable media are to be scaled;
a scalable profile data generator for generating scalable profile data based, at least in part, on said scalable media and said scalable attribute criteria, said scalable profile data comprising a reference to segments of said scalable media associated with said scalable attribute criteria, said reference beyond the syntax of said encoding scheme, said reference used by a device to locate said segments without said device requiring knowledge of said encoding scheme; and a scalable profile data outputter for outputting said scalable profile data.

2. The media data encoding apparatus of claim 1, wherein said media data encoding apparatus is a JPEG 2000 encoding device.

3. The media data encoding apparatus of claim 1, wherein said scalable profile data is encrypted.

4. The media data encoding apparatus of claim 1, wherein said scalable profile data is unencrypted.

5. The media data encoding apparatus of claim 1, wherein said scalable media and said scalable profile data are outputted together in a single file.

6. The media data encoding apparatus of claim 5, wherein said scalable profile data and said scalable media are in said single file and said scalable profile data is at the beginning of said file.

7. The media data encoding apparatus of claim 5, wherein said scalable profile data and said scalable media are in said single file and said scalable profile data is not at the beginning of said file.

8. The media data encoding apparatus of claim 1, wherein said scalable media encoder is an apparatus selected from the group consisting of a portable communications device, a stationary computing device, or a digital image capturing device.

9. A media data encoding apparatus comprising:
a media data receiver for receiving media data;
a scalable media generator for generating scalable media based on said media data, wherein said scalable media are encoded according to an encoding scheme and wherein information is associated with said scalable media, said information comprising a reference to segments of said scalable media, said segments combinable to produce a scaled version of said media data, said reference beyond the syntax of said encoding scheme;
a protection attribute criteria receiver for receiving protection attribute criteria;
a protection profile data generator for generating protection profile data based, at least in part, on said scalable media and said protection attribute criteria, said protection profile data identifying protection attributes of an encryption scheme used to encrypt said scalable media; and
a protection profile data outputter for outputting said protection profile data.

10. The media data encoding apparatus of claim 9, wherein said media data encoding apparatus is a JPEG 2000 encoding device.

11. The media data encoding apparatus of claim 9, wherein said protection profile data is encrypted.

12. The media data encoding apparatus of claim 9, wherein said protection profile data is unencrypted.

13. The media data encoding apparatus of claim 9, wherein said scalable media and said protection profile data are outputted together in a single file.

14. The media data encoding apparatus of claim 13, wherein said protection profile data and said scalable media are in said single file and said protection profile data is at the beginning of said file.

15. The media data encoding apparatus of claim 13, wherein said protection profile data and said scalable media are in said single file and said protection profile data is not at the beginning of said file.

16. The media data encoding apparatus of claim 9, wherein said scalable media encoder is an apparatus selected from the group consisting of a portable communications device, a stationary computing device, or a digital image capturing device.

17. A media data encoding apparatus comprising:
a media data receiver for receiving media data;
a scalable media generator for generating scalable media based on said media data, wherein said scalable media are encoded according to an encoding scheme;
a scalable attribute criteria receiver for receiving scalable attribute criteria that identify how said scalable media are to be scaled;
a scalable profile data generator for generating scalable profile data based, at least in part, on said scalable media and said scalable attribute criteria, said scalable profile data comprising a reference to segments of said scalable media associated with said scalable attribute criteria, said reference beyond the syntax of said encoding scheme, said reference used by a device to locate said segments without said device requiring knowledge of said encoding scheme;
a scalable profile data outputter for outputting said scalable profile data;
a protection attribute criteria receiver for receiving protection attribute criteria;
a protection profile data generator for generating protection profile data based, at least in part, on said scalable media and said protection attribute criteria; and
a protection profile data outputter for outputting said protection profile data.

18. The media data encoding apparatus of claim 17, wherein said media data encoding apparatus is a JPEG 2000 encoding device.

19. The media data encoding apparatus of claim 17, wherein said scalable profile data is encrypted.

20. The media data encoding apparatus of claim 17, wherein said scalable profile data is unencrypted.

21. The media data encoding apparatus of claim 17, wherein two or more of said scalable media, said scalable profile data, and said protection profile data are outputted together in a single file.

22. The media data encoding apparatus of claim 21, wherein said scalable profile data and said scalable media are in said single file and said scalable profile data is at the beginning of said file.

23. The media data encoding apparatus of claim 21, wherein said scalable profile data and said scalable media are in said single file and said scalable profile data is not at the beginning of said file.

24. The media data encoding apparatus of claim 21, wherein said protection profile data and said scalable media are in said single file and said protection profile data is at the beginning of said file.

25. The media data encoding apparatus of claim 21, wherein said protection profile data and said scalable media are in said single file and said protection profile data is not at the beginning of said file.

26. The media data encoding apparatus of claim 17, wherein said scalable media encoder is an apparatus selected from the group consisting of a portable communications device, a stationary computing device, or a digital image capturing device.

27. A media data encoding apparatus comprising:
a media data receiver;
a scalable media generator for generating scalable media encoded according to an encoding scheme;

a scalable attribute criteria receiver for receiving a scalable attribute that identifies how said scalable media are to be scaled; and a scalable profile data generator for generating scalable profile data based, at least in part, on said scalable media and said scalable attribute, said scalable profile data comprising a reference to segments of said scalable media associated with said scalable attribute, said reference beyond the syntax of said encoding scheme, said reference used by a device to locate said segments without said device requiring knowledge of said encoding scheme.

28. The media data encoding apparatus of claim 27, wherein said media data encoding apparatus is a JPEG 2000 encoding device.

29. The media data encoding apparatus of claim 27, wherein said scalable profile data is encrypted.

30. The media data encoding apparatus of claim 27, wherein said scalable profile data is unencrypted.

31. The media data encoding apparatus of claim 27, wherein said scalable media and said scalable profile data are outputted together in a single file.

32. The media data encoding apparatus of claim 31, wherein said scalable profile data and said scalable media are in said single file and said scalable profile data is at the beginning of said file.

33. The media data encoding apparatus of claim 31, wherein said scalable profile data and said scalable media are in said single file and said scalable profile data is not at the beginning of said file.

34. The media data encoding apparatus of claim 27, wherein said scalable media encoder is an apparatus selected from the group consisting of a portable communications device, a stationary computing device, or a digital image capturing device.

35. A media data encoding apparatus comprising:
a media data receiver;
a scalable media generator for generating scalable media based on said media data, wherein said scalable media are encoded according to an encoding scheme and wherein information is associated with said scalable media, said information comprising a reference to segments of said scalable media, said segments combinable to produce a scaled version of said media data, said reference beyond the syntax of said encoding scheme;
a protection attribute criteria receiver for receiving a protection attribute;
a protection profile data generator for generating protection profile data based, at least in part, on said scalable media and said protection attribute, said protection profile data identifying protection attributes of an encryption scheme used to encrypt said scalable media.

36. The media data encoding apparatus of claim 35, wherein said media data encoding apparatus is a JPEG 2000 encoding device.

37. The media data encoding apparatus of claim 35, wherein said protection profile data is encrypted.

38. The media data encoding apparatus of claim 35, wherein said protection profile data is unencrypted.

39. The media data encoding apparatus of claim 35, wherein said scalable media and said protection profile data are outputted together in a single file.

40. The media data encoding apparatus of claim 39, wherein said protection profile data and said scalable media are in said single file and said protection profile data is at the beginning of said file.

41. The media data encoding apparatus of claim 39, wherein said protection profile data and said scalable media are in said single file and said protection profile data is not at the beginning of said file.

42. The media data encoding apparatus of claim 35, wherein said scalable media encoder is an apparatus selected from the group consisting of a portable communications device, a stationary computing device, or a digital image capturing device.

43. A media data encoding apparatus comprising:
a media data receiver;
a scalable media generator for generating scalable media encoded according to an encoding scheme;
a scalable attribute criteria receiver for receiving a scalable attribute that identifies how said scalable media are to be scaled;
a scalable profile data generator;
a scalable profile data outputter;
a protection attribute criteria receiver;
a scalable profile data generator for generating scalable profile data based, at least in part, on said scalable media and said scalable attribute said scalable profile data comprising a reference to segments of said scalable media associated with said scalable attribute, said reference beyond the syntax of said encoding scheme, said reference used by a device to locate said segments without said device requiring knowledge of said encoding scheme; and
a protection profile data generator for generating protection profile data based, at least in part, on said scalable media and said protection attribute criteria.

44. The media data encoding apparatus of claim 43, wherein said media data encoding apparatus is a JPEG 2000 encoding device.

45. The media data encoding apparatus of claim 43, wherein said scalable profile data is encrypted.

46. The media data encoding apparatus of claim 43, wherein said scalable profile data is unencrypted.

47. The media data encoding apparatus of claim 43, wherein two or more of said scalable media, said scalable profile data, and said protection profile data are outputted together in a single file.

48. The media data encoding apparatus of claim 47, wherein said scalable profile data and said scalable media are in said single file and said scalable profile data is at the beginning of said file.

49. The media data encoding apparatus of claim 47, wherein said scalable profile data and said scalable media are in said single file and said scalable profile data is not at the beginning of said file.

50. The media data encoding apparatus of claim 47, wherein said protection profile data and said scalable media are in said single file and said protection profile data is at the beginning of said file.

51. The media data encoding apparatus of claim 47, wherein said protection profile data and said scalable media are in said single file and said protection profile data is not at the beginning of said file.

52. The media data encoding apparatus of claim 43, wherein said scalable media encoder is an apparatus selected from the group consisting of a portable communications device, a stationary computing device, or a digital image capturing device.

* * * * *